(12) United States Patent
Fullerton et al.

(10) Patent No.: US 9,245,677 B2
(45) Date of Patent: Jan. 26, 2016

(54) SYSTEM FOR CONCENTRATING AND CONTROLLING MAGNETIC FLUX OF A MULTI-POLE MAGNETIC STRUCTURE

(71) Applicant: Correlated Magnetics Research, LLC., Huntsville, AL (US)

(72) Inventors: Larry W. Fullerton, New Hope, AL (US); Mark D. Roberts, Huntsville, AL (US)

(73) Assignee: Correlated Magnetics Research, LLC., Huntsville, AL (US)

( * ) Notice: Subject to any disclaimer, the term of this patent is extended or adjusted under 35 U.S.C. 154(b) by 0 days.

(21) Appl. No.: 14/810,055

(22) Filed: Jul. 27, 2015

(65) Prior Publication Data
US 2015/0348690 A1 Dec. 3, 2015

Related U.S. Application Data

(63) Continuation-in-part of application No. 14/578,798, filed on Dec. 22, 2014, now Pat. No. 9,093,207, which is a continuation-in-part of application No. 14/258,723, filed on Apr. 22, 2014, now Pat. No.
(Continued)

(51) Int. Cl.
*H01F 7/02* (2006.01)
*H01F 7/04* (2006.01)

(52) U.S. Cl.
CPC ............ *H01F 7/0252* (2013.01); *H01F 7/0205* (2013.01); *H01F 7/0221* (2013.01); *H01F 7/0273* (2013.01); *H01F 7/04* (2013.01)

(58) Field of Classification Search
CPC . H01F 7/0205; H01F 7/0221; H01F 7/02527; H01F 7/0273; H01F 7/04
See application file for complete search history.

(56) References Cited

U.S. PATENT DOCUMENTS

| 93,931 A | 8/1869 | Westcott |
|---|---|---|
| 361,248 A | 4/1887 | Winton |

(Continued)

FOREIGN PATENT DOCUMENTS

| CN | 1615573 | 5/2005 |
|---|---|---|
| DE | 2938782 | 4/1981 |

(Continued)

OTHER PUBLICATIONS

Atallah, K., Calverley, S.D., D. Howe, 2004, "Design, analysis and realisation of a high-performance magnetic gear", IEE Proc.-Electr. Power Appl., vol. 151, No. 2, Mar. 2004.
(Continued)

*Primary Examiner* — Ramon M Barrera
(74) *Attorney, Agent, or Firm* — Vector IP Law Group; Robert S. Babayi

(57) ABSTRACT

An improved system for concentrating magnetic flux of a multi-pole magnetic structure at the surface of a ferromagnetic target uses first pole pieces having a magnet-to-pole piece interface with a first area and a pole piece-to-target interface with a second area substantially smaller than the first area for concentrating flux of the multi-pole magnetic structure at each pole piece-to-target interface, where the target can be a ferromagnetic material, complementary pole pieces, or a gap. The improved system may also include a magnetic circuit having second pole pieces located between the first pole pieces and the target that controls the flux directed from the first pole pieces to the target.

20 Claims, 51 Drawing Sheets

(Side View)

Related U.S. Application Data 8,917,154, which is a continuation-in-part of application No. 14/103,699, filed on Dec. 11, 2013, now Pat. No. 8,937,521, application No. 14/810,055, which is a continuation-in-part of application No. 14/072,664, filed on Nov. 5, 2013, which is a continuation-in-part of application No. 13/960,651, filed on Aug. 6, 2013.

(60) Provisional application No. 61/854,333, filed on Apr. 22, 2013, provisional application No. 61/735,403, filed on Dec. 10, 2012, provisional application No. 61/852,431, filed on Mar. 15, 2013, provisional application No. 61/742,273, filed on Aug. 6, 2012, provisional application No. 61/796,253, filed on Nov. 5, 2012.

(56) References Cited

U.S. PATENT DOCUMENTS

| | | | |
|---|---|---|---|
| 381,968 | A | 5/1888 | Tesla |
| 493,858 | A | 3/1893 | Edison |
| 675,323 | A | 5/1901 | Clark |
| 687,292 | A | 11/1901 | Armstrong |
| 996,933 | A | 7/1911 | Lindquist |
| 1,081,462 | A | 12/1913 | Patton |
| 1,171,351 | A | 2/1916 | Neuland |
| 1,236,234 | A | 8/1917 | Troje |
| 1,252,289 | A | 1/1918 | Murray, Jr. |
| 1,301,135 | A | 4/1919 | Karasick |
| 1,312,546 | A | 8/1919 | Karasick |
| 1,323,546 | A | 8/1919 | Karasick |
| 1,554,236 | A | 1/1920 | Simmons |
| 1,343,751 | A | 6/1920 | Simmons |
| 1,624,741 | A | 12/1926 | Leppke et al. |
| 1,784,256 | A | 12/1930 | Stout |
| 1,895,129 | A | 1/1933 | Jones |
| 2,048,161 | A | 7/1936 | Klaiber |
| 2,147,482 | A | 12/1936 | Butler |
| 2,186,074 | A | 1/1940 | Koller |
| 2,240,035 | A | 4/1941 | Catherall |
| 2,243,555 | A | 5/1941 | Faus |
| 2,269,149 | A | 1/1942 | Edgar |
| 2,327,748 | A | 8/1943 | Smith |
| 2,337,248 | A | 12/1943 | Koller |
| 2,337,249 | A | 12/1943 | Koller |
| 2,389,298 | A | 11/1945 | Ellis |
| 2,401,887 | A | 6/1946 | Sheppard |
| 2,414,653 | A | 1/1947 | Iokholder |
| 2,438,231 | A | 3/1948 | Schultz |
| 2,471,634 | A | 5/1949 | Vennice |
| 2,475,456 | A | 7/1949 | Norlander |
| 2,508,305 | A | 5/1950 | Teetor |
| 2,513,226 | A | 6/1950 | Wylie |
| 2,514,927 | A | 7/1950 | Bernhard |
| 2,520,828 | A | 8/1950 | Bertschi |
| 2,565,624 | A | 8/1951 | Phelon |
| 2,570,625 | A | 10/1951 | Zimmerman et al. |
| 2,690,349 | A | 9/1954 | Teetor |
| 2,694,164 | A | 11/1954 | Geppelt |
| 2,964,613 | A | 11/1954 | Williams |
| 2,701,158 | A | 2/1955 | Schmitt |
| 2,722,627 | A | 11/1955 | Cluwen et al. |
| 2,770,759 | A | 11/1956 | Ahlgren |
| 2,837,366 | A | 6/1958 | Loeb |
| 2,853,331 | A | 9/1958 | Teetor |
| 2,888,291 | A | 5/1959 | Scott et al. |
| 2,896,991 | A | 7/1959 | Martin, Jr. |
| 2,932,545 | A | 4/1960 | Foley |
| 2,935,352 | A | 5/1960 | Heppner |
| 2,935,353 | A | 5/1960 | Loeb |
| 2,936,437 | A | 5/1960 | Fraser et al. |
| 2,962,318 | A | 11/1960 | Teetor |
| 3,055,999 | A | 9/1962 | Lucas |
| 3,089,986 | A | 5/1963 | Gauthier |
| 3,102,314 | A | 9/1963 | Alderfer |
| 3,151,902 | A | 10/1964 | Ahlgren |
| 3,204,995 | A | 9/1965 | Teetor |
| 3,208,296 | A | 9/1965 | Baermann |
| 3,238,399 | A | 3/1966 | Johanees et al. |
| 3,273,104 | A | 9/1966 | Krol |
| 3,288,511 | A | 11/1966 | Tavano |
| 3,301,091 | A | 1/1967 | Reese |
| 3,351,368 | A | 11/1967 | Sweet |
| 3,382,386 | A | 5/1968 | Schlaeppi |
| 3,408,104 | A | 10/1968 | Raynes |
| 3,414,309 | A | 12/1968 | Tresemer |
| 3,425,729 | A | 2/1969 | Bisbing |
| 3,468,576 | A | 9/1969 | Beyer et al. |
| 3,474,366 | A | 10/1969 | Barney |
| 3,500,090 | A | 3/1970 | Baermann |
| 3,521,216 | A | 7/1970 | Tolegian |
| 3,645,650 | A | 2/1972 | Laing |
| 3,668,670 | A | 6/1972 | Andersen |
| 3,684,992 | A | 8/1972 | Huguet et al. |
| 3,690,393 | A | 9/1972 | Guy |
| 3,696,258 | A | 10/1972 | Anderson et al. |
| 3,790,197 | A | 2/1974 | Parker |
| 3,791,309 | A | 2/1974 | Baermann |
| 3,802,034 | A | 4/1974 | Bookless |
| 3,803,433 | A | 4/1974 | Ingenito |
| 3,808,577 | A | 4/1974 | Mathauder |
| 3,836,801 | A | 9/1974 | Yamashita et al. |
| 3,845,430 | A | 10/1974 | Petkewicz et al. |
| 3,893,059 | A | 7/1975 | Nowak |
| 3,976,316 | A | 8/1976 | Laby |
| 4,079,558 | A | 3/1978 | Gorham |
| 4,117,431 | A | 9/1978 | Eicher |
| 4,129,846 | A | 12/1978 | Yablochnikov |
| 4,209,905 | A | 7/1980 | Gillings |
| 4,222,489 | A | 9/1980 | Hutter |
| 4,296,394 | A | 10/1981 | Ragheb |
| 4,340,833 | A | 7/1982 | Sudo et al. |
| 4,352,960 | A | 10/1982 | Dormer et al. |
| 4,355,236 | A | 10/1982 | Holsinger |
| 4,399,595 | A | 8/1983 | Yoon et al. |
| 4,416,127 | A | 11/1983 | Gomez-Olea Naveda |
| 4,451,811 | A | 5/1984 | Hoffman |
| 4,453,294 | A | 6/1984 | Morita |
| 4,517,483 | A | 5/1985 | Hucker et al. |
| 4,535,278 | A | 8/1985 | Asakawa |
| 4,547,756 | A | 10/1985 | Miller et al. |
| 4,629,131 | A | 12/1986 | Podell |
| 4,645,283 | A | 2/1987 | Macdonald et al. |
| 4,680,494 | A | 7/1987 | Grosjean |
| 4,764,743 | A | 8/1988 | Leupold et al. |
| 4,808,955 | A | 2/1989 | Godkin et al. |
| 4,837,539 | A | 6/1989 | Baker |
| 4,849,749 | A | 7/1989 | Fukamachi et al. |
| 4,862,128 | A | 8/1989 | Leupold |
| 4,893,103 | A | 1/1990 | Leupold |
| 4,912,727 | A | 3/1990 | Schubert |
| 4,941,236 | A | 7/1990 | Sherman et al. |
| 4,956,625 | A | 9/1990 | Cardone et al. |
| 4,980,593 | A | 12/1990 | Edmundson |
| 4,993,950 | A | 2/1991 | Mensor, Jr. |
| 4,994,778 | A | 2/1991 | Leupold |
| 4,996,457 | A | 2/1991 | Hawsey et al. |
| 5,013,949 | A | 5/1991 | Mabe, Jr. |
| 5,020,625 | A | 6/1991 | Yamauchi et al. |
| 5,050,276 | A | 9/1991 | Pemberton |
| 5,062,855 | A | 11/1991 | Rincoe |
| 5,123,843 | A | 6/1992 | Van der Zel et al. |
| 5,179,307 | A | 1/1993 | Porter |
| 5,190,325 | A | 3/1993 | Doss-Desouza |
| 5,213,307 | A | 5/1993 | Perrilat-Amede |
| 5,302,929 | A | 4/1994 | Kovacs |
| 5,309,680 | A | 5/1994 | Kiel |
| 5,345,207 | A * | 9/1994 | Gebele ............... H01J 37/3408 204/298.16 |
| 5,349,258 | A | 9/1994 | Leupold et al. |
| 5,367,891 | A | 11/1994 | Furuyama |
| 5,383,049 | A | 1/1995 | Carr |
| 5,394,132 | A | 2/1995 | Poil |
| 5,399,933 | A | 3/1995 | Tsai |

(56) References Cited

U.S. PATENT DOCUMENTS

| | | |
|---|---|---|
| 5,425,763 A | 6/1995 | Stemmann |
| 5,440,997 A | 8/1995 | Crowley |
| 5,461,386 A | 10/1995 | Knebelkamp |
| 5,485,435 A | 1/1996 | Matsuda et al. |
| 5,492,572 A | 2/1996 | Schroeder et al. |
| 5,495,221 A | 2/1996 | Post |
| 5,512,732 A | 4/1996 | Yagnik et al. |
| 5,570,084 A | 10/1996 | Ritter et al. |
| 5,582,522 A | 12/1996 | Johnson |
| 5,604,960 A | 2/1997 | Good |
| 5,631,093 A | 5/1997 | Perry et al. |
| 5,631,618 A | 5/1997 | Trumper et al. |
| 5,633,555 A | 5/1997 | Ackermann et al. |
| 5,635,889 A * | 6/1997 | Stelter .................. H01F 7/0278 335/306 |
| 5,637,972 A | 6/1997 | Randall et al. |
| 5,730,155 A | 3/1998 | Allen |
| 5,742,036 A | 4/1998 | Schramm, Jr. et al. |
| 5,759,054 A | 6/1998 | Apadafore |
| 5,788,493 A | 8/1998 | Tanaka et al. |
| 5,838,304 A | 11/1998 | Hall |
| 5,852,393 A | 12/1998 | Reznik et al. |
| 5,886,609 A * | 3/1999 | Stelter .................. H01F 7/0278 335/296 |
| 5,935,155 A | 8/1999 | Humayun et al. |
| 5,956,778 A | 9/1999 | Godoy |
| 5,983,406 A | 11/1999 | Meyerrose |
| 6,000,484 A | 12/1999 | Zoretich et al. |
| 6,039,759 A | 3/2000 | Carpentier et al. |
| 6,047,456 A | 4/2000 | Yao et al. |
| 6,072,251 A | 6/2000 | Markle |
| 6,074,420 A | 6/2000 | Eaton |
| 6,104,108 A | 8/2000 | Hazelton et al. |
| 6,115,849 A | 9/2000 | Meyerrose |
| 6,118,271 A | 9/2000 | Ely et al. |
| 6,120,283 A | 9/2000 | Cousins |
| 6,125,955 A | 10/2000 | Zoretich et al. |
| 6,142,779 A | 11/2000 | Siegel et al. |
| 6,170,131 B1 | 1/2001 | Shin |
| 6,187,041 B1 | 2/2001 | Garonzik |
| 6,188,147 B1 | 2/2001 | Hazelton et al. |
| 6,205,012 B1 | 3/2001 | Lear |
| 6,208,489 B1 | 3/2001 | Marchon |
| 6,210,033 B1 | 4/2001 | Karkos, Jr. et al. |
| 6,224,374 B1 | 5/2001 | Mayo |
| 6,234,833 B1 | 5/2001 | Tsai et al. |
| 6,241,069 B1 | 6/2001 | Mazur et al. |
| 6,273,918 B1 | 8/2001 | Yuhasz et al. |
| 6,275,778 B1 | 8/2001 | Shimada et al. |
| 6,285,097 B1 | 9/2001 | Hazelton et al. |
| 6,387,096 B1 | 5/2002 | Hyde, Jr. |
| 6,422,533 B1 | 7/2002 | Harms |
| 6,457,179 B1 | 10/2002 | Prendergast |
| 6,467,326 B1 | 10/2002 | Garrigus |
| 6,535,092 B1 | 3/2003 | Hurley et al. |
| 6,540,515 B1 | 4/2003 | Tanaka |
| 6,561,815 B1 | 5/2003 | Schmidt |
| 6,599,321 B2 | 7/2003 | Hyde, Jr. |
| 6,607,304 B1 | 8/2003 | Lake et al. |
| 6,652,278 B2 | 11/2003 | Honkura et al. |
| 6,653,919 B2 | 11/2003 | Shih-Chung et al. |
| 6,720,698 B2 | 4/2004 | Galbraith |
| 6,747,537 B1 | 6/2004 | Mosteller |
| 6,821,126 B2 | 11/2004 | Neidlein |
| 6,841,910 B2 | 1/2005 | Gery |
| 6,842,332 B1 | 1/2005 | Rubenson et al. |
| 6,847,134 B2 | 1/2005 | Frissen et al. |
| 6,850,139 B1 | 2/2005 | Dettmann et al. |
| 6,862,748 B2 | 3/2005 | Prendergast |
| 6,864,773 B2 | 3/2005 | Perrin |
| 6,913,471 B2 | 7/2005 | Smith |
| 6,927,657 B1 | 8/2005 | Wu |
| 6,936,937 B2 | 8/2005 | Tu et al. |
| 6,954,968 B1 | 10/2005 | Sitbon |
| 6,971,147 B2 | 12/2005 | Halstead |
| 7,009,874 B2 | 3/2006 | Deak |
| 7,016,492 B2 | 3/2006 | Pan et al. |
| 7,031,160 B2 | 4/2006 | Tillotson |
| 7,033,400 B2 | 4/2006 | Currier |
| 7,038,565 B1 | 5/2006 | Chell |
| 7,065,860 B2 | 6/2006 | Aoki et al. |
| 7,066,739 B2 | 6/2006 | Mcleish |
| 7,066,778 B2 | 6/2006 | Kretzschmar |
| 7,097,461 B2 | 8/2006 | Neidlein |
| 7,101,374 B2 | 9/2006 | Hyde, Jr. |
| 7,135,792 B2 | 11/2006 | Devaney et al. |
| 7,137,727 B2 | 11/2006 | Joseph et al. |
| 7,186,265 B2 | 3/2007 | Sharkawy et al. |
| 7,224,252 B2 | 5/2007 | Meadow, Jr. et al. |
| 7,264,479 B1 | 9/2007 | Lee |
| 7,276,025 B2 | 10/2007 | Roberts et al. |
| 7,311,526 B2 | 12/2007 | Rohrbach et al. |
| 7,324,320 B2 | 1/2008 | Maurer et al. |
| 7,339,790 B2 | 3/2008 | Baker et al. |
| 7,344,380 B2 | 3/2008 | Neidlein et al. |
| 7,351,066 B2 | 4/2008 | DiFonzo et al. |
| 7,358,724 B2 | 4/2008 | Taylor et al. |
| 7,362,018 B1 | 4/2008 | Kulogo et al. |
| 7,364,433 B2 | 4/2008 | Neidlein |
| 7,381,181 B2 | 6/2008 | Lau et al. |
| 7,402,175 B2 | 7/2008 | Azar |
| 7,416,414 B2 | 8/2008 | Bozzone et al. |
| 7,438,726 B2 | 10/2008 | Erb |
| 7,444,683 B2 | 11/2008 | Prendergast et al. |
| 7,453,341 B1 | 11/2008 | Hildenbrand |
| 7,467,948 B2 | 12/2008 | Lindberg et al. |
| 7,498,914 B2 | 3/2009 | Miyashita et al. |
| 7,583,500 B2 | 9/2009 | Ligtenberg et al. |
| 7,637,746 B2 | 12/2009 | Lindberg et al. |
| 7,645,143 B2 | 1/2010 | Rohrbach et al. |
| 7,658,613 B1 | 2/2010 | Griffin et al. |
| 7,715,890 B2 | 5/2010 | Kim et al. |
| 7,750,524 B2 | 7/2010 | Sugimoto et al. |
| 7,762,817 B2 | 7/2010 | Ligtenberg et al. |
| 7,775,567 B2 | 8/2010 | Ligtenberg et al. |
| 7,796,002 B2 | 9/2010 | Hashimoto et al. |
| 7,799,281 B2 | 9/2010 | Cook et al. |
| 7,808,349 B2 | 10/2010 | Fullerton et al. |
| 7,812,697 B2 | 10/2010 | Fullerton et al. |
| 7,817,004 B2 | 10/2010 | Fullerton et al. |
| 7,828,556 B2 | 11/2010 | Rodrigues |
| 7,832,897 B2 | 11/2010 | Ku |
| 7,837,032 B2 | 11/2010 | Smeltzer |
| 7,839,246 B2 | 11/2010 | Fullerton et al. |
| 7,843,297 B2 | 11/2010 | Fullerton et al. |
| 7,868,721 B2 | 1/2011 | Fullerton et al. |
| 7,871,272 B2 | 1/2011 | Firman, II et al. |
| 7,874,856 B1 | 1/2011 | Schriefer et al. |
| 7,889,037 B2 | 2/2011 | Cho |
| 7,901,216 B2 | 3/2011 | Rohrbach et al. |
| 7,903,397 B2 | 3/2011 | McCoy |
| 7,905,626 B2 | 3/2011 | Shantha et al. |
| 7,997,906 B2 | 8/2011 | Ligtenberg et al. |
| 8,002,585 B2 | 8/2011 | Zhou |
| 8,009,001 B1 | 8/2011 | Cleveland |
| 8,050,714 B2 | 11/2011 | Fadell et al. |
| 8,078,224 B2 | 12/2011 | Fadell et al. |
| 8,078,776 B2 | 12/2011 | Novotney et al. |
| 8,087,939 B2 | 1/2012 | Rohrbach et al. |
| 8,099,964 B2 | 1/2012 | Saito et al. |
| 8,138,869 B1 | 3/2012 | Lauder et al. |
| 8,143,982 B1 | 3/2012 | Lauder et al. |
| 8,143,983 B1 | 3/2012 | Lauder et al. |
| 8,165,634 B2 | 4/2012 | Fadell et al. |
| 8,177,560 B2 | 5/2012 | Rohrbach et al. |
| 8,187,006 B2 | 5/2012 | Rudisill et al. |
| 8,190,205 B2 | 5/2012 | Fadell et al. |
| 8,242,868 B2 | 8/2012 | Lauder et al. |
| 8,253,518 B2 | 8/2012 | Lauder et al. |
| 8,264,310 B2 | 9/2012 | Lauder et al. |
| 8,264,314 B2 | 9/2012 | Sankar |
| 8,271,038 B2 | 9/2012 | Fadell et al. |
| 8,271,705 B2 | 9/2012 | Novotney et al. |
| 8,297,367 B2 | 10/2012 | Chen et al. |

(56) References Cited

U.S. PATENT DOCUMENTS

| | | | |
|---|---|---|---|
| 8,344,836 B2 | 1/2013 | Lauder et al. |
| 8,348,678 B2 | 1/2013 | Hardisty et al. |
| 8,354,767 B2 | 1/2013 | Pennander et al. |
| 8,390,411 B2 | 3/2013 | Lauder et al. |
| 8,390,412 B2 | 3/2013 | Lauder et al. |
| 8,390,413 B2 | 3/2013 | Lauder et al. |
| 8,395,465 B2 | 3/2013 | Lauder et al. |
| 8,398,409 B2 | 3/2013 | Schmidt |
| 8,435,042 B2 | 5/2013 | Rohrbach et al. |
| 8,454,372 B2 | 6/2013 | Lee |
| 8,467,829 B2 | 6/2013 | Fadell et al. |
| 8,497,753 B2 | 7/2013 | DiFonzo et al. |
| 8,514,042 B2 | 8/2013 | Lauder et al. |
| 8,535,088 B2 | 9/2013 | Gao et al. |
| 8,576,031 B2 | 11/2013 | Lauder et al. |
| 8,576,034 B2 | 11/2013 | Bilbrey et al. |
| 8,616,362 B1 | 12/2013 | Browne et al. |
| 8,648,679 B2 | 2/2014 | Lauder et al. |
| 8,665,044 B2 | 3/2014 | Lauder et al. |
| 8,665,045 B2 | 3/2014 | Lauder et al. |
| 8,690,582 B2 | 4/2014 | Rohrbach et al. |
| 8,702,316 B2 | 4/2014 | DiFonzo et al. |
| 8,734,024 B2 | 5/2014 | Isenhour et al. |
| 8,752,200 B2 | 6/2014 | Varshavsky et al. |
| 8,757,893 B1 | 6/2014 | Isenhour et al. |
| 8,770,857 B2 | 7/2014 | DiFonzo et al. |
| 8,774,577 B2 | 7/2014 | Benjamin et al. |
| 8,781,273 B2 | 7/2014 | Benjamin et al. |
| 2002/0125977 A1 | 9/2002 | VanZoest |
| 2003/0136837 A1 | 7/2003 | Amon et al. |
| 2003/0170976 A1 | 9/2003 | Molla et al. |
| 2003/0179880 A1 | 9/2003 | Pan et al. |
| 2003/0187510 A1 | 10/2003 | Hyde |
| 2004/0003487 A1 | 1/2004 | Reiter |
| 2004/0244636 A1 | 12/2004 | Meadow et al. |
| 2004/0251759 A1 | 12/2004 | Hirzel |
| 2005/0102802 A1 | 5/2005 | Sitbon et al. |
| 2005/0196484 A1 | 9/2005 | Khoshnevis |
| 2005/0231046 A1 | 10/2005 | Aoshima |
| 2005/0240263 A1 | 10/2005 | Fogarty et al. |
| 2005/0263549 A1 | 12/2005 | Scheiner |
| 2005/0283839 A1 | 12/2005 | Cowburn |
| 2006/0066428 A1 | 3/2006 | McCarthy et al. |
| 2006/0189259 A1 | 8/2006 | Park et al. |
| 2006/0198047 A1 | 9/2006 | Xue et al. |
| 2006/0198998 A1 | 9/2006 | Raksha et al. |
| 2006/0214756 A1 | 9/2006 | Elliott et al. |
| 2006/0290451 A1 | 12/2006 | Prendergast et al. |
| 2006/0293762 A1 | 12/2006 | Schulman et al. |
| 2007/0072476 A1 | 3/2007 | Milan |
| 2007/0075594 A1 | 4/2007 | Sadler |
| 2007/0103266 A1 | 5/2007 | Wang et al. |
| 2007/0138806 A1 | 6/2007 | Ligtenberg et al. |
| 2007/0255400 A1 | 11/2007 | Parravicini et al. |
| 2007/0267929 A1 | 11/2007 | Pulnikov et al. |
| 2008/0119250 A1 | 5/2008 | Cho et al. |
| 2008/0139261 A1 | 6/2008 | Cho et al. |
| 2008/0174392 A1 | 7/2008 | Cho |
| 2008/0181804 A1 | 7/2008 | Tanigawa et al. |
| 2008/0186683 A1 | 8/2008 | Ligtenberg et al. |
| 2008/0218299 A1 | 9/2008 | Arnold |
| 2008/0224806 A1 | 9/2008 | Ogden et al. |
| 2008/0272868 A1 | 11/2008 | Prendergast et al. |
| 2008/0282517 A1 | 11/2008 | Claro |
| 2009/0021333 A1 | 1/2009 | Fiedler |
| 2009/0209173 A1 | 8/2009 | Arledge et al. |
| 2009/0250576 A1 | 10/2009 | Fullerton et al. |
| 2009/0251256 A1 | 10/2009 | Fullerton et al. |
| 2009/0254196 A1 | 10/2009 | Cox et al. |
| 2009/0278642 A1 | 11/2009 | Fullerton et al. |
| 2009/0289090 A1 | 11/2009 | Fullerton et al. |
| 2009/0289749 A1 | 11/2009 | Fullerton et al. |
| 2009/0292371 A1 | 11/2009 | Fullerton et al. |
| 2010/0033280 A1 | 2/2010 | Bird et al. |
| 2010/0126857 A1 | 5/2010 | Polwart et al. |
| 2010/0134916 A1 | 6/2010 | Kawabe |
| 2010/0167576 A1 | 7/2010 | Zhou |
| 2011/0026203 A1 | 2/2011 | Ligtenberg et al. |
| 2011/0051288 A1 | 3/2011 | Contreras et al. |
| 2011/0085157 A1 | 4/2011 | Bloss et al. |
| 2011/0101088 A1 | 5/2011 | Marguerettaz et al. |
| 2011/0194083 A1* | 8/2011 | Sprague et al. ...... G02B 26/085 353/98 |
| 2011/0210636 A1 | 9/2011 | Kuhlmann-Wilsdorf |
| 2011/0234344 A1 | 9/2011 | Fullerton et al. |
| 2011/0248806 A1 | 10/2011 | Michael |
| 2011/0279206 A1 | 11/2011 | Fullerton et al. |
| 2012/0007704 A1 | 1/2012 | Nerl |
| 2012/0064309 A1 | 3/2012 | Kwon et al. |
| 2012/0085753 A1 | 4/2012 | Fitch et al. |
| 2012/0235519 A1 | 9/2012 | Dyer et al. |
| 2013/0001745 A1 | 1/2013 | Iwaki |
| 2013/0186209 A1 | 7/2013 | Herbst |
| 2013/0186473 A1 | 7/2013 | Mankame et al. |
| 2013/0186807 A1 | 7/2013 | Browne et al. |
| 2013/0187538 A1 | 7/2013 | Herbst |
| 2013/0192860 A1 | 8/2013 | Puzio el al |
| 2013/0207758 A1 | 8/2013 | Browne et al. |
| 2013/0252375 A1 | 9/2013 | Yi et al. |
| 2013/0256274 A1 | 10/2013 | Faulkner |
| 2013/0270056 A1 | 10/2013 | Mankame et al. |
| 2013/0305705 A1 | 11/2013 | Ac et al. |
| 2013/0341137 A1 | 12/2013 | Mandame et al. |
| 2014/0044972 A1 | 2/2014 | Menassa et al. |
| 2014/0072261 A1 | 3/2014 | Isenhour et al. |
| 2014/0152252 A1 | 6/2014 | Wood et al. |
| 2014/0205235 A1 | 7/2014 | Benjamin et al. |
| 2014/0221741 A1 | 8/2014 | Wang et al. |

FOREIGN PATENT DOCUMENTS

| | | |
|---|---|---|
| EP | 0345554 | 12/1989 |
| EP | 0545737 A1 | 6/1993 |
| FR | 823395 A | 1/1938 |
| GB | 1495677 A | 12/1977 |
| JP | 54-152200 | 11/1979 |
| JP | S57-55908 A | 4/1982 |
| JP | S57-189423 A | 12/1982 |
| JP | 60091011 U | 5/1985 |
| JP | 60-221238 A | 11/1985 |
| JP | 64-30444 A | 2/1989 |
| JP | 2001-328483 A | 11/2001 |
| JP | 2008035676 A | 2/2008 |
| JP | 2008165974 A | 7/2008 |
| JP | 05-038123 B2 | 10/2012 |
| WO | 02/31945 A2 | 4/2002 |
| WO | 2007/081830 A2 | 7/2007 |
| WO | 2009/124030 A1 | 10/2009 |
| WO | 2010/141324 A1 | 12/2010 |

OTHER PUBLICATIONS

Atallah, K., Howe, D. 2001, "A Novel High-Performance Magnetic Gear", IEEE Transactions on Magnetics, vol. 37, No. 4, Jul. 2001, p. 2844-46.

Bassani, R., 2007, "Dynamic Stability of Passive Magnetic Bearings", Nonlinear Dynamics, V. 50, p. 161-68.

BNS 33 Range, Magnetic safety sensors, Rectangular design, http://www.farnell.com/datasheets/36449.pdf, 3 pages, date unknown.

Boston Gear 221S-4, One-stage Helical Gearbox, http://www.bostongearcom/pdf/product_sections/200_series_helical.pdf, referenced Jun. 2010.

Charpentier et al., 2001, "Mechanical Behavior of Axially Magnetized Permanent-Magnet Gears", IEEE Transactions on Magnetics, vol. 37, No. 3, May 2001, p. 1110-17.

Chau et al., 2008, "Transient Analysis of Coaxial Magnetic Gears Using Finite Element Comodeling", Journal of Applied Physics, vol. 103.

Choi et al., 2010, "Optimization of Magnetization Directions in a 3-D Magnetic Structure", IEEE Transactions on Magnetics, vol. 46, No. 6, Jun. 2010, p. 1603-06.

(56) References Cited

OTHER PUBLICATIONS

Correlated Magnetics Research, 2009, Online Video, "Innovative Magnetics Research in Huntsville", http://www.youtube.com/watch?v=m4m81JjZCJo.
Correlated Magnetics Research, 2009, Online Video, "Non-Contact Attachment Utilizing Permanent Magnets", http://www.youtube.com/watch?v=3xUm25CNNgQ.
Correlated Magnetics Research, 2010, Company Website, http://www.correlatedmagnetics.com.
Furlani 1996, "Analysis and optimization of synchronous magnetic couplings", J. Appl. Phys., vol. 79, No. 8, p. 4692.
Furlani 2001, "Permanent Magnet and Electromechanical Devices", Academic Press, San Diego.
Furlani, E.P., 2000, "Analytical analysis of magnetically coupled multipole cylinders", J. Phys. D: Appl. Phys., vol. 33, No. 1, p. 28-33.
General Electric DP 2.7 Wind Turbine Gearbox, http://www.gedrivetrain.com/insideDP27.cfm, referenced Jun. 2010.
Ha et al., 2002, "Design and Characteristic Analysis of Non-Contact Magnet Gear for Conveyor by Using Permanent Magnet", Conf. Record of the 2002 IEEE Industry Applications Conference, p. 1922-27.
Huang et al., 2008, "Development of a Magnetic Planetary Gearbox", IEEE Transactions on Magnetics, vol. 44, No. 3, p. 403-12.
International Search Report and Written Opinion dated Jun. 1, 2009, directed to counterpart application No. PCT/US2009/002027. (10 pages).
International Search Report and Written Opinion of the International Searching Authority issued in Application No. PCT/US12/61938 dated Feb. 26, 2013.
International Search Report and Written Opinion of the International Searching Authority issued in Application No. PCT/US2013/028095 dated May 13, 2013.
International Search Report and Written Opinion of the International Searching Authority issued in Application No. PCT/US2013/047986 dated Nov. 21, 2013.
International Search Report and Written Opinion, dated Apr. 8, 2011 issued in related International Application No. PCT/US2010/049410.
International Search Report and Written Opinion, dated Aug. 18, 2010, issued in related International Application No. PCT/US2010/036443.
International Search Report and Written Opinion, dated Jul. 13, 2010, issued in related International Application No. PCT/US2010/021612.
International Search Report and Written Opinion, dated May 14, 2009, issued in related International Application No. PCT/U52009/038925.
Jian et al., "Comparison of Coaxial Magnetic Gears With Different Topologies", IEEE Transactions on Magnetics, vol. 45, No. 10, Oct. 2009, p. 4526-29.
Jian, L., Chau, K.T., 2010, "A Coaxial Magnetic Gear With Halbach Permanent-Magnet Arrays", IEEE Transactions on Energy Conversion, vol. 25, No. 2, Jun. 2010, p. 319-28.
Jorgensen et al., "The Cycloid Permanent Magnetic Gear", IEEE Transactions on Industry Applications, vol. 44, No. 6, Nov./Dec. 2008, p. 1659-65.
Jorgensen et al., 2005, "Two dimensional model of a permanent magnet spur gear", Conf. Record of the 2005 IEEE Industry Applications Conference, p. 261-5.
Kim, "A future cost trends of magnetizer systems in Korea", Industrial Electronics, Control, and Instrumentation, 1996, vol. 2, Aug. 5, 1996, pp. 991-996.
Krasil'nikov et al., 2008, "Calculation of the Shear Force of Highly Coercive Permanent Magnets in Magnetic Systems With Consideration of Affiliation to a Certain Group Based on Residual Induction", Chemical and Petroleum Engineering, vol. 44, Nos. 7-8, p. 362-65.
Krasil'nikov et al., 2009, "Torque Determination for a Cylindrical Magnetic Clutch", Russian Engineering Research, vol. 29, No. 6, pp. 544-547.
Liu et al., 2009, "Design and Analysis of Interior-magnet Outer-rotor Concentric Magnetic Gears", Journal of Applied Physics, vol. 105.
Lorimer, W., Hartman, A., 1997, "Magnetization Pattern for Increased Coupling in Magnetic Clutches", IEEE Transactions on Magnetics, vol. 33, No. 5, Sep. 1997.
Mezani, S., Atallah, K., Howe, D., 2006, "A high-performance axial-field magnetic gear", Journal of Applied Physics vol. 99.
Mi, "Magnetreater/Charger Model 580" Magnetic Instruments Inc. Product specification, May 4, 2009, http//web.archive.org/web/20090504064511/http://www.maginst.com/specifications/580_mag netreater.htm, 2 pages.
Neugart PLE-160, One-Stage Planetary Gearbox, http://www.neugartusa.com/ple_160_gb.pdf, referenced Jun. 2010.
"Series BNS, Compatible Series AES Safety Controllers, http://www.schmersalusa.com/safety_controllers/drawingskes.Pdf, pp. 159-175, date unknown."
Series BNS-B20, Coded-Magnet Sensor Safety Door Handle, http://www.schmersalusa.com/catalog_pdfs/BNS_B20.pdf, 2pages, date unknown.
Series BNS333, Coded-Magnet Sensors with Integral Safety Control Module, http://www.schmersalusa.com/machine_guarding/coded_magnet/drawings/bns333.pdf, 2 pages, date unknown.
Tsurumoto 1992, "Basic Analysis on Transmitted Force of Magnetic Gear Using Permanent Magnet", IEEE Translation Journal on Magnetics in Japan, Vo 7, No. 6, Jun. 1992, p. 447-52.
United States Office Action issued in U.S. Appl. No. 13/104,393 dated Apr. 4, 2013.
United States Office Action issued in U.S. Appl. No. 13/236,413 dated Jun. 6, 2013.
United States Office Action issued in U.S. Appl. No. 13/246,584 dated May 16, 2013.
United States Office Action issued in U.S. Appl. No. 13/246,584 dated Oct. 15, 2013.
United States Office Action issued in U.S. Appl. No. 13/374,074 dated Feb. 21, 2013.
United States Office Action issued in U.S. Appl. No. 13/430,219 dated Aug. 13, 2013.
United States Office Action issued in U.S. Appl. No. 13/470,994 dated Aug. 8, 2013.
United States Office Action issued in U.S. Appl. No. 13/470,994 dated Jan. 7, 2013.
United States Office Action issued in U.S. Appl. No. 13/470,994 dated Nov. 8, 2013.
United States Office Action issued in U.S. Appl. No. 13/529,520 dated Sep. 28, 2012.
United States Office Action issued in U.S. Appl. No. 13/530,893 dated Mar. 22, 2013.
United States Office Action issued in U.S. Appl. No. 13/530,893 dated Oct. 29, 2013.
United States Office Action issued in U.S. Appl. No. 13/718,839 dated Dec. 16, 2013.
United States Office Action issued in U.S. Appl. No. 13/855,519 dated Jul. 17, 2013.
United States Office Action issued in U.S. Appl. No. 13/928,126 dated Oct. 11, 2013.
United States Office Action, dated Aug. 26, 2011, issued in counterpart U.S. Appl. No. 12/206,270.
United States Office Action, dated Feb. 2, 2011, issued in counterpart U.S. Appl. No. 12/476,952.
United States Office Action, dated Mar. 12, 2012, issued in counterpart U.S. Appl. No. 12/206,270.
United States Office Action, dated Mar. 9, 2012, issued in counterpart U.S. Appl. No. 13/371,280.
United States Office Action, dated Oct. 12, 2011, issued in counterpart U.S. Appl. No. 12/476,952.
Wikipedia, "Barker Code", Web article, last modified Aug. 2, 2008, 2 pages.
Wikipedia, "Bitter Electromagnet", Web article, last modified Aug. 2011, 1 page.
Wikipedia, "Costas Array", Web article, last modified Oct. 7, 2008, 4 pages.
Wikipedia, "Gold Code", Web article, last modified Jul. 27, 2008, 1 page.

(56) References Cited

OTHER PUBLICATIONS

Wikipedia, "Golomb Ruler", Web article, last modified Nov. 4, 2008, 3 pages.
Wikipedia, "Kasami Code", Web article, last modified Jun. 11, 2008, 1 page.
Wikipedia, "Linear feedback shift register", Web article, last modified Nov. 11, 2008, 6 pages.
Wikipedia, "Walsh Code", Web article, last modified Sep. 17, 2008, 2 pages.

* cited by examiner

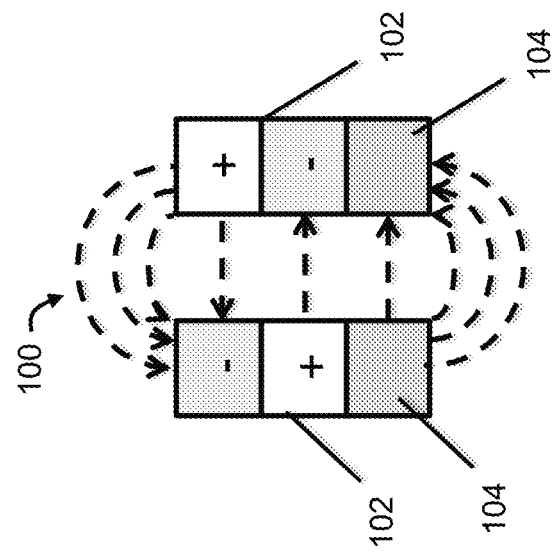
FIG. 2B (Top View)
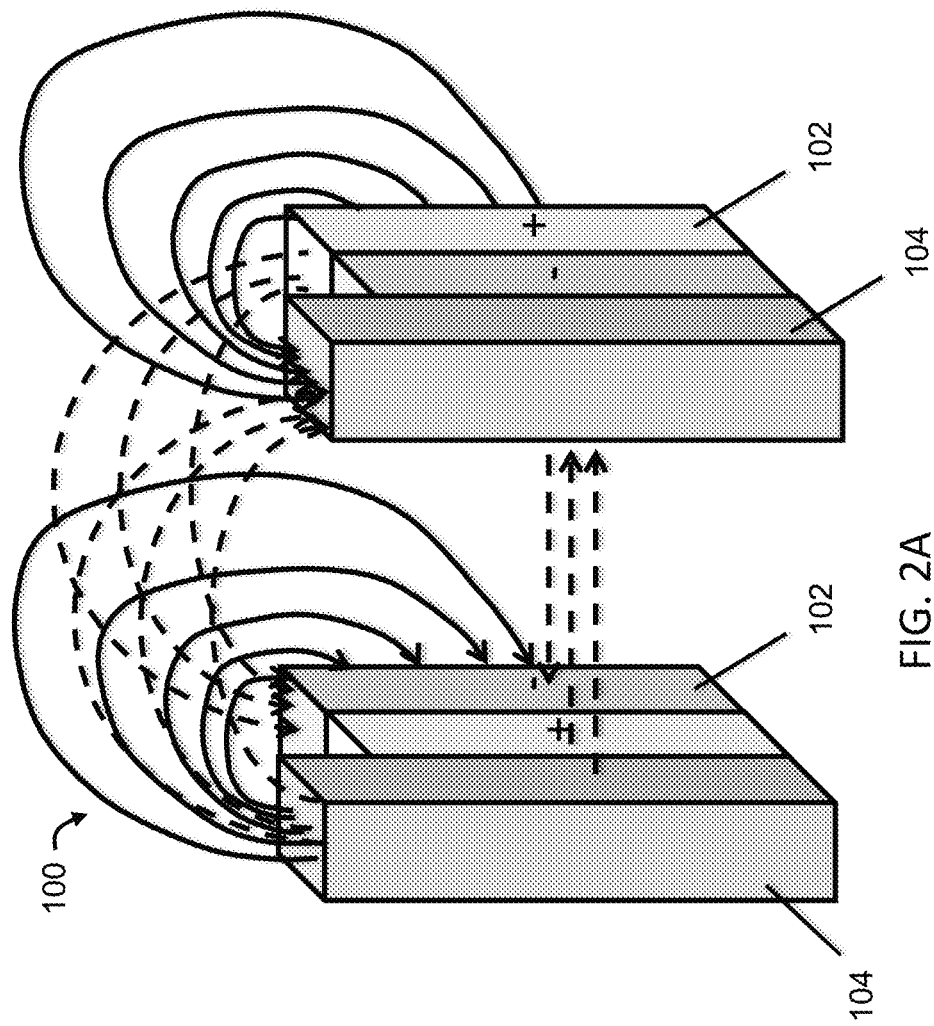
FIG. 2A

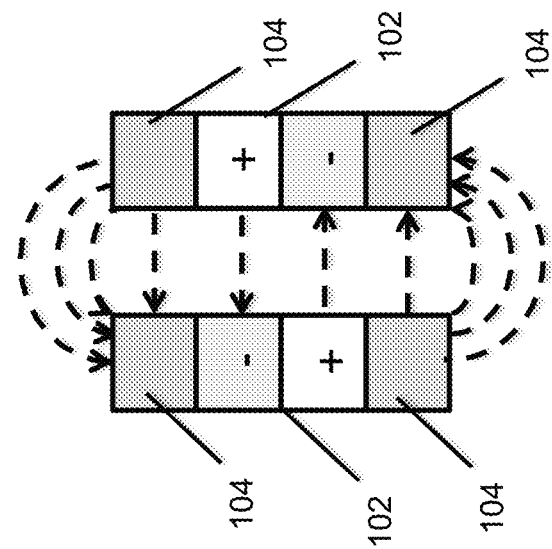
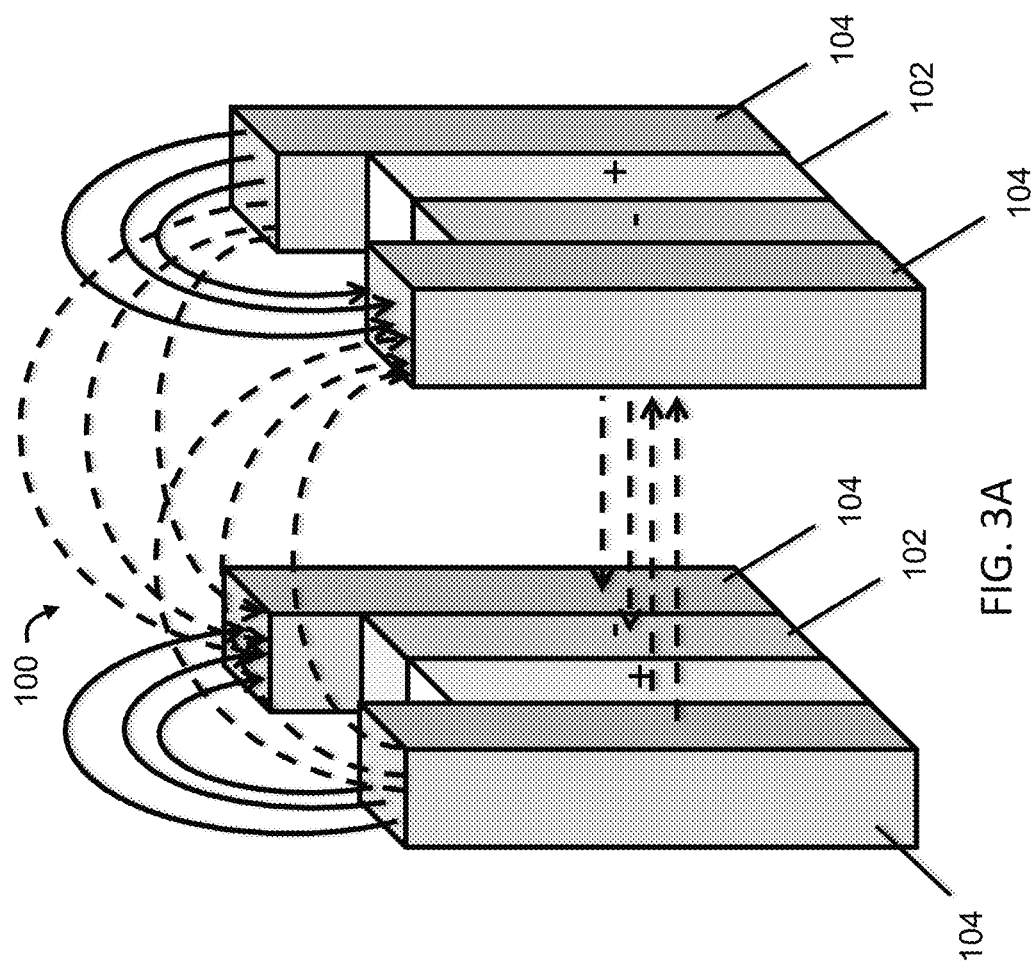

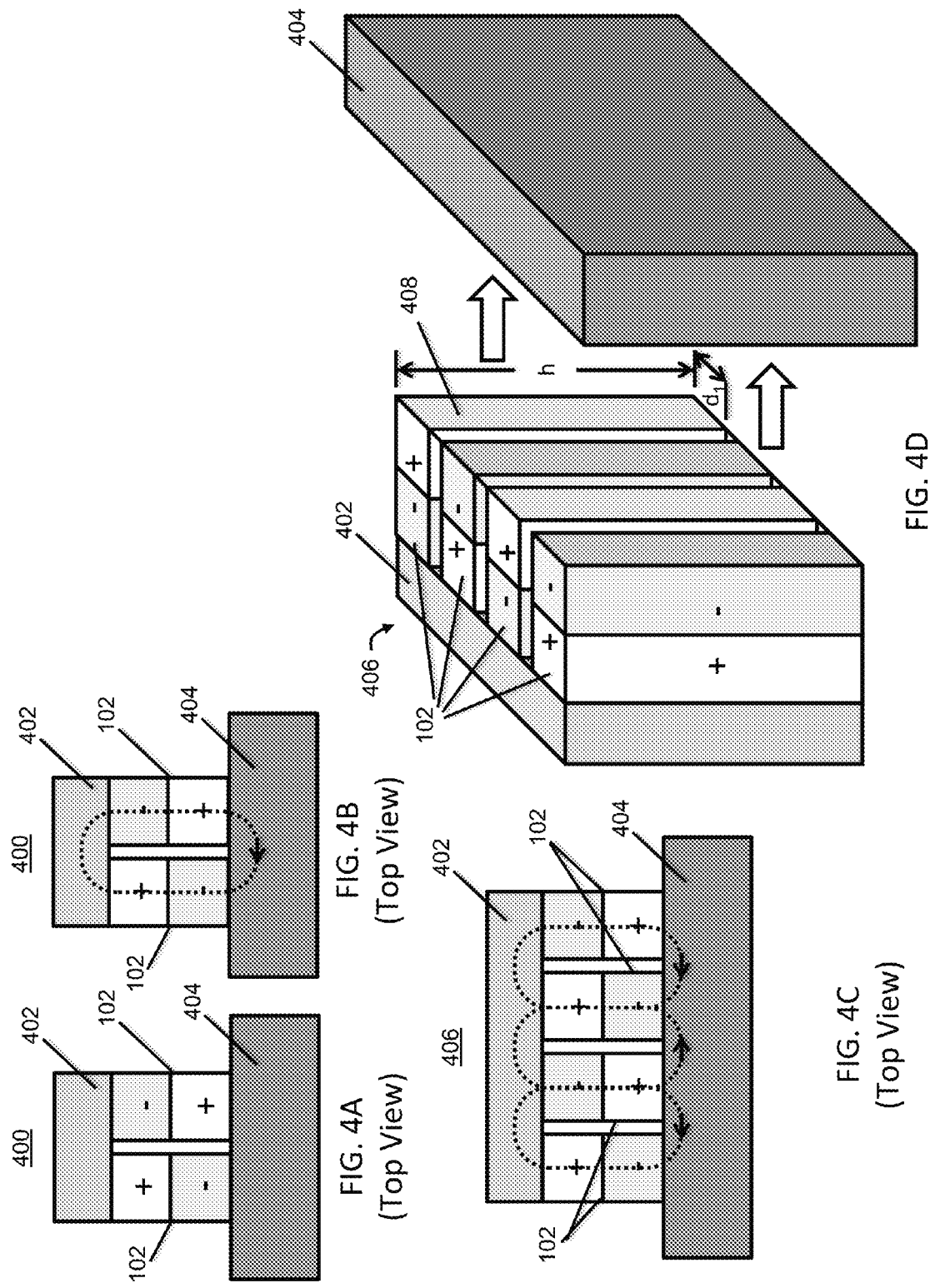

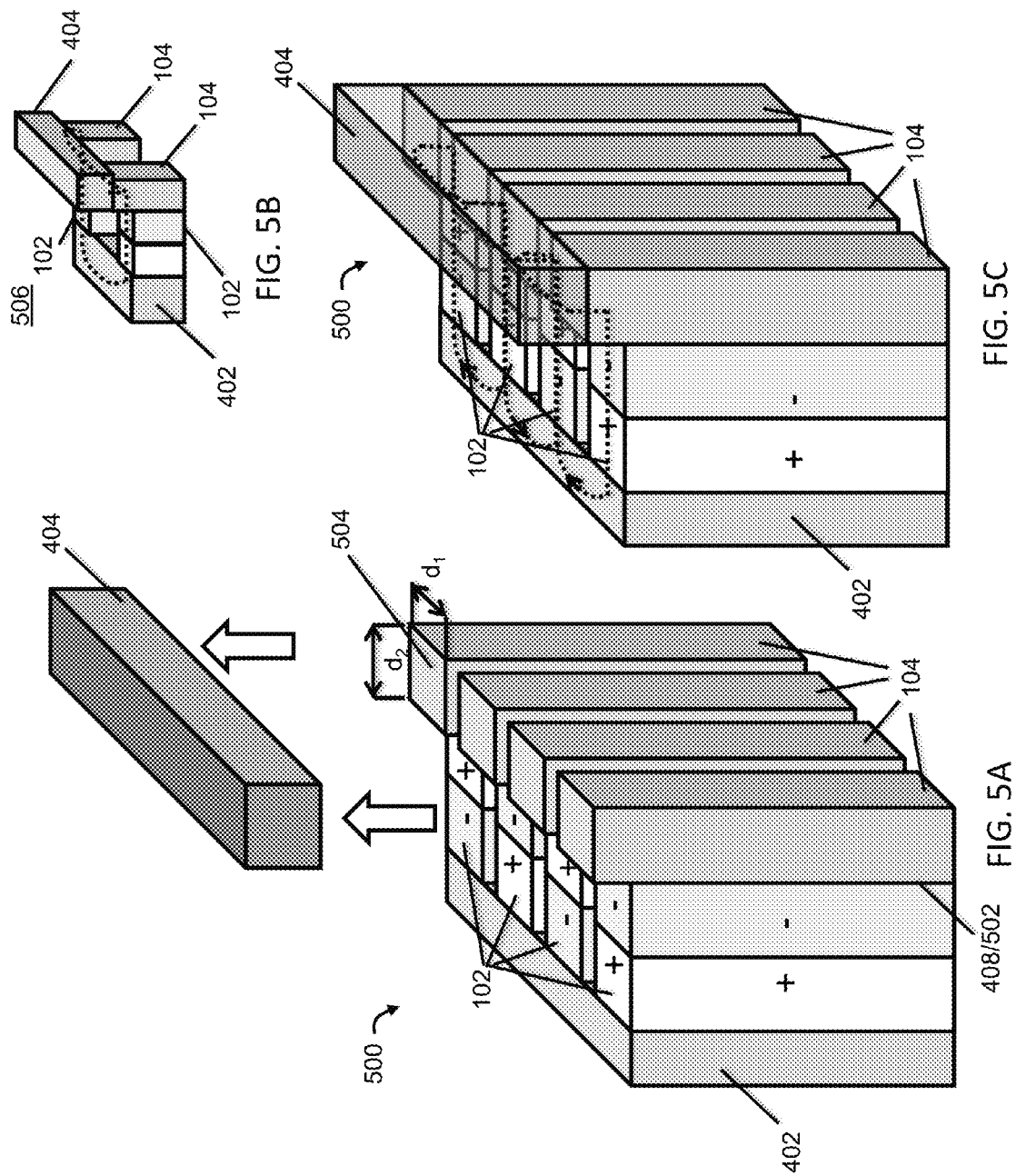

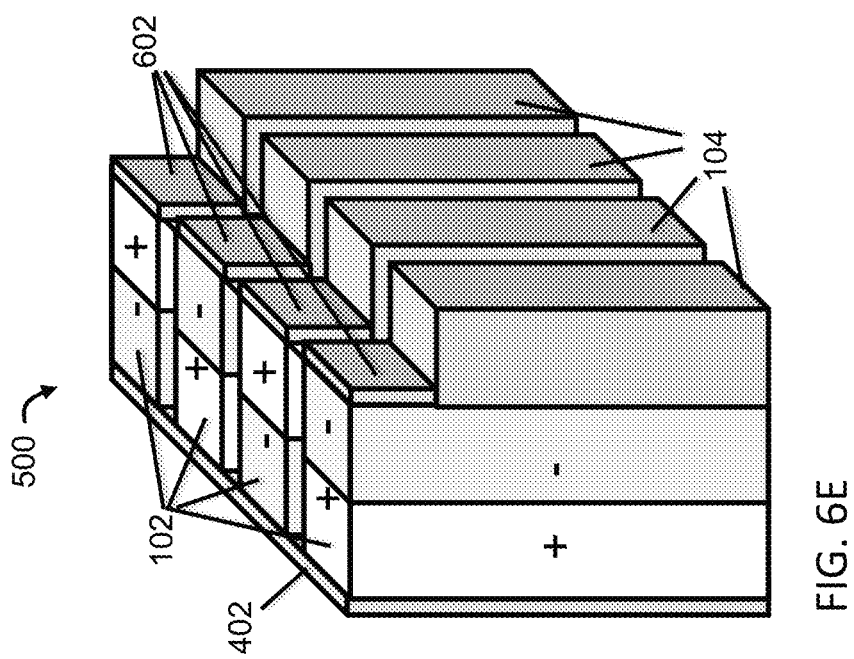

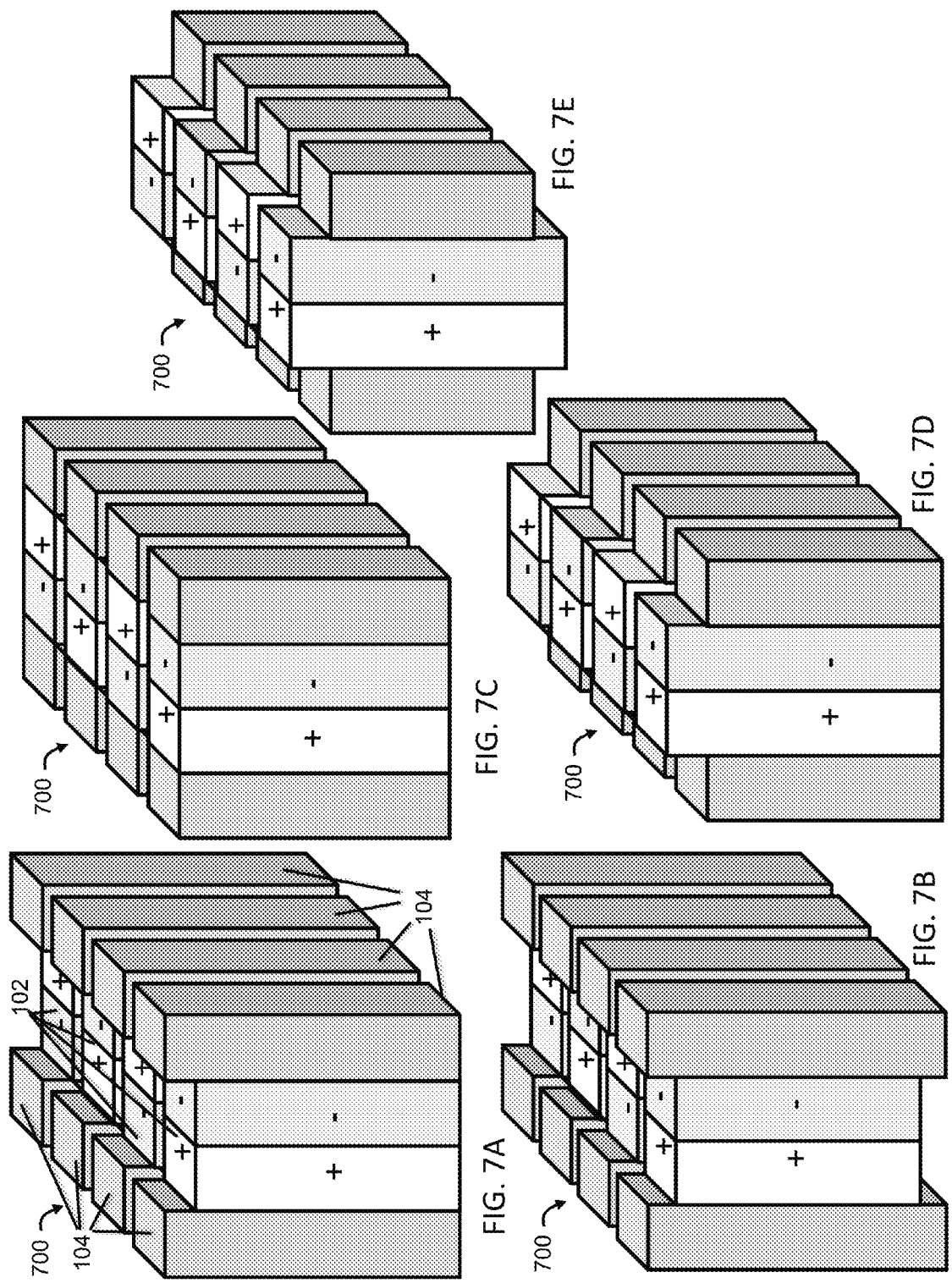

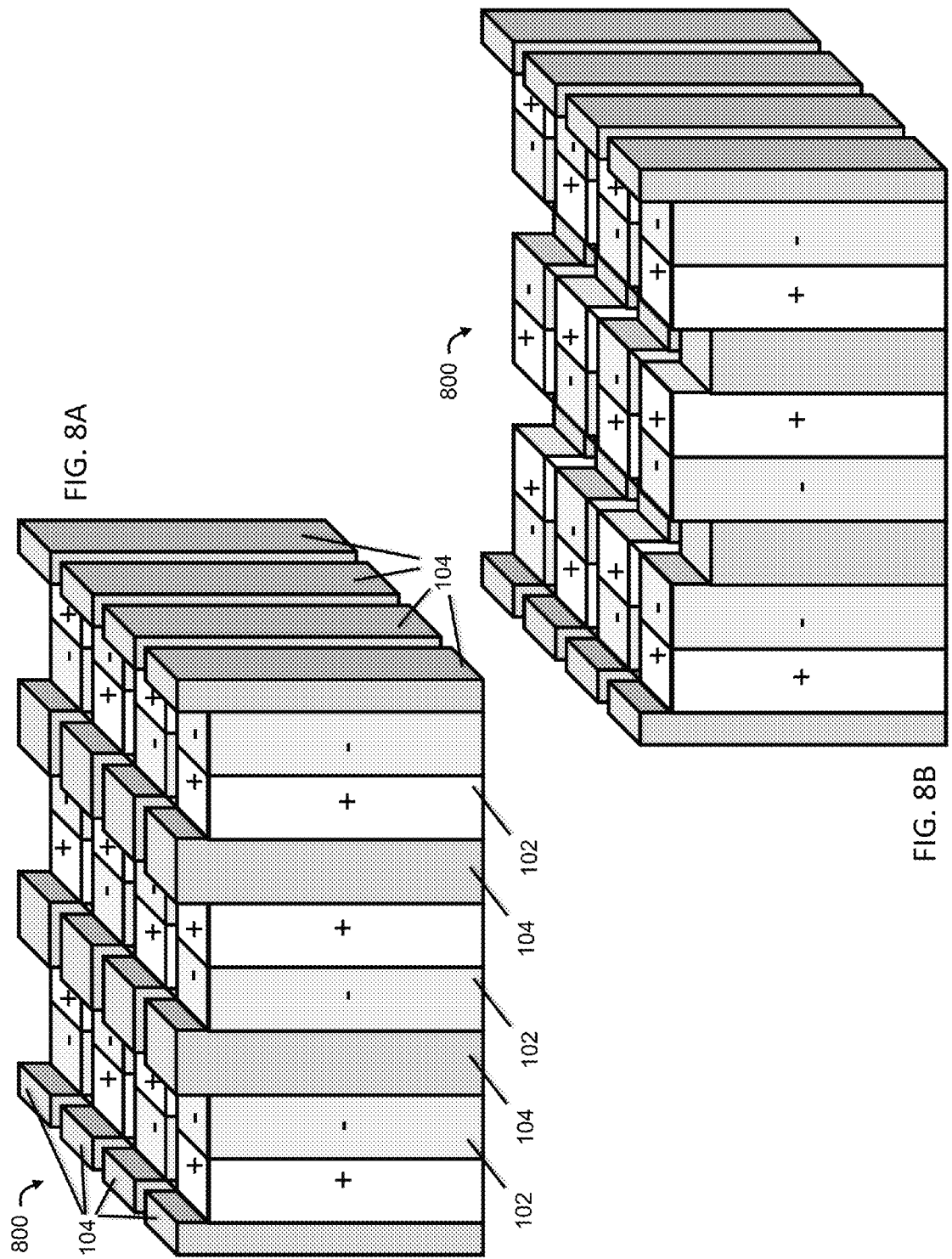

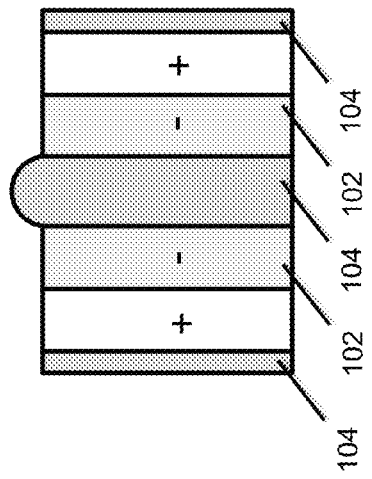
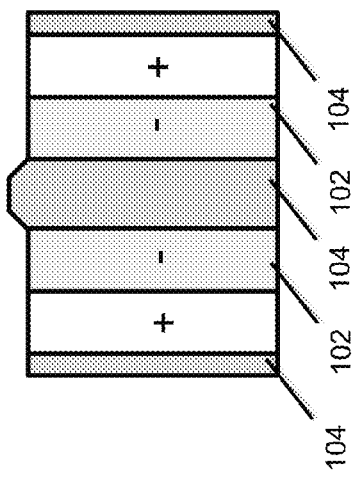
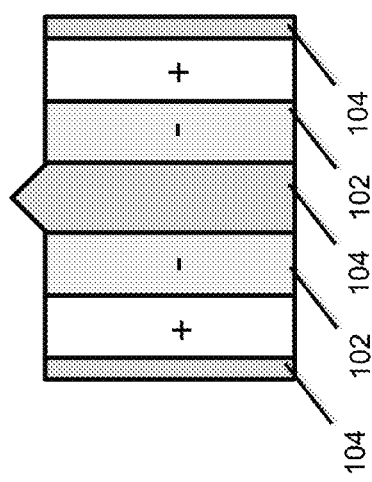
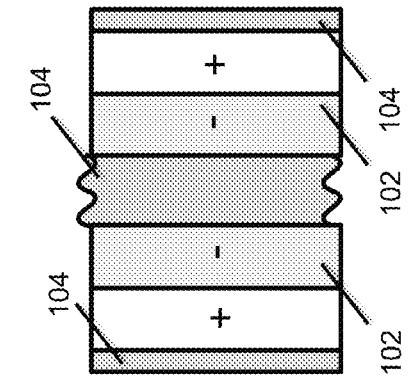
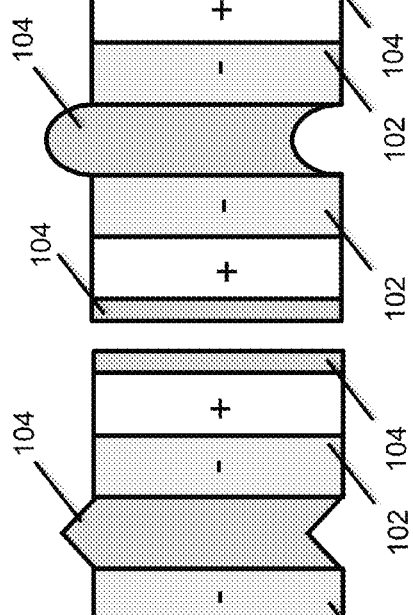
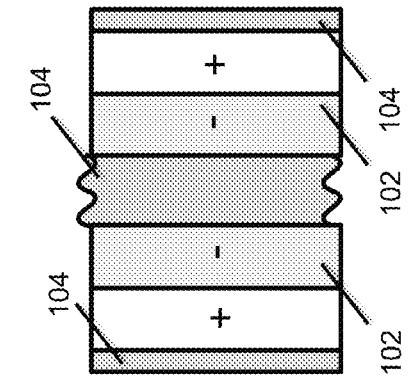

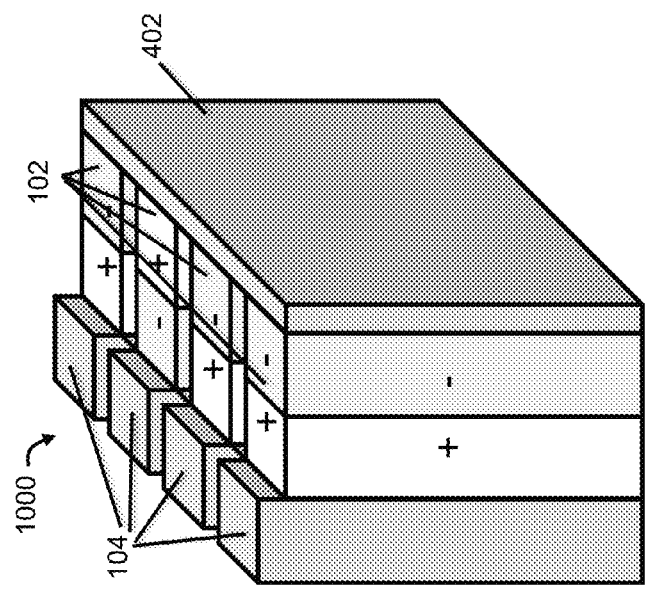
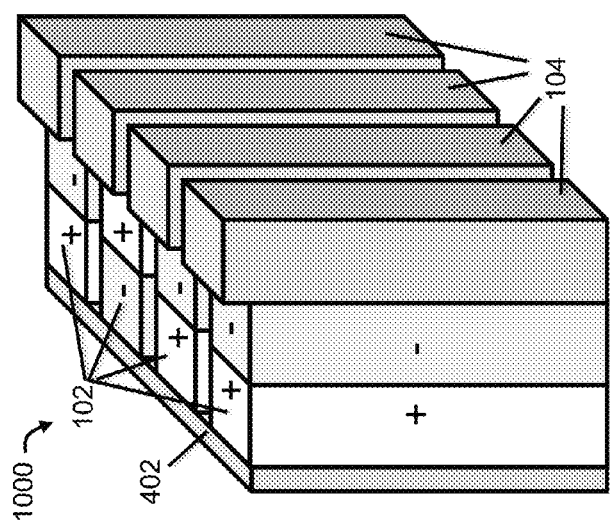
FIG. 10A
FIG. 10B

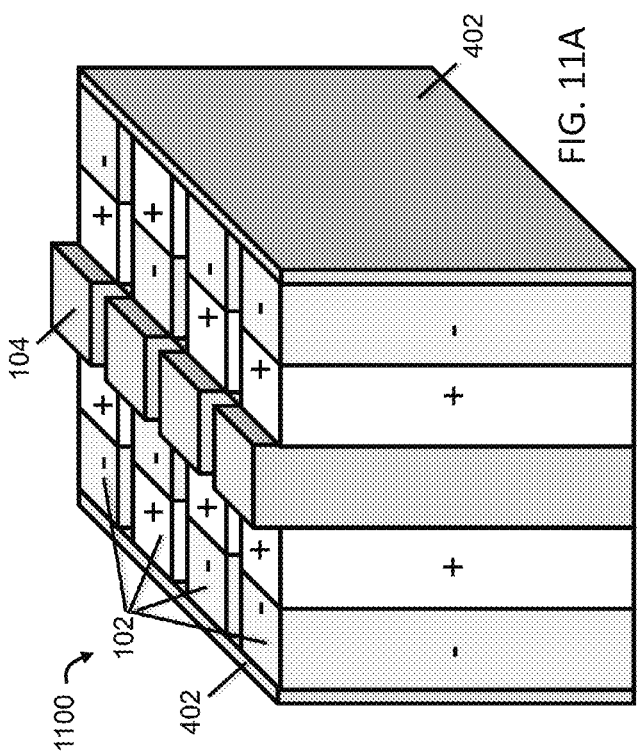
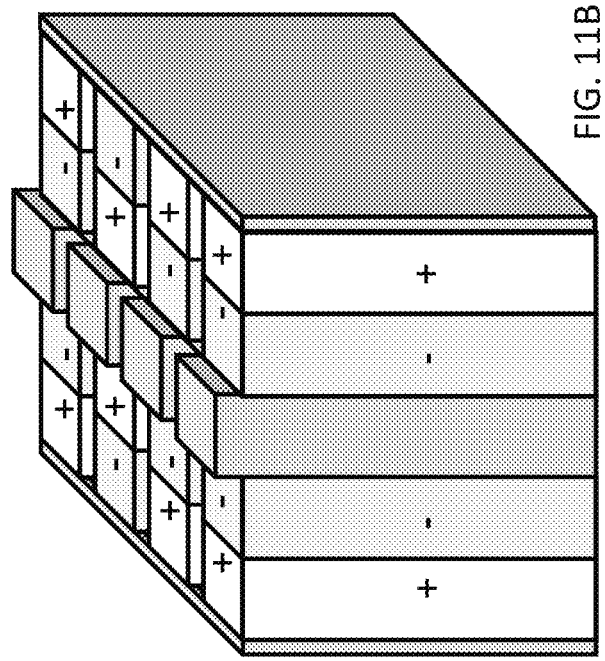

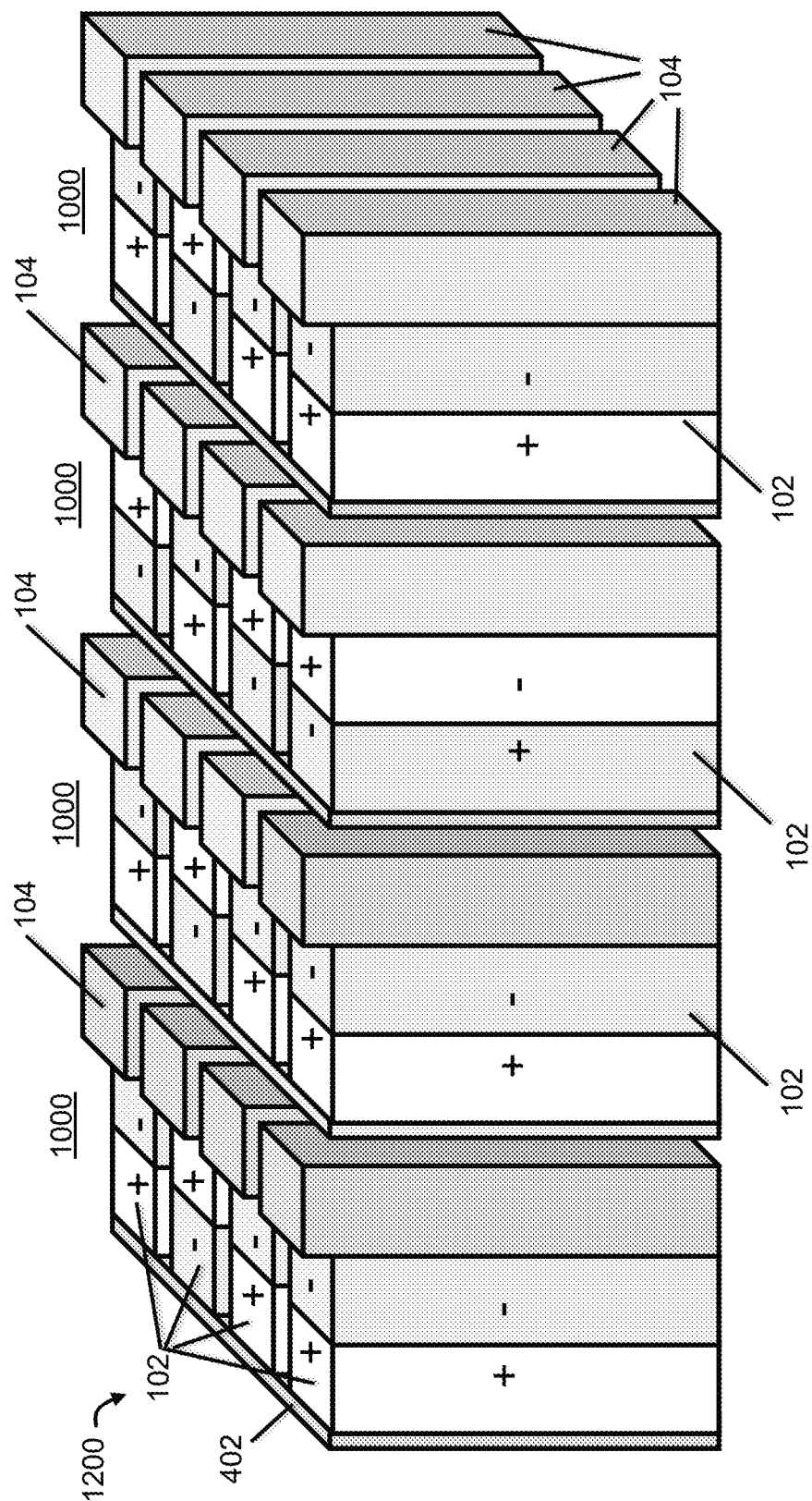

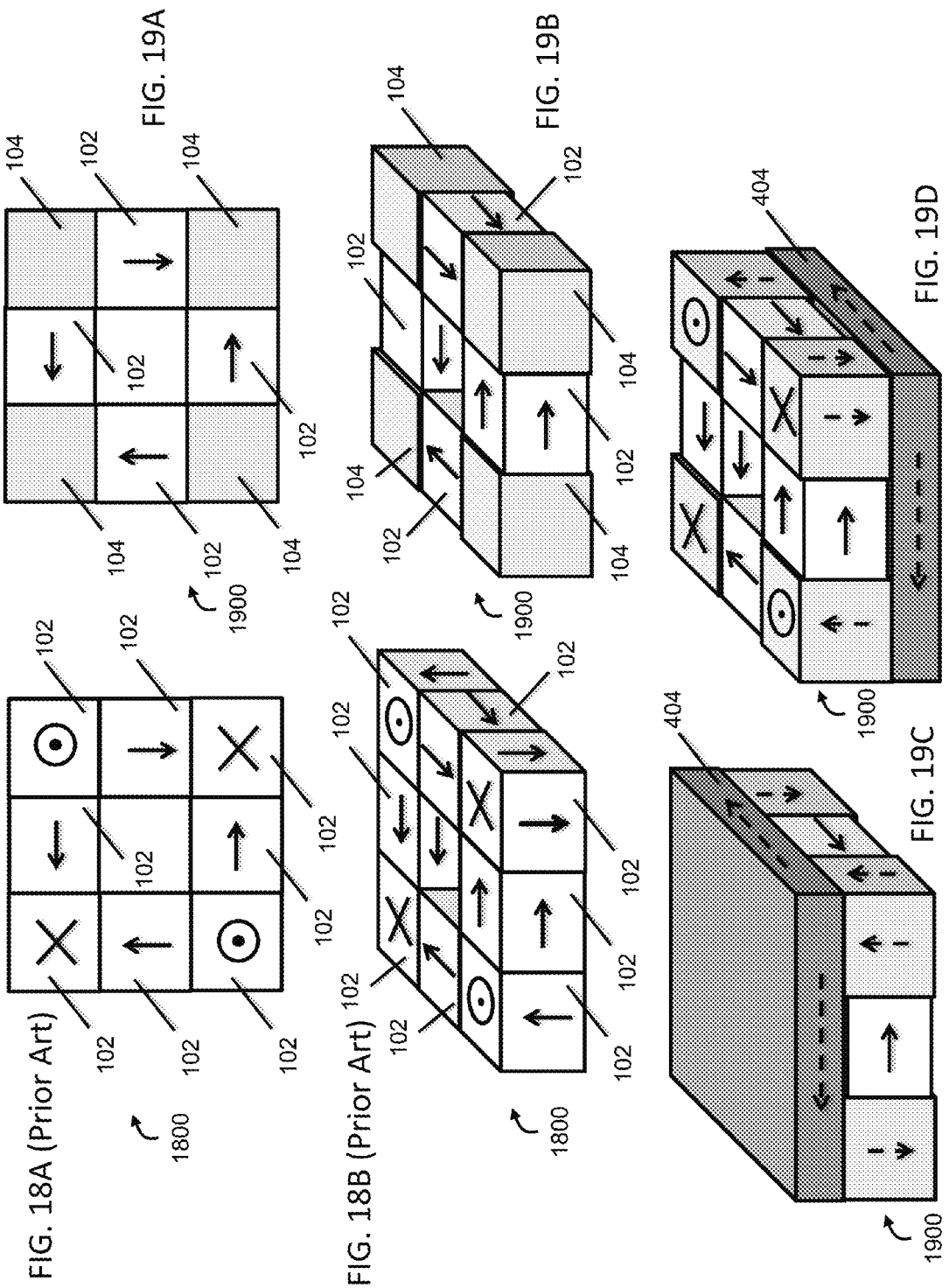

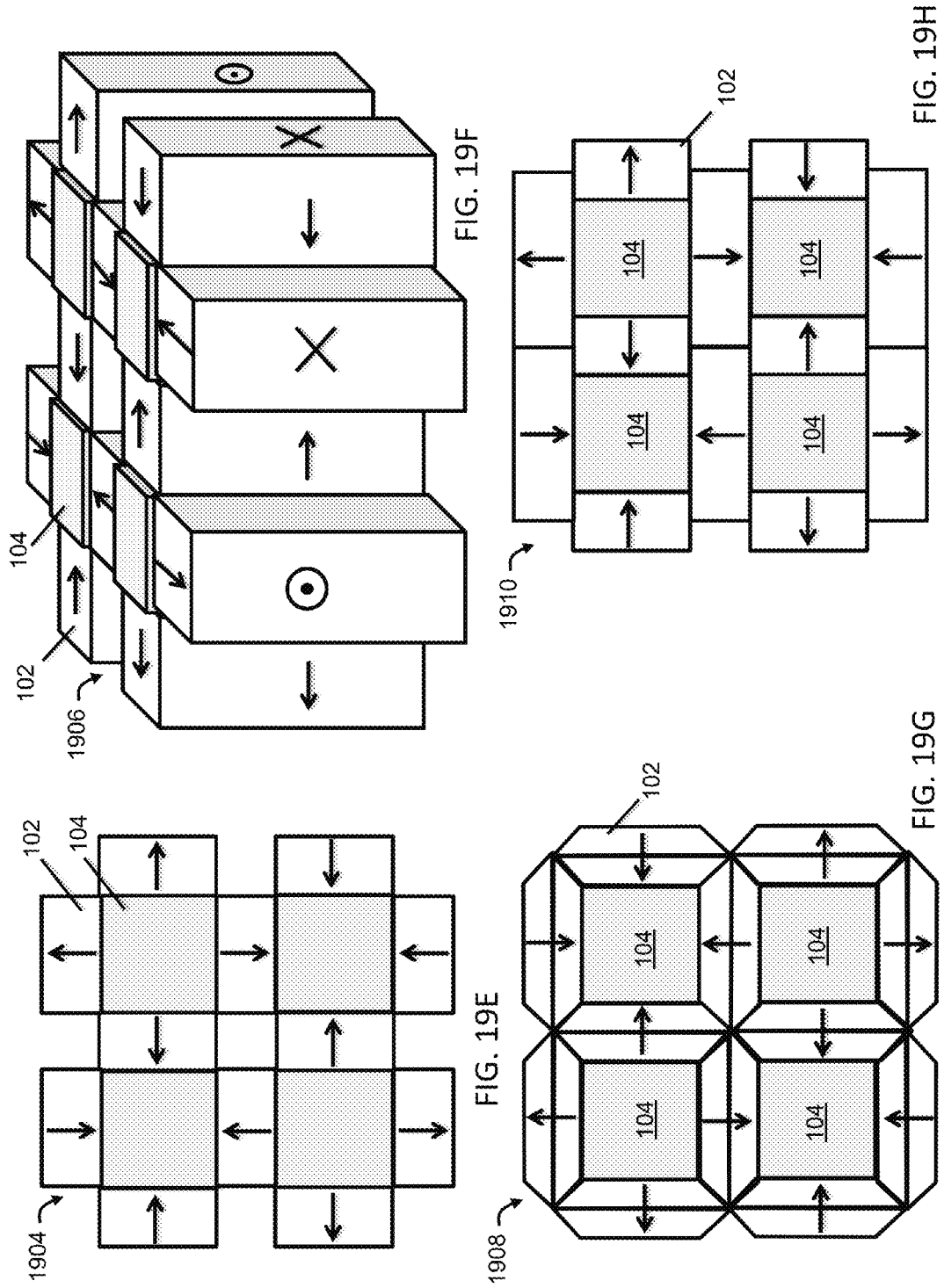

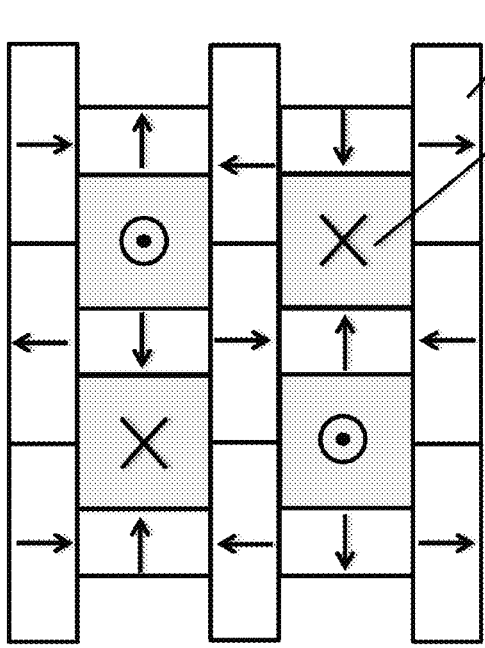
FIG. 19J (Half off)
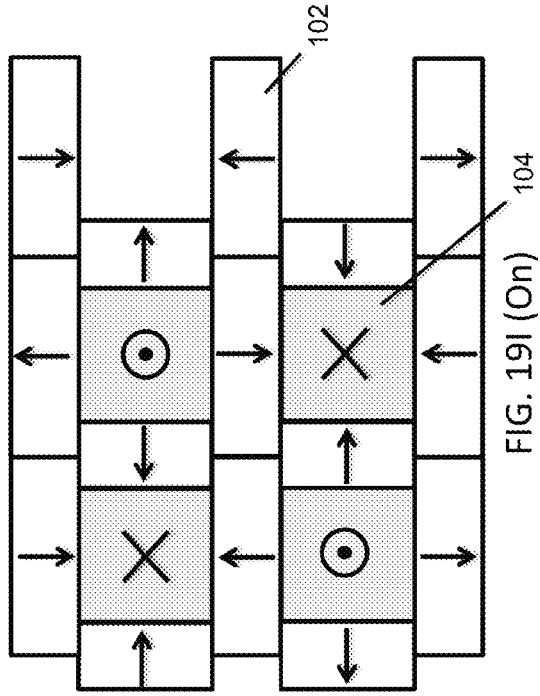
FIG. 19I (On)
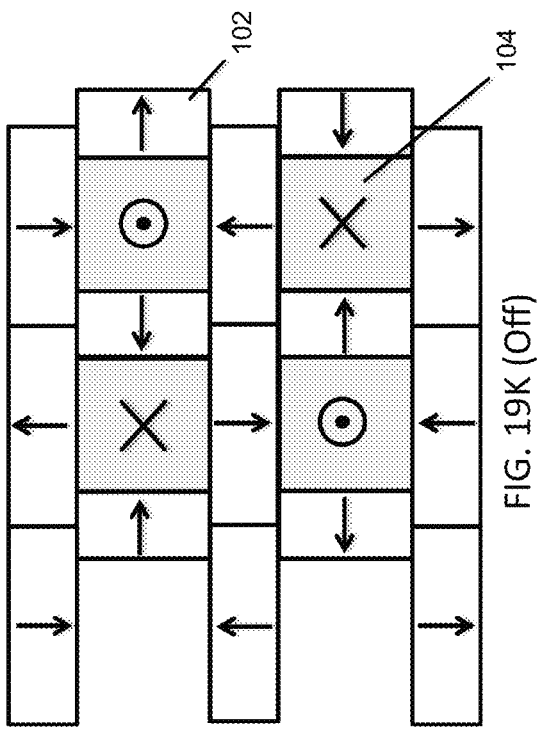
FIG. 19K (Off)

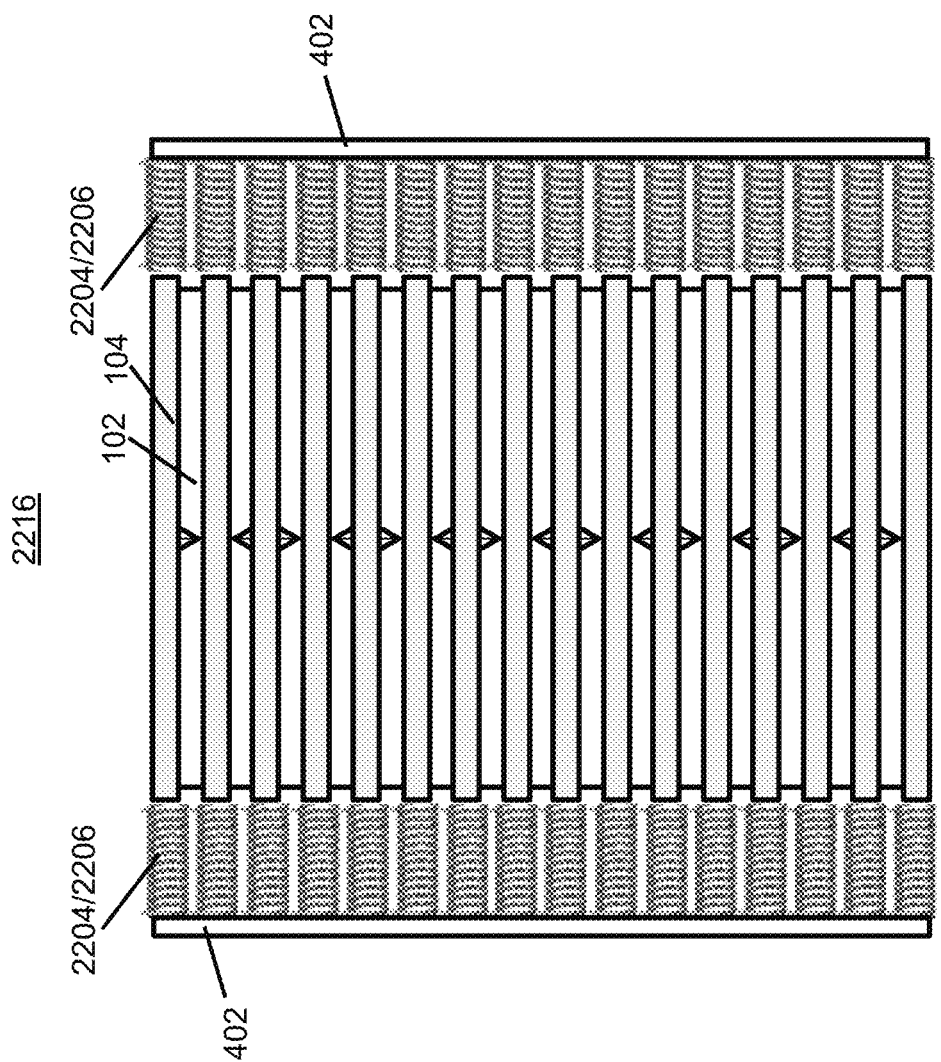

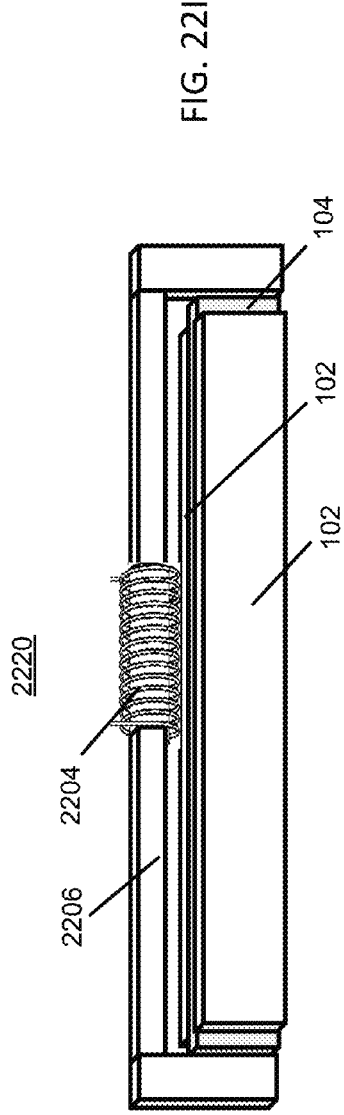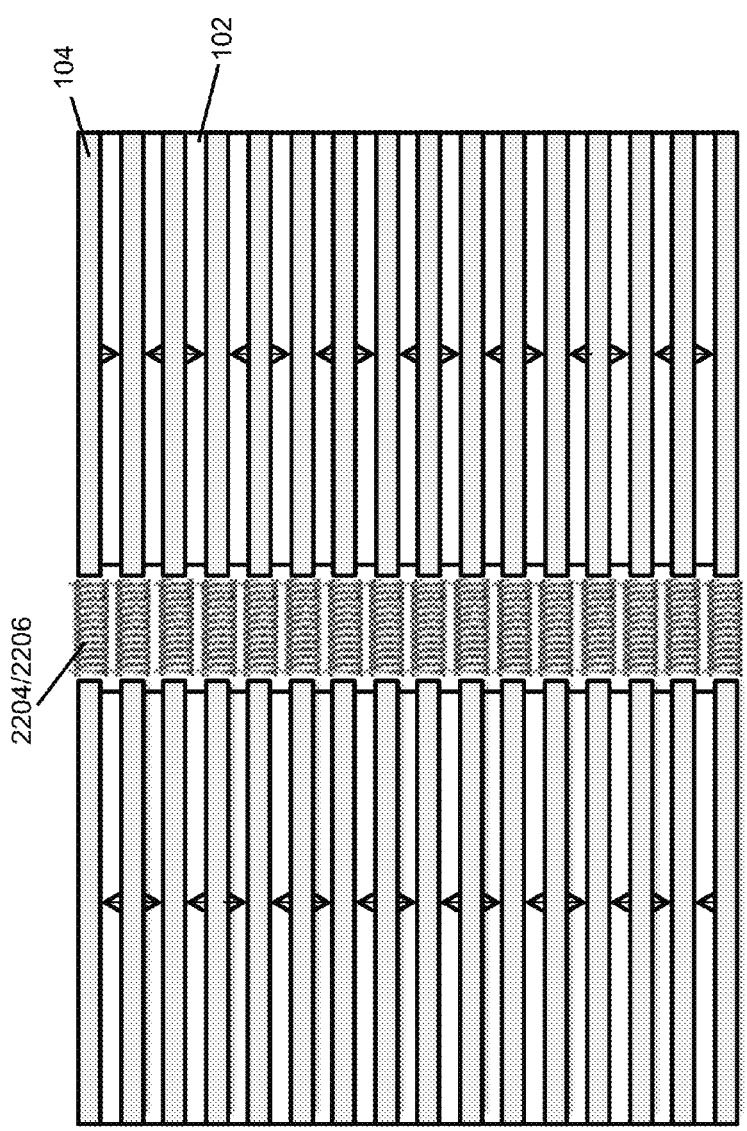

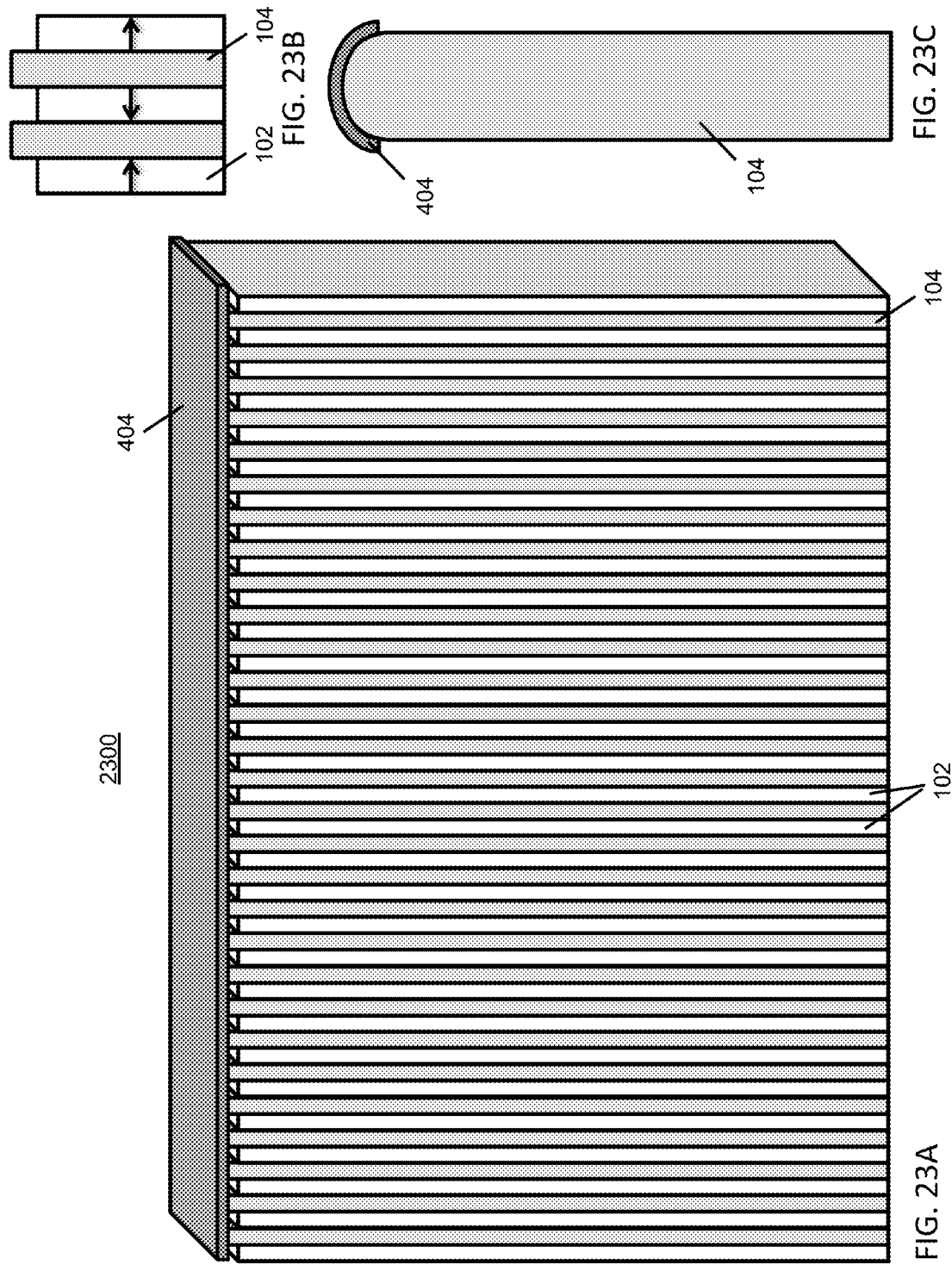

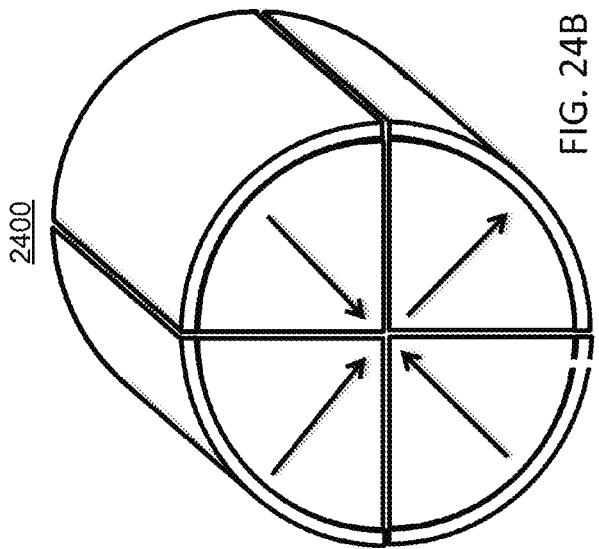
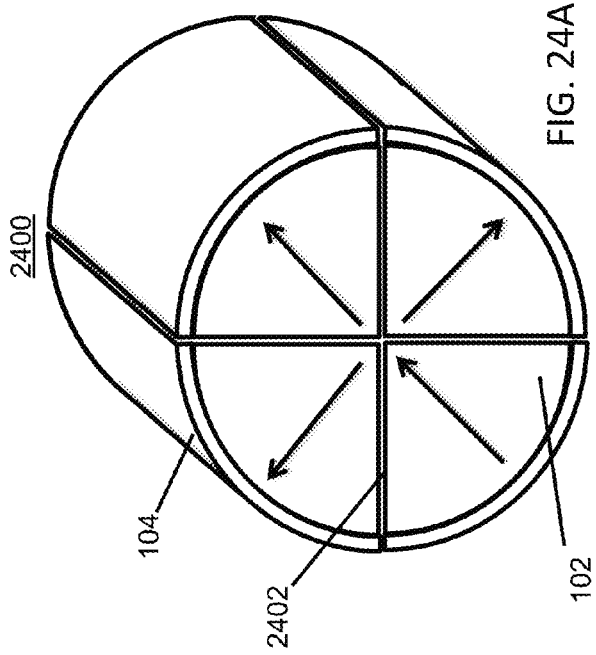
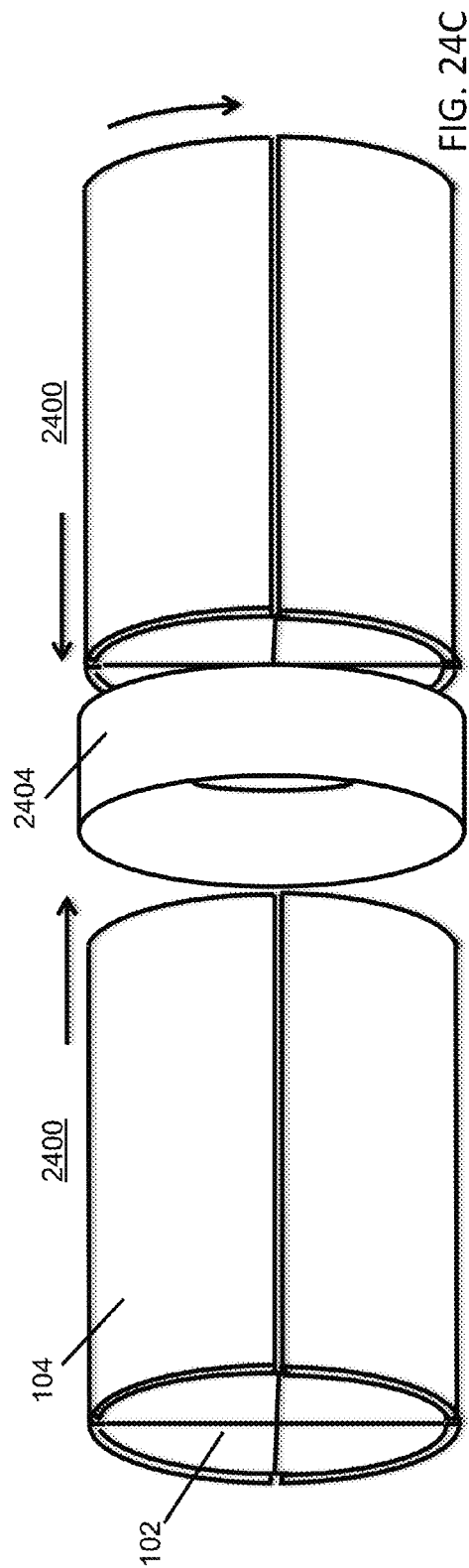

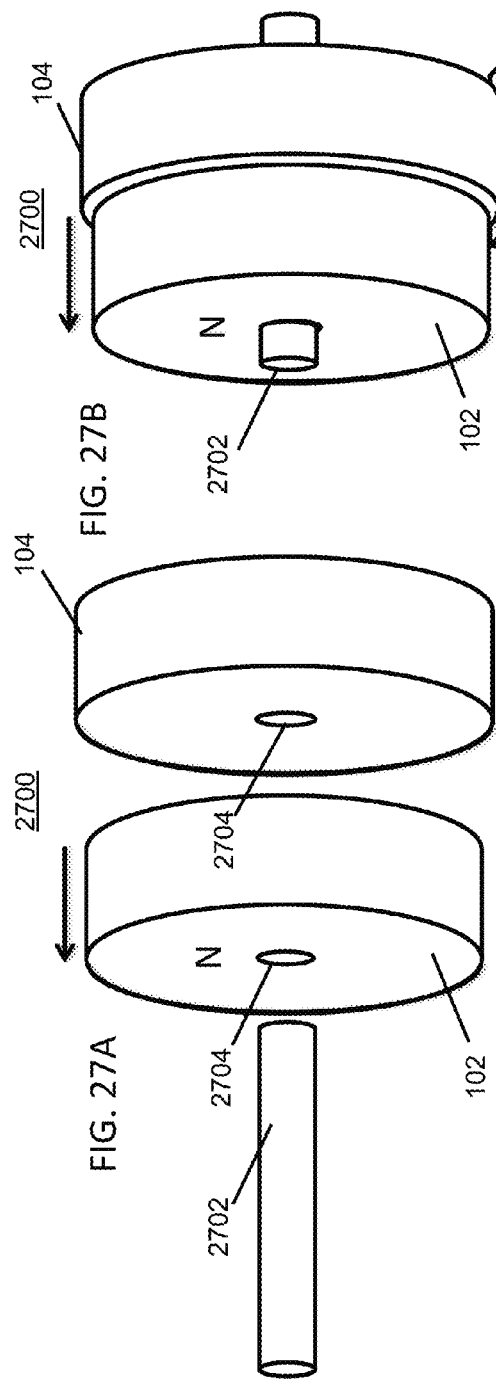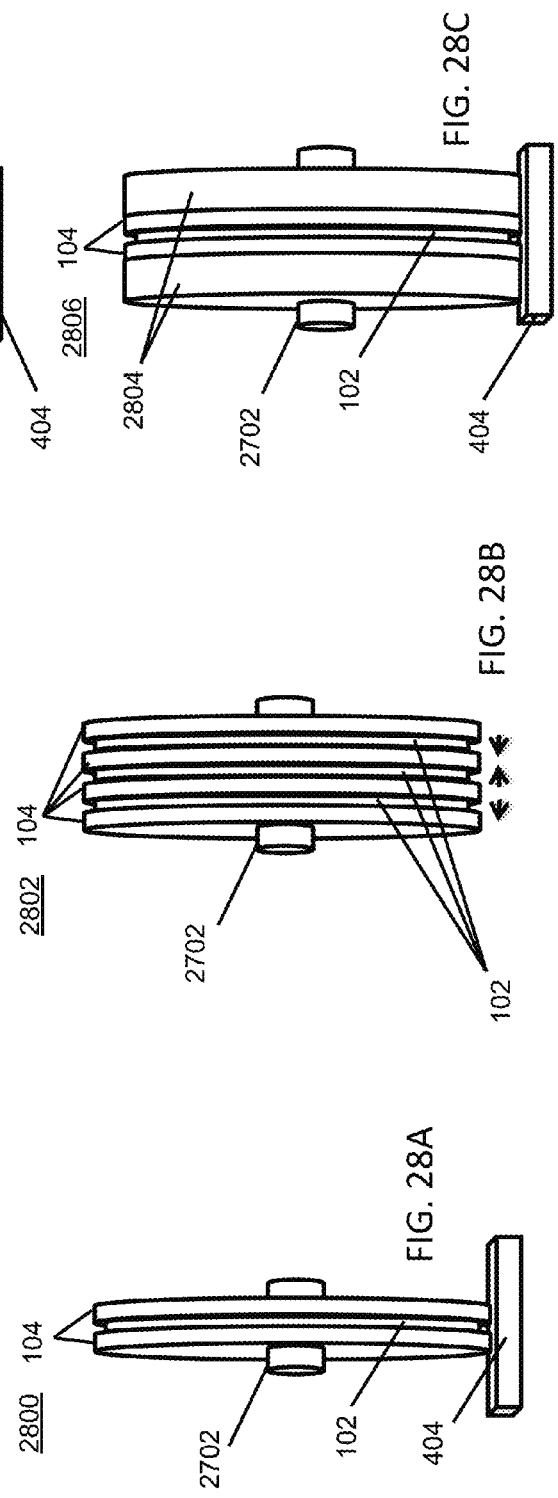

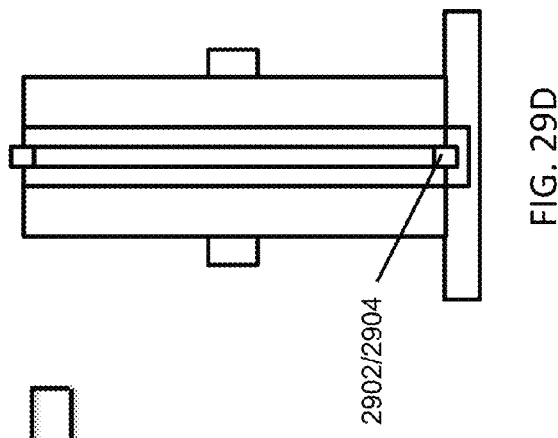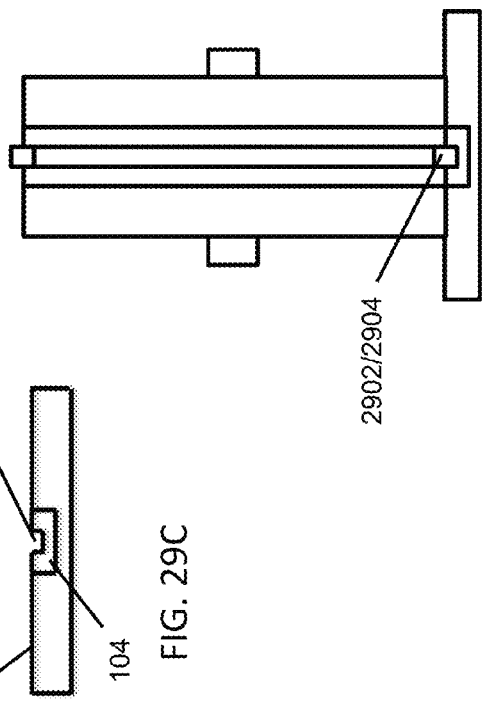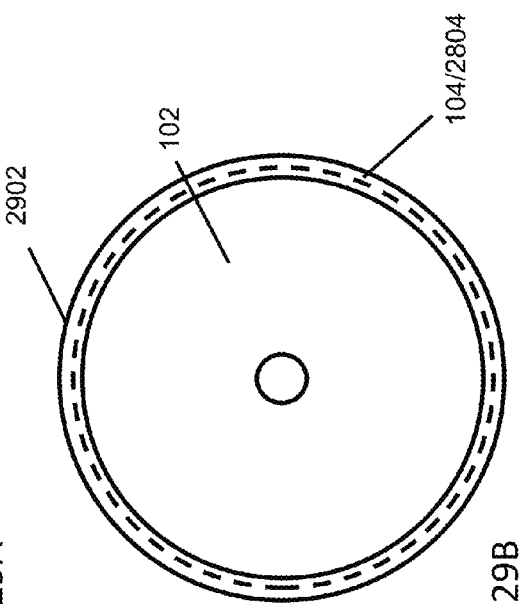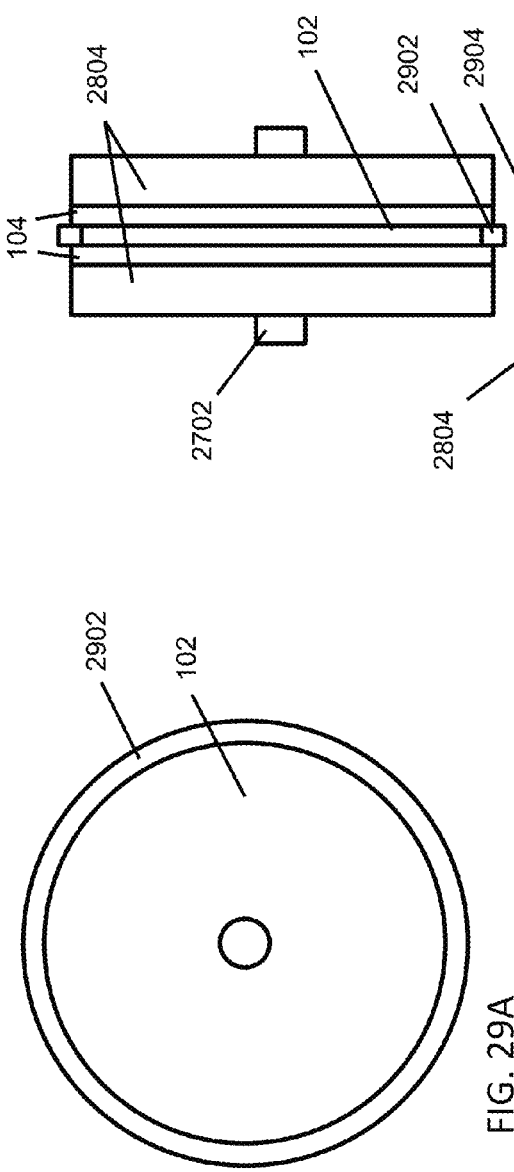

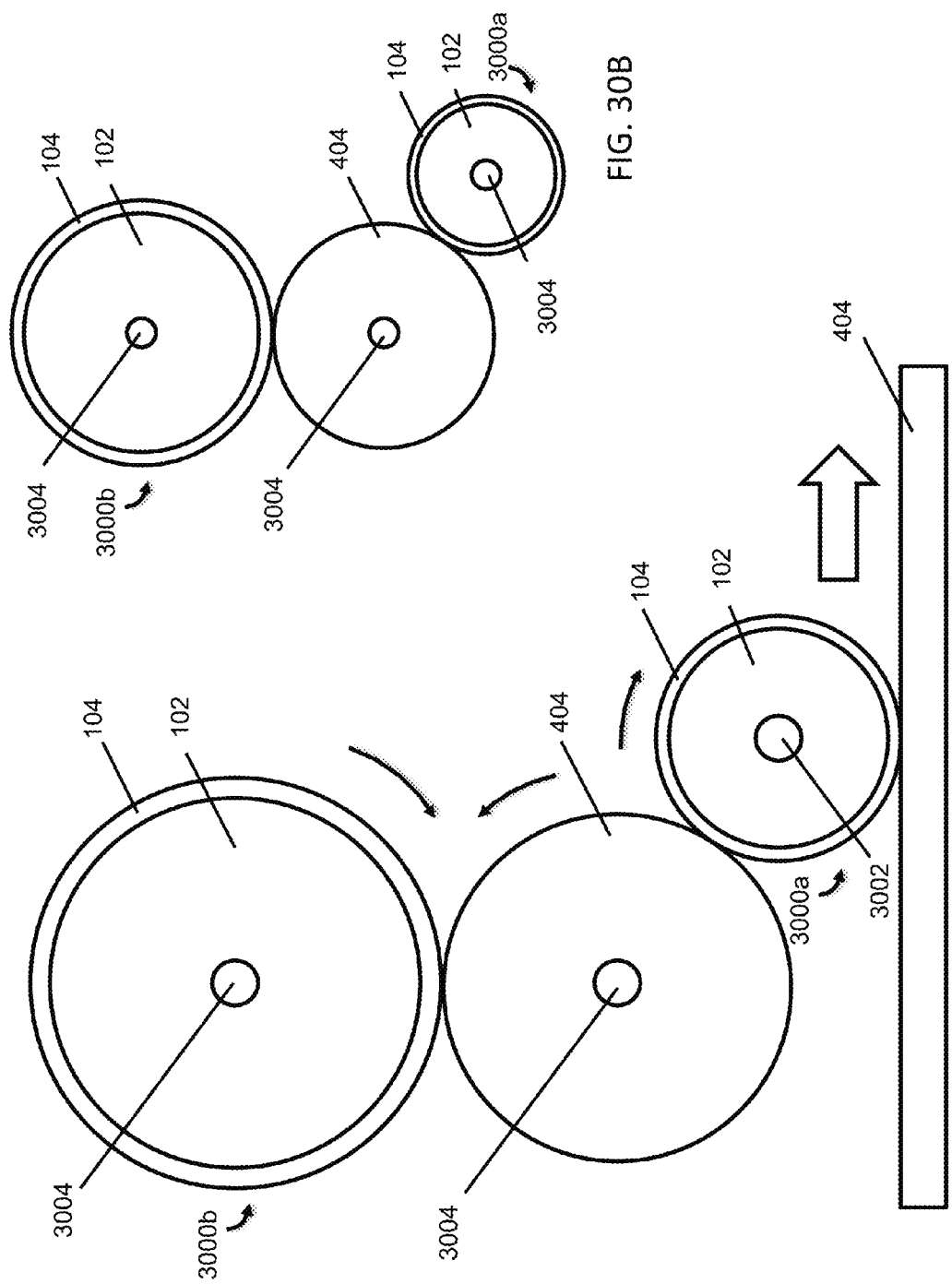

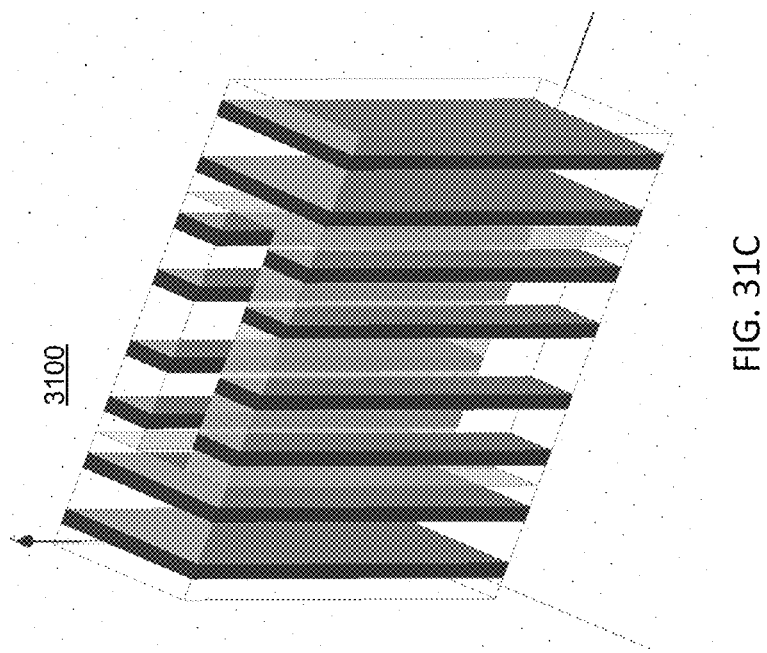
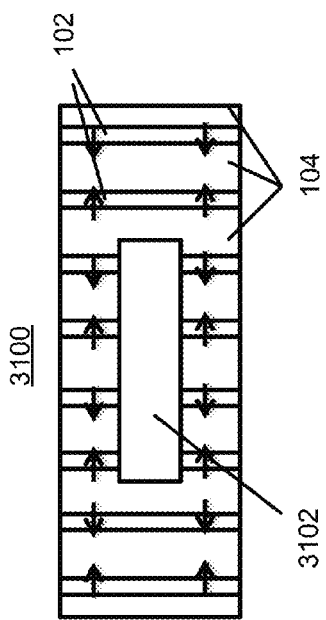
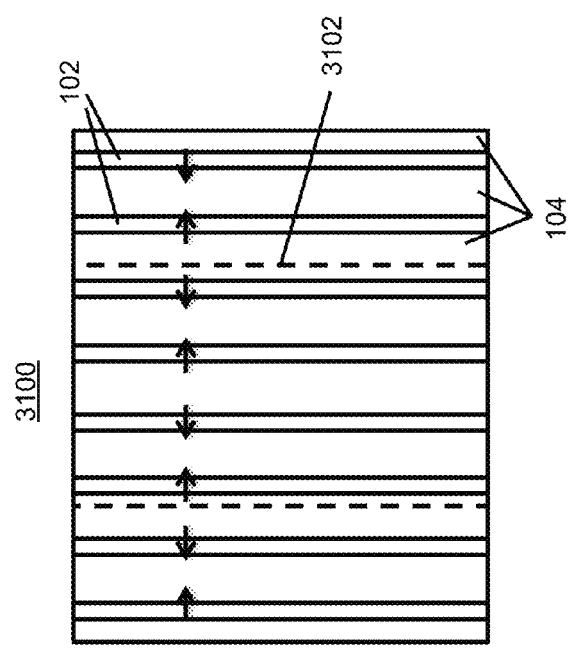
FIG. 31C
FIG. 31A (Top View)
FIG. 31B (Side View)

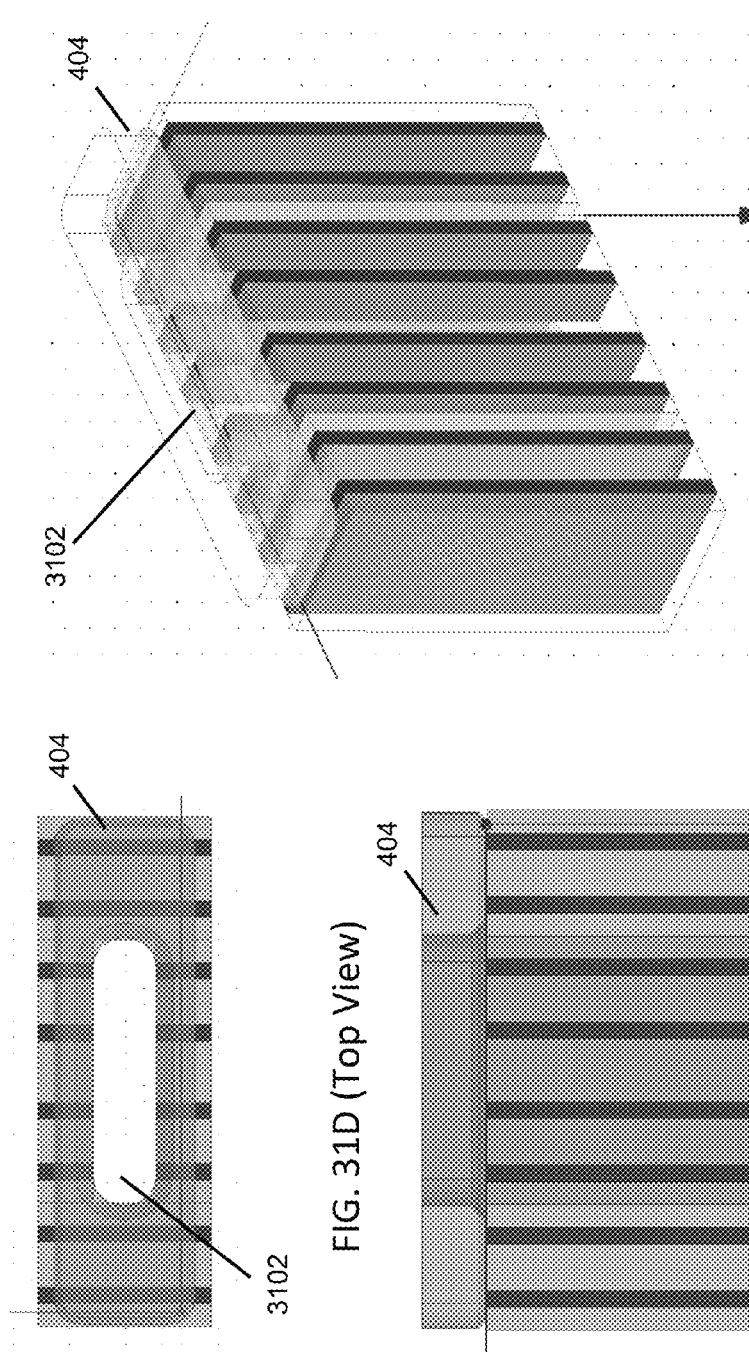
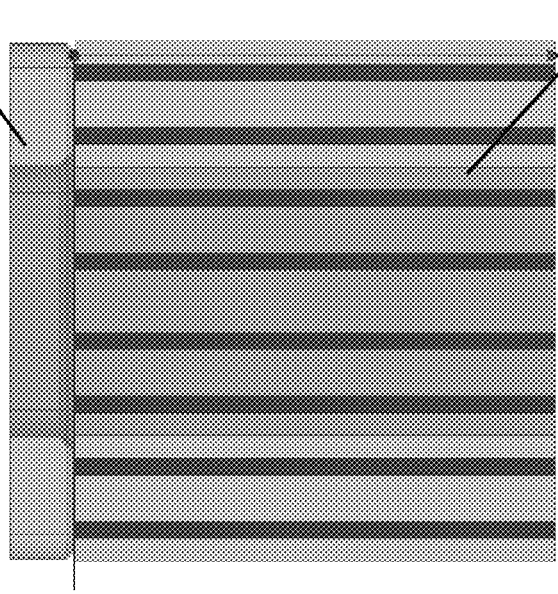
FIG. 31F
FIG. 31D (Top View)
FIG. 31E (Side View)

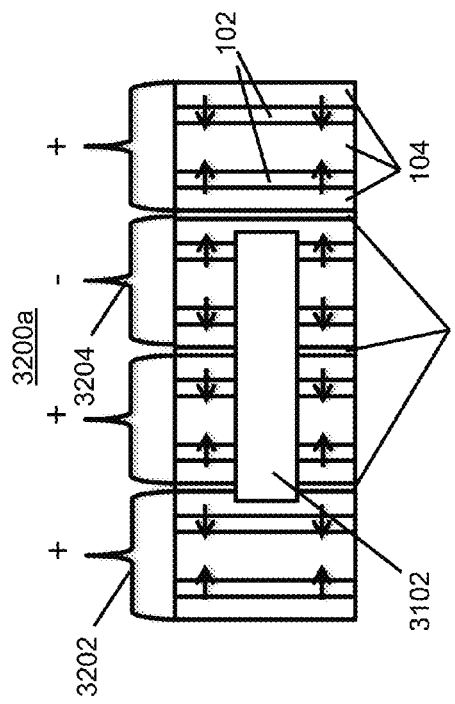
FIG. 32A (Top View)
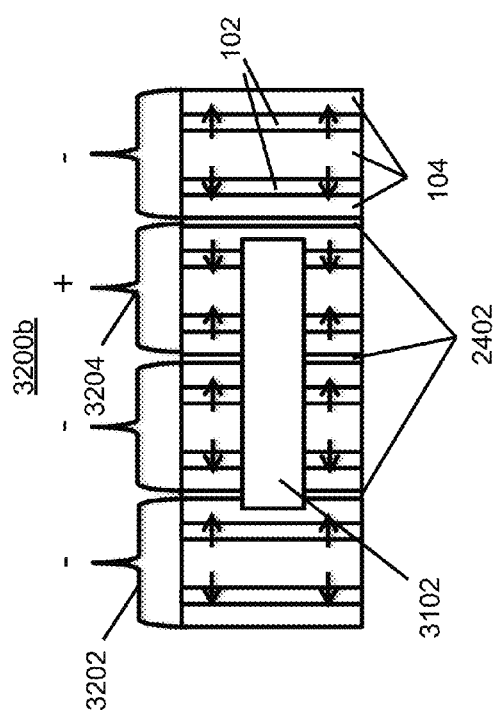
FIG. 32B (Top View)
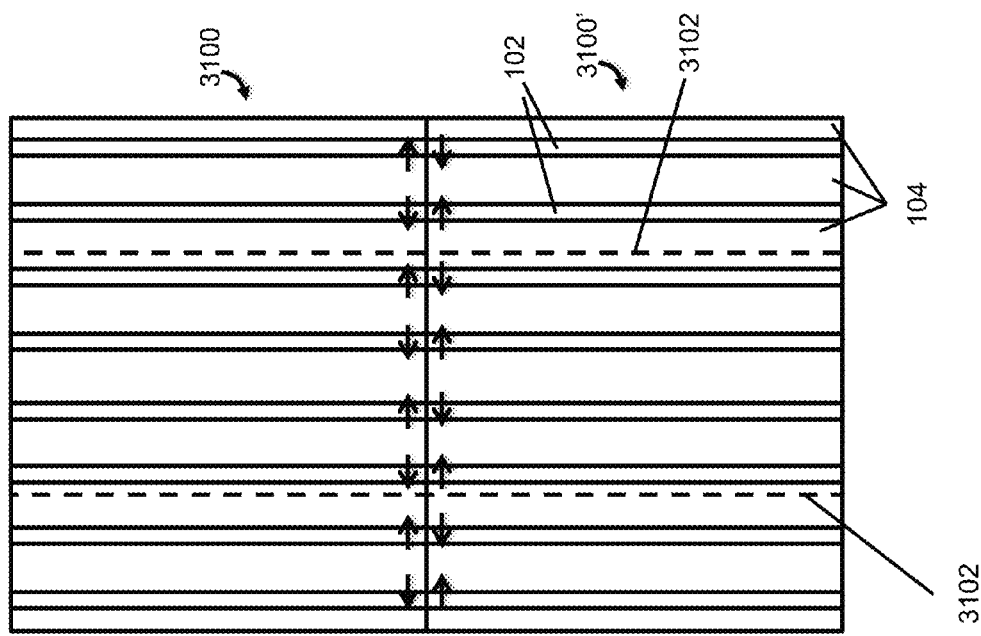
FIG. 31G (Side View)

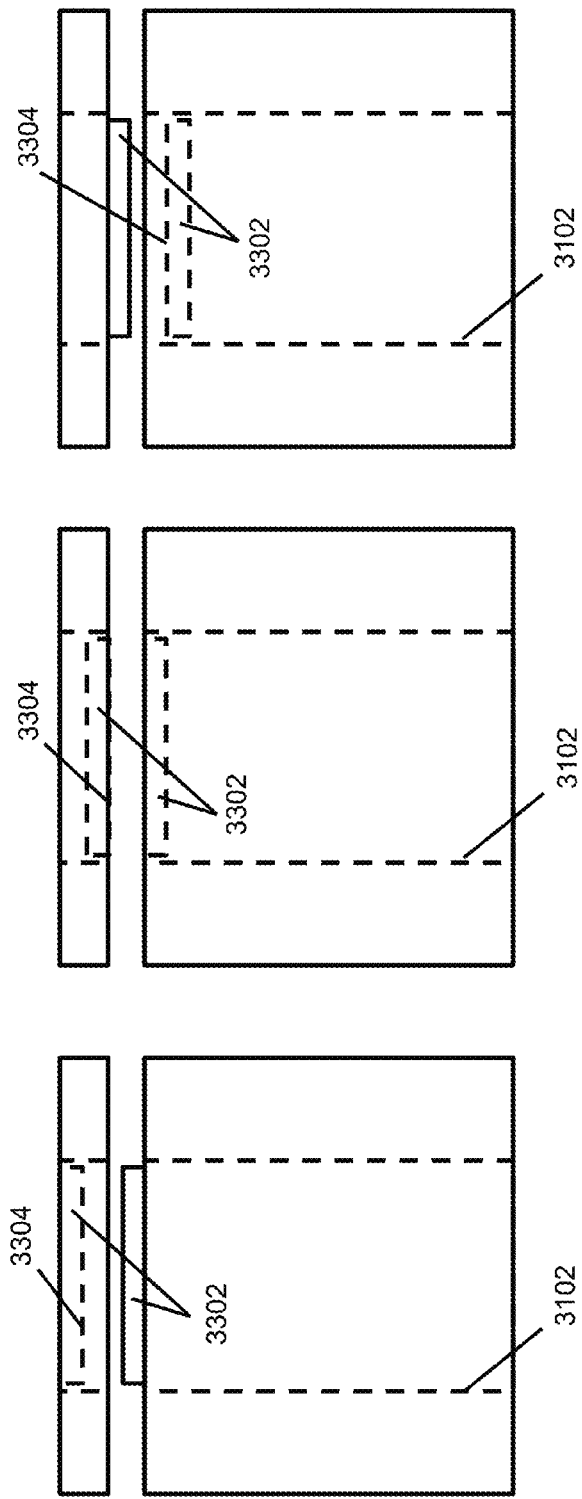
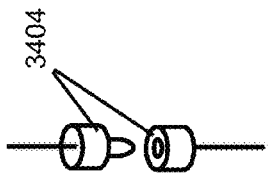
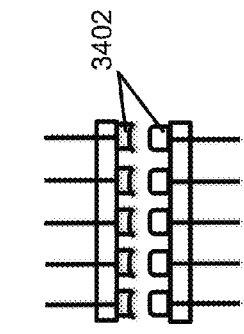
FIG. 33A (Side View)
FIG. 33B (Side View)
FIG. 33C (Side View)
FIG. 34A
FIG. 34B

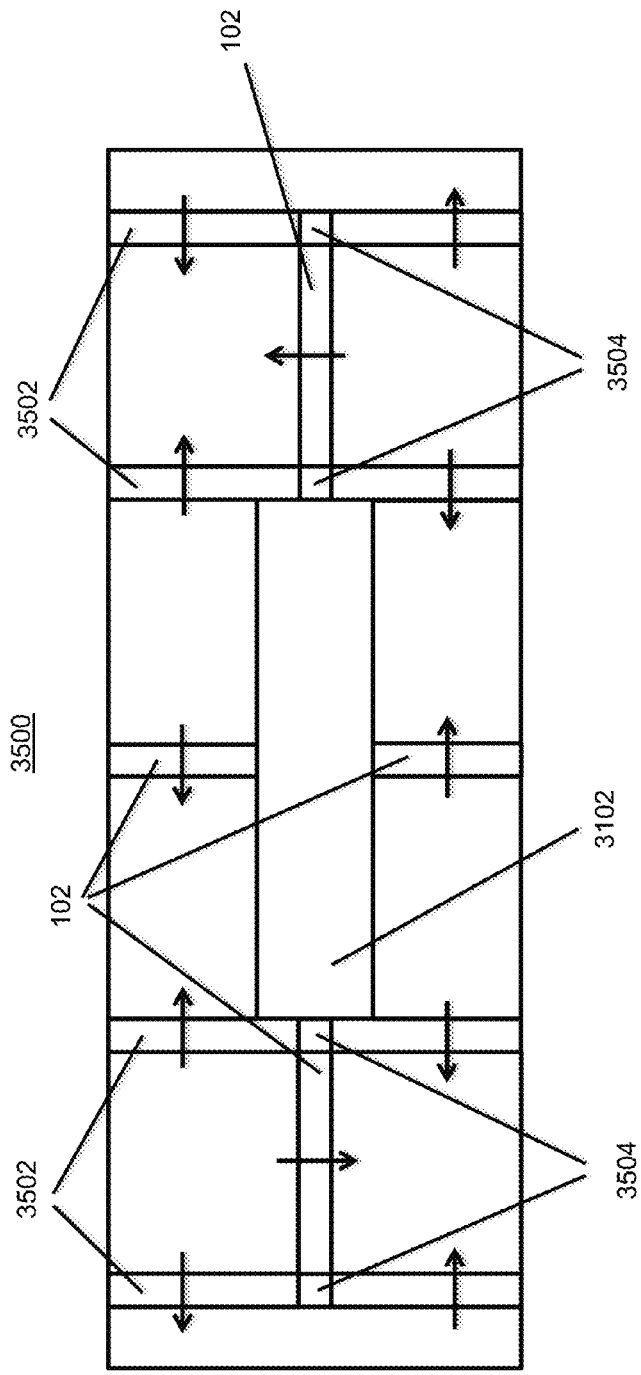
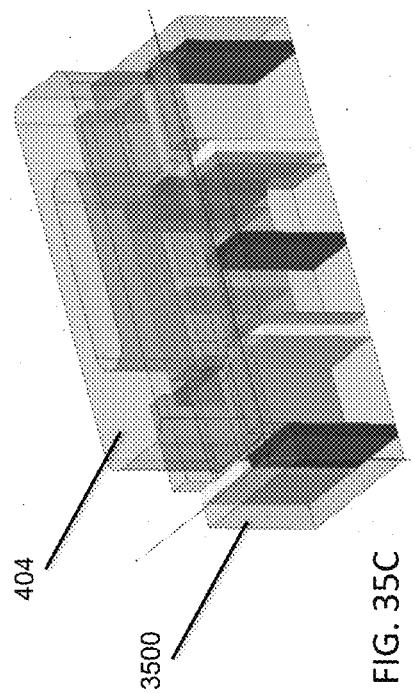
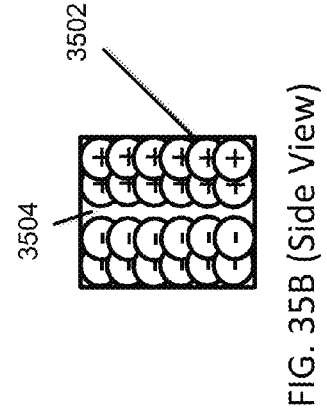
FIG. 35A (Top View)
FIG. 35B (Side View)
FIG. 35C

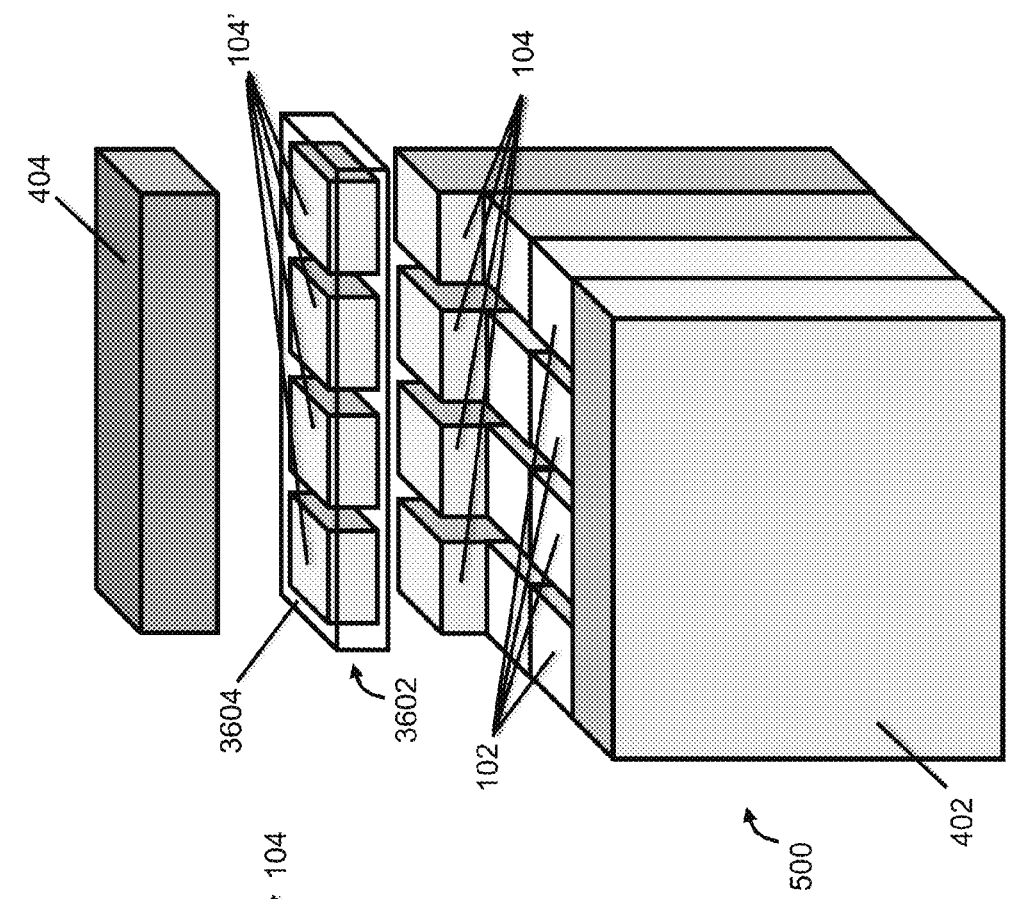
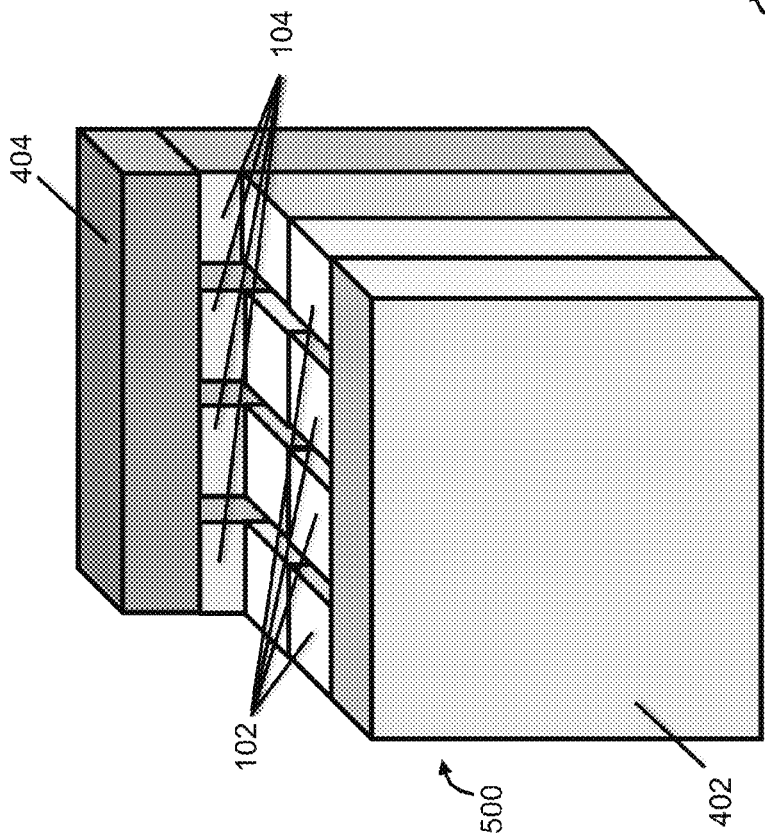
FIG. 36B
FIG. 36A

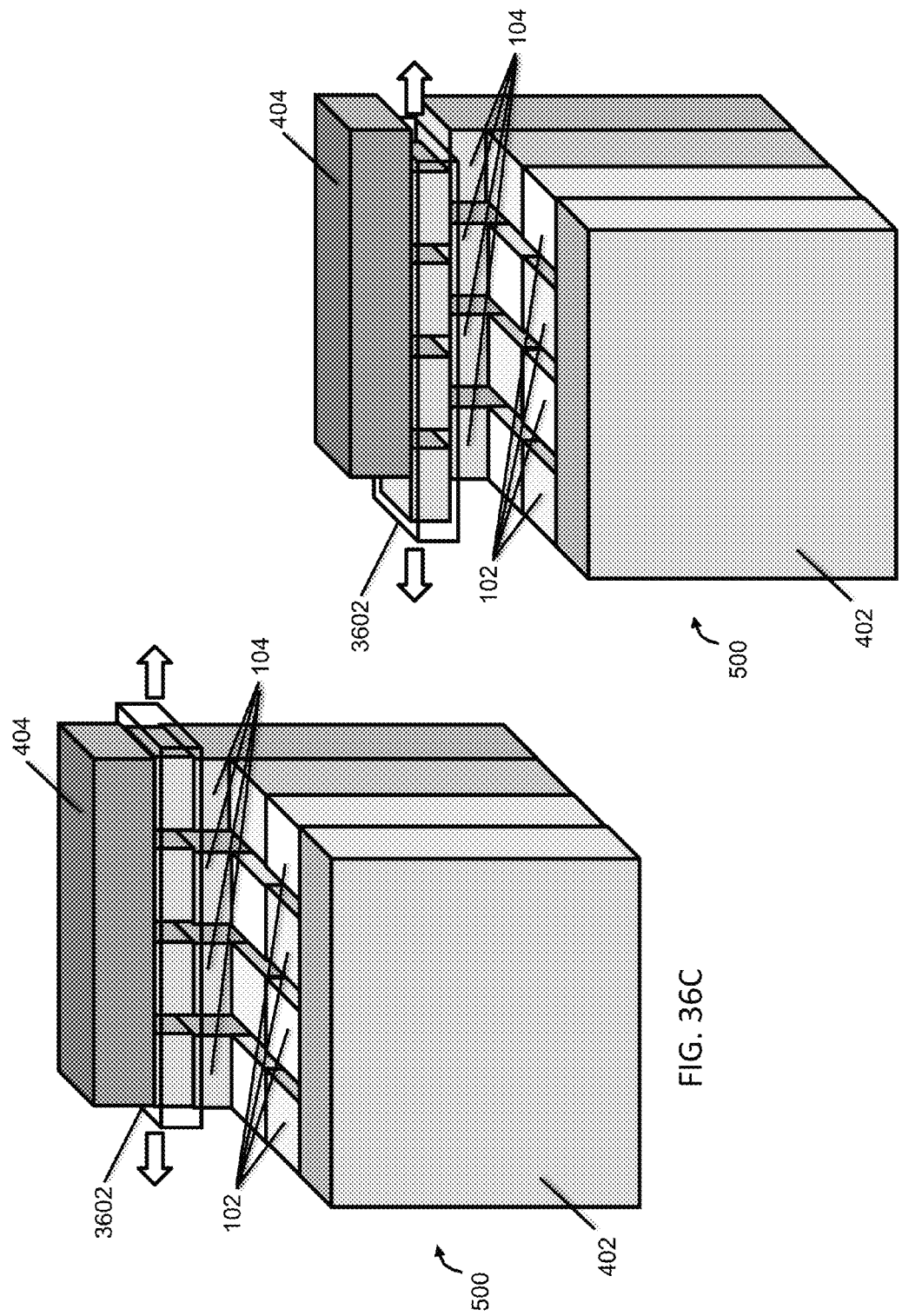

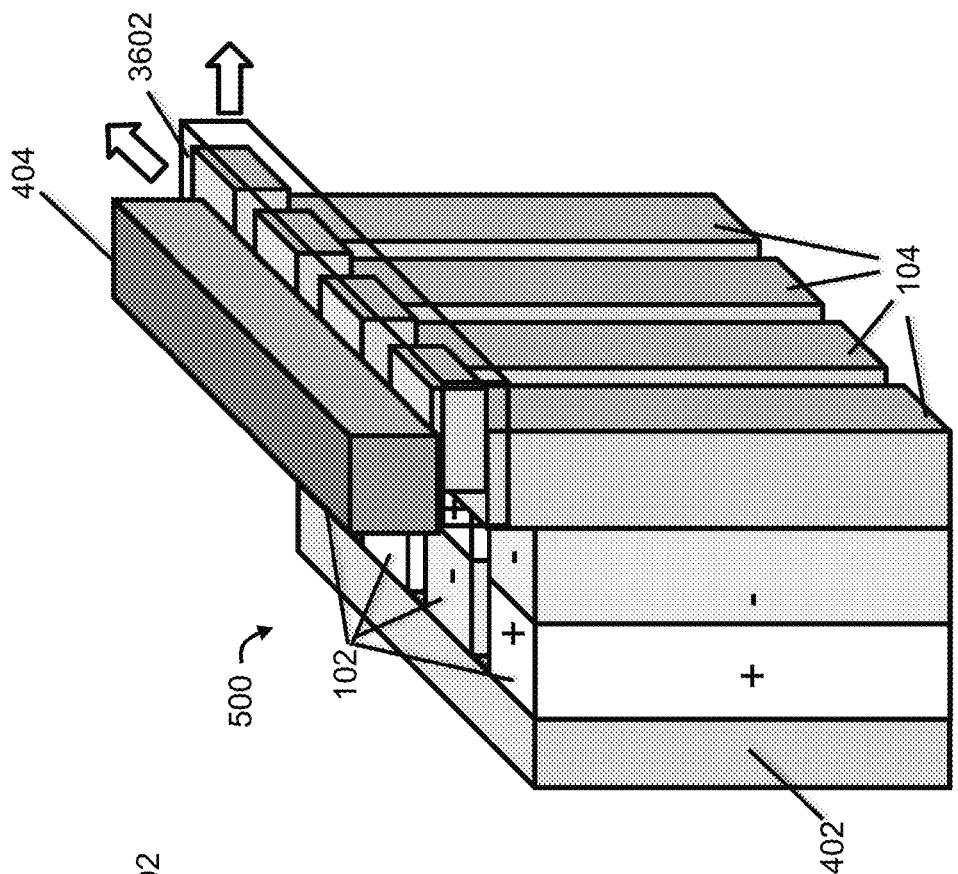
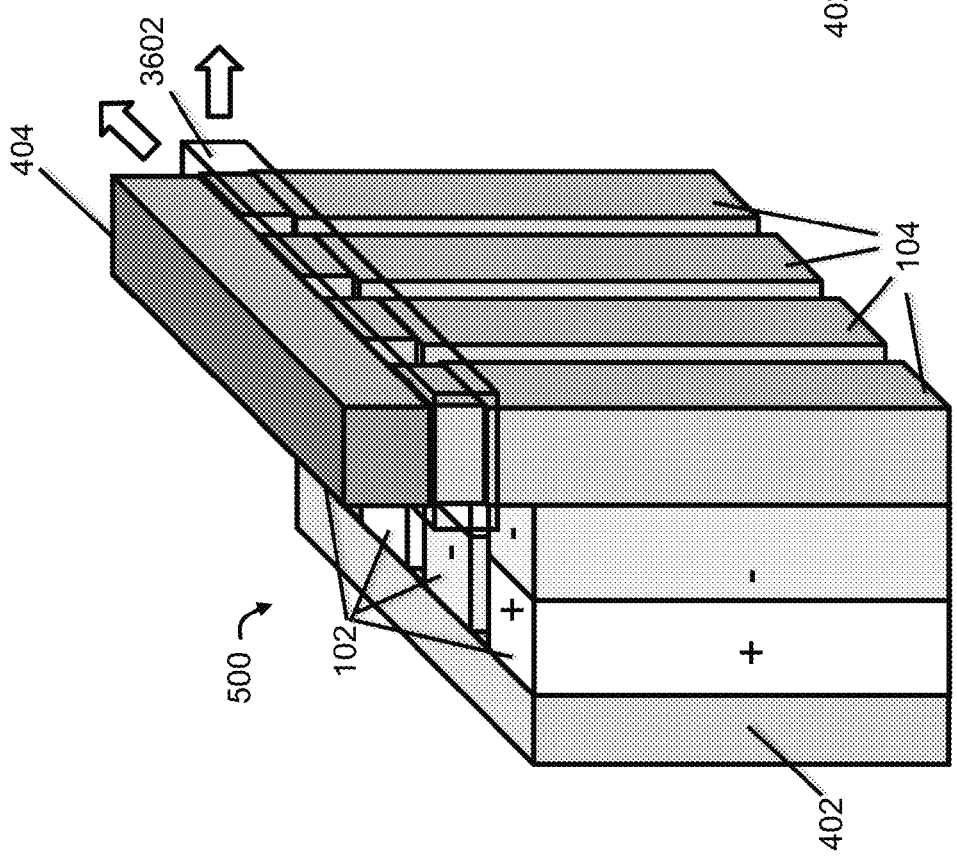
FIG. 36F
FIG. 36E

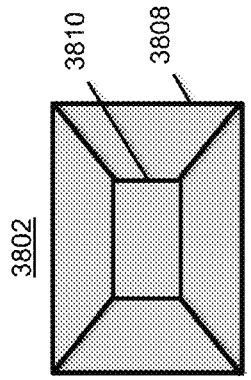
FIG. 38B
(Front View)
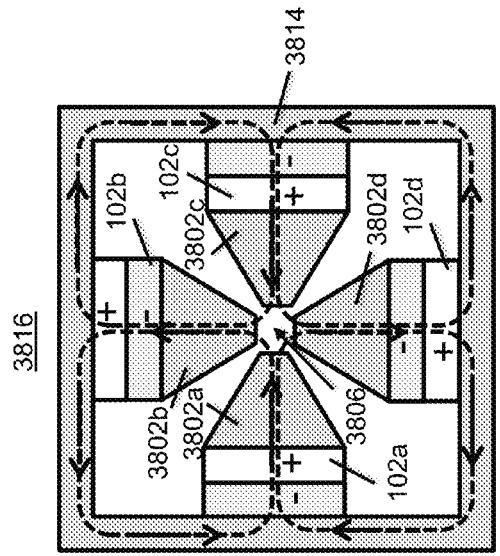
FIG. 38D (Side View)
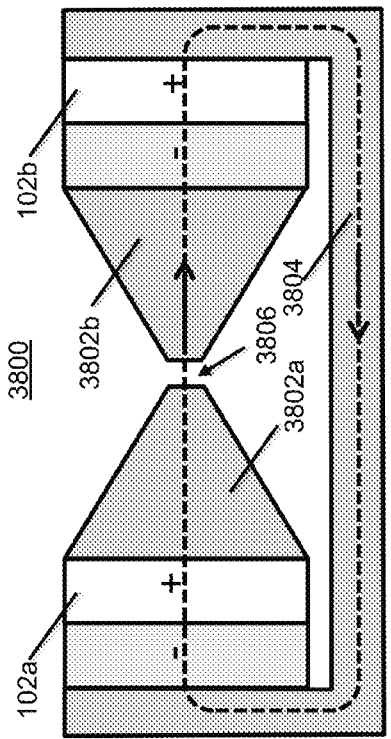
FIG. 38A (Side View)
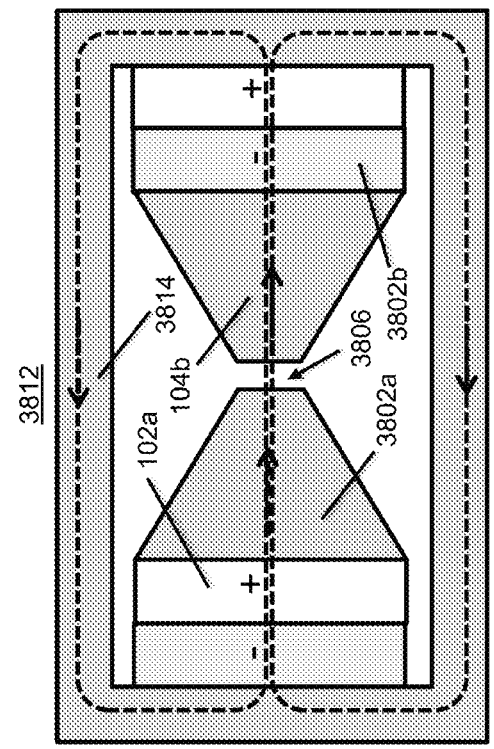
FIG. 38C (Side View)

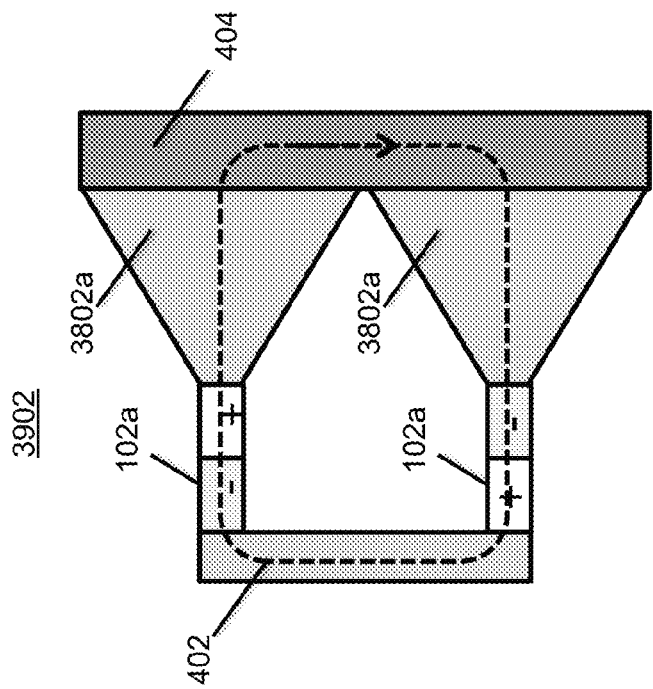
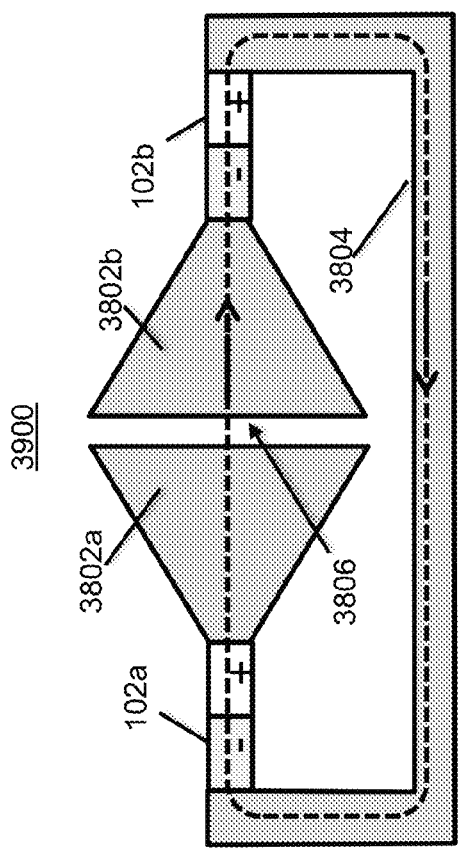
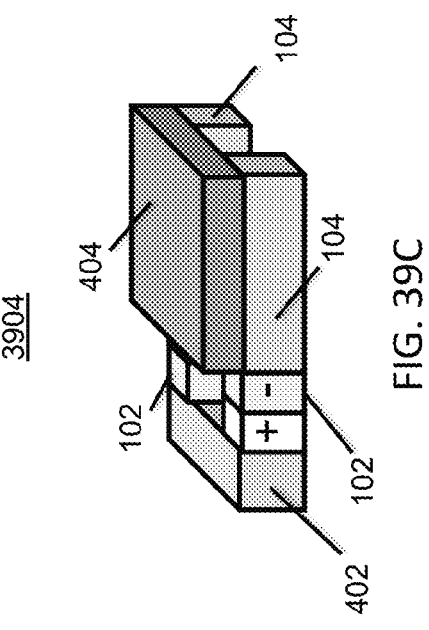
FIG. 39A (Side View)
FIG. 39B (Top View)
FIG. 39C

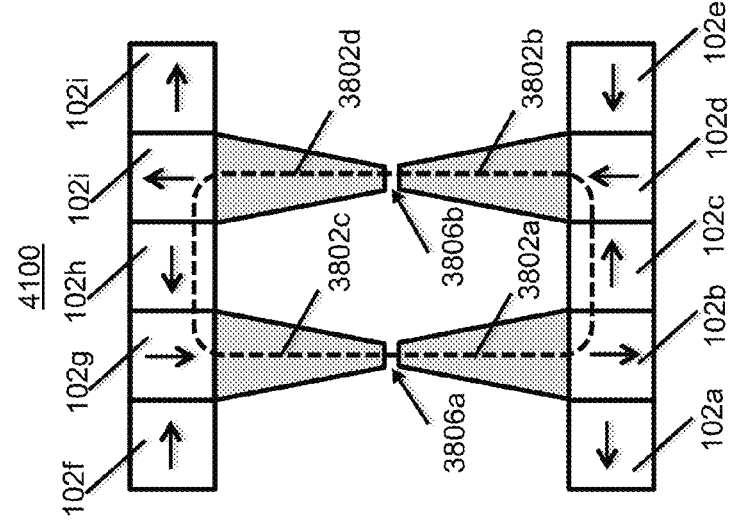
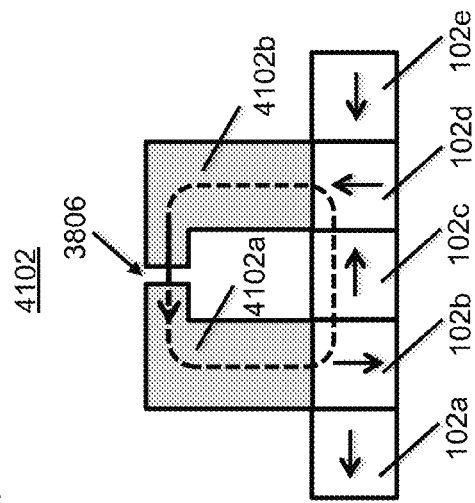
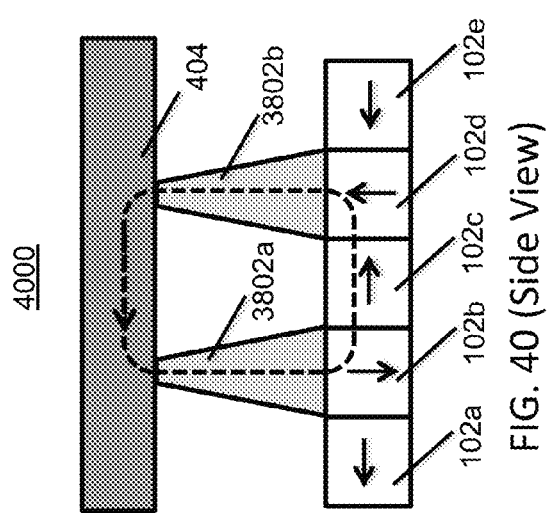

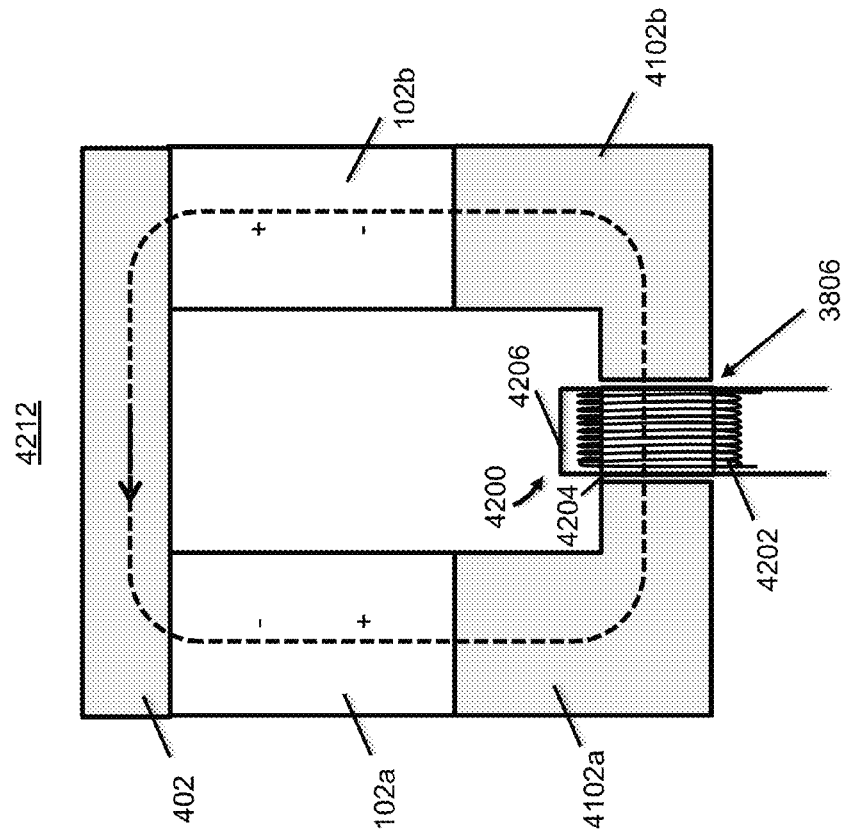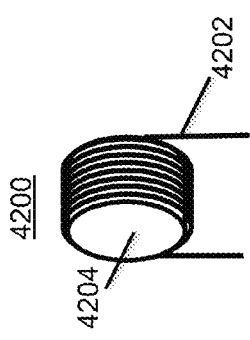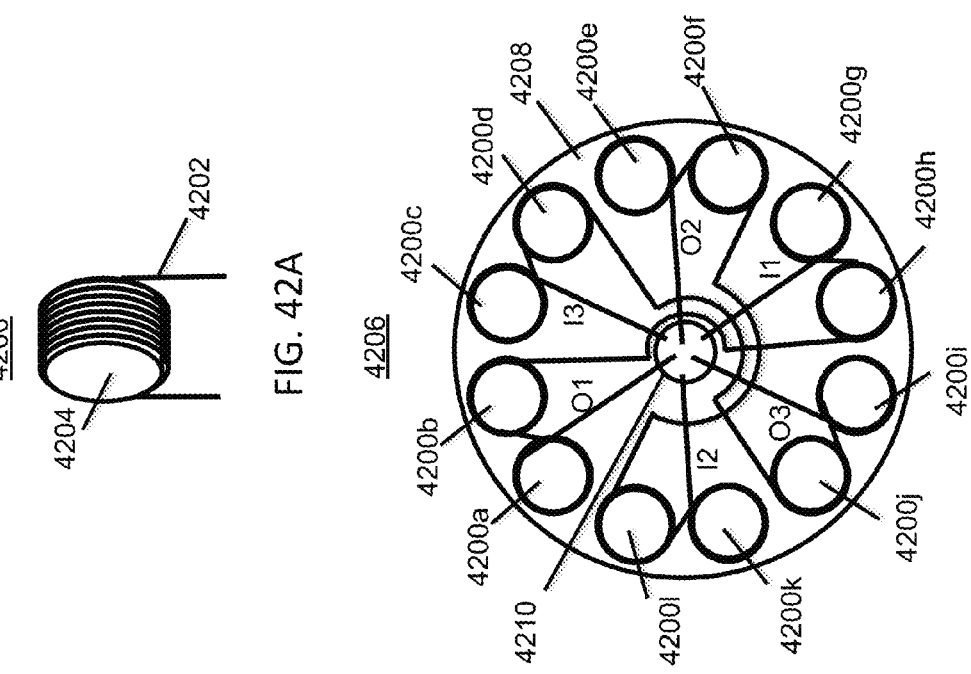

SYSTEM FOR CONCENTRATING AND CONTROLLING MAGNETIC FLUX OF A MULTI-POLE MAGNETIC STRUCTURE

RELATED APPLICATIONS

This application is a continuation-in-part of non-provisional application Ser. No. 14/578,798, titled "System for Concentrating and Controlling Magnetic Flux of a Multi-pole Magnetic Structure", which is a continuation-in-part of non-provisional application Ser. No. 14/258,723, titled "System for Concentrating Flux of a Multi-pole Magnetic Structure", now U.S. Pat. No. 8,917,154, which claims the benefit under 35 USC 119(e) of provisional application 61/854,333, titled "System for Concentrating Flux", filed Apr. 22, 2013, by Fullerton et al.; Ser. No. 14/258,723 is a continuation-in-part of non-provisional application Ser. No. 14/103,699, titled "System for Concentrating Flux of a Multi-pole Magnetic Structure", filed Dec. 11, 2013, by Fullerton et al., now U.S. Pat. No. 8,937,521, which claims the benefit under 35 USC 119(e) of provisional application 61/735,403, titled "System for Concentrating Magnetic Flux of a Multi-pole Magnetic Structure", filed Dec. 12, 2012 by Fullerton et al. and provisional application 61/852,431, titled "System for Concentrating Magnetic Flux of a Multi-pole Magnetic Structure", filed Mar. 15, 2013 by Fullerton et al.

This application is also a continuation-in-part of non-provisional application Ser. No. 14/072,664, titled "System for Controlling Magnetic Flux of a Multi-Pole Magnetic Structure, filed Nov. 5, 2013 by Evans et al., which claims the benefit under 35 USC 119(e) of provisional application 61/796,253, titled "Magnetic Attachment System Having a Multi-pole Magnetic Structure and Pole Pieces" filed Nov. 5, 2012, by Evans et al.; Ser. No. 14/072,664 is a continuation-in-part of non-provisional application Ser. No. 13/960,651, titled "Magnetic Attachment System Having a Multi-pole Magnetic Structure and Pole Pieces", filed Aug. 6, 2013 by Fullerton et al., which claims the benefit under 35 USC 119(e) of provisional application 61/472,273, titled "Tablet Cover Attachment" filed Aug. 6, 2012, by Swift et al. and provisional application 61/796,253, titled "System for Controlling Flux of a Multi-Pole Magnetic Structure" filed Nov. 5, 2012, by Evans et al.

The applications listed above are both incorporated by reference herein in their entirety.

FIELD OF THE INVENTION

The present invention relates generally to a system for concentrating magnetic flux of a multi-pole magnetic structure. More particularly, the present invention relates to a system for concentrating magnetic flux of a multi-pole magnetic structure using pole pieces having a magnet-to-pole piece interface with a first area and a pole piece-to-target interface with a second area substantially smaller than the first area, where the target can be a ferromagnetic material, a pole piece of a system for concentrating magnetic flux having a complementary multi-pole magnetic structure, or a gap. The system may also relate to controlling the concentrated magnetic flux using a movable magnetic circuit located between the target and multi-pole magnetic structure, where the position of the movable magnetic circuit relative to the multi-pole magnetic structure, the positions of elements of the magnetic circuit relative to other elements and/or the position of elements of the multi-pole magnetic structure relative to other elements of the magnetic structure determines the flux emitted from the combined structure.

SUMMARY OF THE INVENTION

In accordance with one aspect of the invention, a magnet assembly, comprises a multi-pole magnetic structure comprising one or more pieces of a magnetizable material having a plurality of polarity regions for providing a magnetic flux, the magnetizable material having a first saturation flux density, the plurality of polarity regions being magnetized in a plurality of directions and a plurality of pole pieces of a ferromagnetic material for integrating the magnetic flux across the plurality of polarity regions, the ferromagnetic material having a second saturation flux density, each pole piece of the plurality of pole pieces having a magnet-to-pole piece interface with a corresponding polarity region and a pole piece-to-target interface with a target, the magnet-to-pole piece interface having a first area, the pole piece-to-target interface having a second area, the magnetic flux being routed into the pole piece via the magnet-to-pole interface and out of the pole piece via the pole piece-to-target interface, the routing of the magnetic flux through the pole piece resulting in an amount of concentration of the magnetic flux at the pole piece-to-target interface corresponding to a first ratio of the first area divided by the second area, the amount of concentration of the magnetic flux being limited by a second ratio of the second saturation flux density divided by the first saturation flux density, wherein the pole-piece-to-target interface of the pole piece achieves the second saturation flux density when the first ratio equals the second ratio, and wherein the first ratio is at least fifty percent of the second ratio.

The target can be a ferromagnetic material.

The target can be a gap between two or more pole-piece-to-target interfaces of the plurality of pole pieces.

At least one of the one or more pieces of a magnetizable material can be thinner than each of the plurality of pole pieces.

The first ratio can be at least seventy five percent of the second ratio.

The first ratio can be at least ninety percent of the second ratio.

The magnet assembly may also include a magnetic circuit between the lateral magnetic assembly and the one of the target for controlling the magnetic flux directed to the target, the magnetic circuit comprising a second plurality of pole pieces of a second ferromagnetic material, the second ferromagnetic material having a third saturation flux density and a magnetically inactive material for constraining the second plurality of pole pieces.

The magnetically inactive material can include one of polycarbonate, aluminum, plastic, wood, or stainless steel.

The magnet assembly may also include a mechanism configured to move at least one of the magnetic assembly or the magnetic circuit to a plurality of alignment positions such that for each alignment position of the plurality of alignment positions at least two pole pieces of the first plurality of pole pieces are in contact with two or more pole pieces of the second plurality of pole pieces, a first alignment position of the plurality of alignment positions resulting in a first amount of flux being directed to the one of the target, a second alignment position of the plurality of alignment positions resulting in a second amount of flux being directed to the one of the target, the second amount of flux being less than the first amount of flux.

The polarity regions can be separate magnets.

The polarity regions can have a substantially uniformly alternating polarity pattern.

The polarity regions can have a polarity pattern in accordance with a code having a code length greater than 2.

The polarity regions can be printed magnetic regions on a single piece of magnetizable material.

The magnetic assembly may include a shunt plate for producing a magnetic flux circuit between at least two polarity regions of the plurality of polarity regions.

The plurality of polarity regions can have one of a first magnetization direction or a second magnetization direction that is opposite to the first magnetization direction.

The plurality of polarity regions can have one of a first magnetization direction, a second magnetization direction that is opposite to the first magnetization direction, a third magnetization direction that is perpendicular to the first magnetization direction, or a fourth magnetization direction that is opposite to the third magnetization direction.

The target can be a complementary magnet assembly.

The magnetic assembly may include the complementary magnet assembly, the complementary magnet assembly comprising a second multi-pole magnetic structure comprising one or more pieces of a second magnetizable material having a second plurality of polarity regions for providing a second magnetic flux, the second magnetizable material having a third saturation flux density, the second plurality of polarity regions being magnetized in the plurality of magnetization directions and a second plurality of pole pieces of a fourth ferromagnetic material for integrating the magnetic flux across the second plurality of polarity regions and directing the magnetic flux to the magnet assembly, the fourth ferromagnetic material having a fourth saturation flux density.

The magnetic assembly of claim 18, wherein the third saturation flux density is substantially the same as the first saturation flux density.

The magnetic assembly of claim 18, wherein the fourth saturation flux density is substantially the same as the second saturation flux density.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

FIGS. 2A and 2B depict portions of exemplary magnetic fields between two adjacent magnets having an opposite polarity relationship and pole pieces on one side of each magnet.

FIGS. 3A and 3B depict portions of exemplary magnetic fields between two adjacent magnets having an opposite polarity relationship and pole pieces on opposite sides of each magnet.

FIG. 4A depicts an exemplary magnetic structure comprising two spaced magnets having an opposite (or alternating) polarity relationship attached by a shunt plate and attached to a target such as a piece of iron.

FIG. 4B depicts an exemplary magnetic flux circuit created by the shunt plate and the target.

FIG. 4C depicts an exemplary magnetic structure comprising four magnets having an alternating polarity relationship having a shunt plate and attached to a target.

FIG. 4D depicts an oblique projection of the magnetic structure of FIG. 4C approaching the target.

FIG. 5A depicts an exemplary flux concentrator device in accordance with one embodiment of the present invention.

FIG. 5B depicts an exemplary magnetic flux circuit produced using a shunt plate and one side of the magnets and a target that spans two pole pieces on the opposite side of the magnets.

FIG. 5C depicts three exemplary magnetic flux circuits produced by the exemplary flux concentrator device of FIG. 5A and a target.

FIG. 6E depicts additional pole pieces having been added to the upper portions of the magnets in the device of FIG. 6C in order to provide protection to the surfaces of the magnets.

FIGS. 7A-7E depict various exemplary flux concentrator devices having pole pieces on both sides of the magnetic structures.

FIG. 8A depicts an exemplary flux concentrating device comprising three magnetic structures like those of FIG. 7A except the magnets in the middle structure are each rotated 180° compared to the magnets in the two outer most structures.

FIG. 8B depicts an exemplary flux concentrating device like that of FIG. 8A except the pole pieces in the inside of the device are configured to accept targets the recess into the device.

FIGS. 9A-9G depict various exemplary male-female type interfaces.

FIG. 10A depicts an exemplary flux concentrator device like that shown previously in FIG. 5A, where the magnetic structure has a polarity pattern in accordance with a Barker 4 code.

FIG. 10B depicts another exemplary flux concentrator device like that of FIG. 10A, where the magnetic structure has a polarity pattern that is complementary to the magnetic structure of FIG. 10A.

FIGS. 11A and 11B depict complementary Barker-4 coded flux concentrator devices that like those of FIGS. 10A and 10B.

FIG. 12 depicts four Barker-4 coded flux concentrator devices oriented in an array.

FIGS. 18A and 18B depict a prior art magnet structure where the magnets in the four corners are magnetized vertically and the side magnets between the corner magnets are magnetized horizontally.

FIGS. 19A and 19B depict a four magnet-four pole piece hybrid structure similar to the magnetic structures of FIGS. 18A and 18B where the corner magnets are replaced with pole pieces.

FIGS. 19C and 19D depict lateral magnet hybrid structures that are similar to the hybrid structures of FIGS. 19A and 19B.

FIG. 19E depicts a twelve magnet-four pole piece hybrid structure that corresponds to a two-dimensional version of hybrid structure of FIGS. 17A-17F.

FIG. 19F depicts a twelve lateral magnet-four pole piece hybrid structure that corresponds to a two-dimensional version of the lateral magnet hybrid structure of FIGS. 17G-17K.

FIG. 19G depicts use of beveled magnets in a hybrid structure similar to the hybrid structure of FIG. 19E.

FIG. 19H depicts use of different sized magnets in one dimension versus another dimension in a hybrid structure similar to the hybrid structures of FIGS. 19E and 19G.

FIGS. 19I-19K depict movement of the rows of magnets versus the pole pieces and vertical magnets so as to control the flux that is available at the ends of the pole pieces.

FIG. 22H depicts a fourth exemplary hybrid rotor and stator coil arrangement.

FIG. 22I depicts an exemplary saddle core type stator-rotor interface.

FIG. 22J depicts a fifth exemplary hybrid rotor and stator coil arrangement.

FIG. 23A depicts an exemplary metal separator lateral magnet hybrid structure.

FIG. 23B depicts the magnetizations of the magnets of the exemplary metal separator lateral magnet hybrid structure of FIG. 23A.

FIG. 23C depicts an alternative exemplary metal separator lateral magnet hybrid structure having a rounded upper surface.

FIGS. 24A and 24B depict assemblies having magnets arranged in accordance with complementary cyclic Barker 4 codes.

FIG. 24C depicts two complementary cyclic lateral magnet assemblies being brought together such that their magnetic structures correlate.

FIGS. 27A and 27B depict an exemplary lateral magnet wheel assembly.

FIG. 28A depicts a second exemplary lateral magnet wheel assembly.

FIG. 28B depicts a third exemplary lateral magnet wheel assembly.

FIG. 28C depicts a fourth exemplary lateral magnet wheel assembly having exemplary friction surfaces.

FIGS. 29A-29D depict exemplary use of a guide ring and a slot within a target and optional friction surfaces.

FIGS. 30A and 30B depict exemplary combinations of lateral magnetic wheel assemblies and round targets having different diameters that function as gears.

FIGS. 31A-31C depict top, side, and oblique projection views of an exemplary lateral magnet connector assembly.

FIGS. 31D-31F depict top, side, and oblique projection views of the lateral magnet connector assembly of FIGS. 31A-31C attached to a target also having a connection region.

FIG. 31G depicts the lateral magnetic connector assembly of FIGS. 31A-31C in an attached state with a complementary lateral magnetic connector assembly.

FIGS. 32A and 32B depict top views of two exemplary lateral magnetic connector assemblies having non-magnetic spacers where the magnets are oriented in accordance with a Barker 4 code.

FIGS. 33A-33C depict three exemplary approaches for providing connectors that connect across a connection boundary.

FIGS. 34A and 34B depict exemplary electrical contacts 34 that can be used in an electrical connector.

FIG. 35A depicts a top view of an exemplary lateral magnet connector.

FIG. 35B depicts an exemplary striped magnet.

FIG. 35C depicts an oblique view of the exemplary lateral magnet connector assembly of FIG. 35A and a corresponding target.

FIG. 36A depicts an alternative view of the exemplary flux concentrator device and target of FIG. 5A.

FIG. 36B depicts an exemplary movable magnetic circuit that can be placed between the exemplary flux concentrator device and target shown in FIG. 36A.

FIG. 36C depicts an exemplary movable magnetic circuit in a first location relative to the exemplary flux concentrator device and target of FIG. 36A.

FIG. 36D depicts an exemplary movable magnetic circuit in a second location relative to the exemplary flux concentrator device and target of FIG. 36A.

FIG. 36E depicts an alternative view of the exemplary flux concentrator device, exemplary movable magnetic circuit, and target of FIG. 36A.

FIG. 36F depicts an exemplary movable magnetic circuit in a third location relative to the exemplary flux concentrator device and target of FIG. 36A.

FIG. 38A depicts a side view of an exemplary flux gap concentrator device configured to produce a high flux density in a gap between two pole pieces.

FIG. 38B depicts a front view of an exemplary pole piece such as is used in the flux gap concentrator device depicted in FIG. 38A.

FIG. 38C depicts a side view of another exemplary flux gap concentrator device configured to produce a high flux density region in a gap between two pole pieces.

FIG. 38D depicts a side view of an exemplary flux gap concentrator device configured to produce a high flux density in a gap between four pole pieces.

FIG. 39A depicts an exemplary flux gap de-concentrator device.

FIG. 39B depicts another exemplary flux de-concentrator device.

FIG. 39C depicts yet another exemplary flux de-concentrator device.

FIG. 40 depicts an exemplary flux concentrator device based on a Halbach magnet array.

FIG. 41A depicts another exemplary flux gap concentrator device based on a Halbach magnet array.

FIG. 41B depicts an exemplary flux gap concentrator device that is similar to the flux concentrator device of FIG. 40 except the funnel shaped pole pieces and have been replaced with elbow shaped pole pieces.

FIG. 42A depicts an exemplary coil subassembly.

FIG. 42B depicts an exemplary rotor assembly.

FIG. 42C depicts an exemplary flux gap concentrator device.

DETAILED DESCRIPTION OF THE INVENTION

Figure 1B:
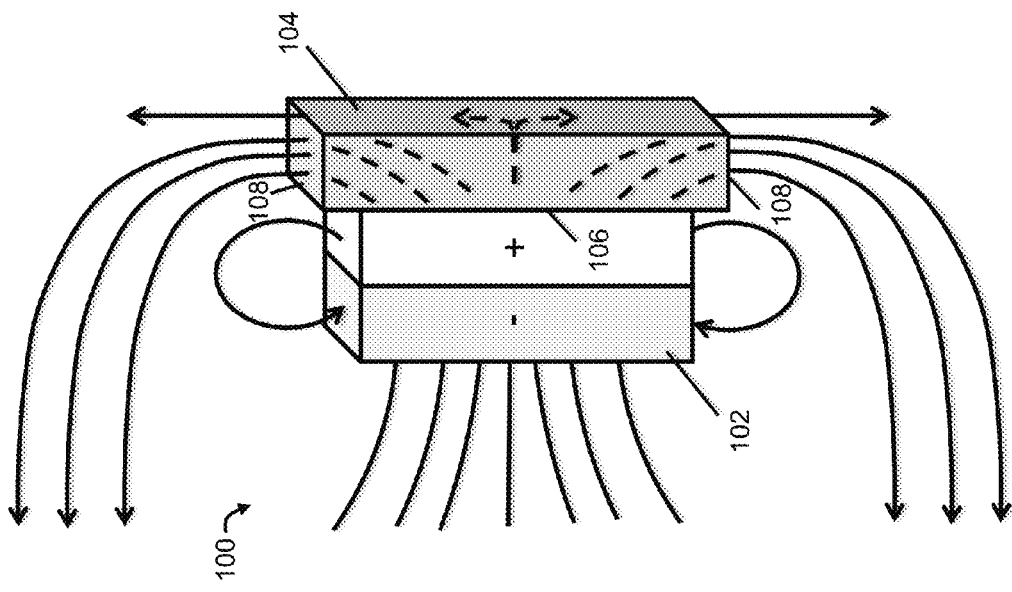
FIG. 1B depicts the magnet of FIG. 1A with a pole piece on one side.

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in the art.

Certain described embodiments may relate, by way of example but not limitation, to systems and/or apparatuses comprising magnetic structures, magnetic and non-magnetic materials, methods for using magnetic structures, magnetic structures having magnetic elements produced via magnetic printing, magnetic structures comprising arrays of discrete magnetic elements, combinations thereof, and so forth. Example realizations for such embodiments may be facilitated, at least in part, by the use of an emerging, revolutionary technology that may be termed correlated magnetics. This revolutionary technology referred to herein as correlated magnetics was first fully described and enabled in the co-assigned U.S. Pat. No. 7,800,471 issued on Sep. 21, 2010, and entitled "A Field Emission System and Method". The contents of this document are hereby incorporated herein by reference. A second generation of a correlated magnetic technology is described and enabled in the co-assigned U.S. Pat. No. 7,868,721 issued on Jan. 11, 2011, and entitled "A Field Emission System and Method". The contents of this document are hereby incorporated herein by reference. A third generation of a correlated magnetic technology is described and enabled in the co-assigned U.S. Pat. No. 8,179,219 issued on May 15, 2012, and entitled "A Field Emission System and Method". The contents of this document are hereby incorporated herein by reference. Another technology known as correlated inductance, which is related to correlated magnetics, has been described and enabled in the co-assigned U.S. Pat. No. 8,115,581 issued on Feb. 14, 2012, and entitled "A System and Method for Producing an Electric Pulse". The contents of this document are hereby incorporated by reference.

Material presented herein may relate to and/or be implemented in conjunction with multilevel correlated magnetic systems and methods for producing a multilevel correlated magnetic system such as described in U.S. Pat. No. 7,982,568 issued Jul. 19, 2011 which is all incorporated herein by reference in its entirety. Material presented herein may relate to and/or be implemented in conjunction with energy generation systems and methods such as described in U.S. Pat. No. 8,222,986 issued on Jul. 17, 2012, which is all incorporated herein by reference in its entirety. Such systems and methods described in U.S. Pat. No. 7,681,256 issued Mar. 23, 2010, U.S. Pat. No. 7,750,781 issued Jul. 6, 2010, U.S. Pat. No. 7,755,462 issued Jul. 13, 2010, U.S. Pat. No. 7,812,698 issued Oct. 12, 2010, 7,817,002, 7,817,003, 7,817,004, 7,817,005, and 7,817,006 issued Oct. 19, 2010, U.S. Pat. No. 7,821,367 issued Oct. 26, 2010, 7,823,300 and 7,824,083 issued Nov. 2, 2011, U.S. Pat. No. 7,834,729 issued Nov. 16, 2011, U.S. Pat. No. 7,839,247 issued Nov. 23, 2010, 7,843,295, 7,843,296, and 7,843,297 issued Nov. 30, 2010, U.S. Pat. No. 7,893,803 issued Feb. 22, 2011, 7,956,711 and 7,956,712 issued Jun. 7, 2011, 7,958,575, 7,961,068 and 7,961,069 issued Jun. 14, 2011, U.S. Pat. No. 7,963,818 issued Jun. 21, 2011, and 8,015,752 and 8,016,330 issued Sep. 13, 2011, and U.S. Pat. No. 8,035,260 issued Oct. 11, 2011 are all incorporated by reference herein in their entirety.

Material presented herein may relate to and/or be implemented in conjunction with systems and methods described in U.S. Provisional Patent Application 61/640,979, filed May 1, 2012 titled "System for Detaching a Magnetic Structure from a Ferromagnetic Material", which is incorporated herein by reference. Material may also relate to systems and methods described in U.S. Provisional Patent Application 61/796,253, filed Nov. 5 2012 titled "System for Controlling Magnetic Flux of a Multi-pole Magnetic Structure", which is incorporated herein by reference. Material may also relate to systems and methods described in U.S. Provisional Patent Application 61/735,460 filed Dec. 10, 2012 titled "An Intelligent Magnetic System", which is incorporated herein by reference.

The present invention relates to a system for concentrating magnetic flux of a multi-pole magnetic structure having rectangular or striped polarity regions having either a positive or negative polarity that are separated by non-magnetic regions, where the polarity regions may have an alternating polarity pattern or have a polarity pattern in accordance with a code, where herein an alternating polarity pattern corresponds to polarity regions having substantially the same size such that produced magnetic fields alternate in polarity substantially uniformly. In contrast, a coded polarity pattern may comprise adjacent regions having the same polarity (e.g., two North polarity stripes separated by a non-magnetized region) and adjacent regions having opposite polarity or may comprise alternating polarity regions that have different sizes (e.g., a North polarity region of width 2X next to a South polarity region of width X). As described in patents referenced above, coded magnetic structures have at least three code elements and produce peak forces when aligned with a complementary coded magnetic structure but have forces that substantially cancel when such structures are misaligned, whereas complementary (uniformly) alternating polarity magnetic structures produce either all attract forces or all repel forces when their respective magnetic regions are in various alignments. Several examples of coded magnetic structures based on Barker 4 codes are provided herein but one skilled in the art will understand that other Barker codes and other types of codes can be employed such as those described in the patents referenced above.

In accordance with the invention, polarity regions can be separated magnets or can be printed magnetic regions on a single piece of magnetizable material. Such printed regions can be stripes made up of groups of printed maxels such as described in patents referenced above. Pole pieces are magnetically attached to the magnets or (maxel stripes) using a magnet-to-pole piece interface with a first area. The pole pieces can then be attached to a target such as a piece of ferromagnetic material or to complementary pole pieces using a pole piece-to-target interface that has a second area substantially smaller than the first area. Alternatively, the target may be a gap between pole piece-to-target interfaces of two or more pole pieces. As such, flux provided by the magnetic structure is routed into the pole piece via the magnet-to-pole interface and out of the pole piece using the pole piece-to-target interface, where the amount of flux concentration corresponds to the ratio of the first area divided by the second area.

Although the subject of this invention is the concentration of flux, the goal and methods are quite different than prior art. Prior art methods produce regions of flux concentration somewhere on a surface of magnetic material, where most of the area required to concentrate the flux has low flux density such that when it is taken into account the average flux density across the whole surface is only modestly higher, or may be even lower, than the density that can be achieved with the surface of an ordinary magnet, which corresponds to it remanence flux density. Thus the force density across the surface of the structure, or the achieved pounds per square inch (psi), is not improved. The primary object of this invention is to produce a surface that when taken as a whole achieves a substantial increase in total flux and therefore force density when in proximity to a ferromagnetic material or another magnet. This is achieved by integrating the flux across a magnetic surface, which may be at right angles to the working surface, and then conducting it to the working surface. In this regard, a maximum force density or maximum force produced over an area (e.g., psi) is achieved when the cross section of the pole pieces where they interface with the working surface of a target are just in saturation when in a closed magnetic circuit, where the maximum force density is not achieved when the cross section of the pole pieces where they interface with the working surface of a target is over or under saturated. Furthermore, it is preferable that the magnetic material that sources the flux be as thin as possible but still provide magnetic flux at the saturation flux density of the magnetic material since a larger cross sectional area would act to dilute the force density since no flux emerges from its area, where under one arrangement, the magnetic material is thinner than the pole pieces used to concentrate the flux. This 'flux concentration' technique relies on the fact that the saturation flux density of known magnetic materials is substantially lower than the saturation flux density of materials such as low carbon steel or iron, where a saturation flux density corresponds to the maximum amount of flux that can be achieved for a given unit of area. Using this technique, force densities of four or more times the density of the strongest magnetic materials are possible. When inexpensive magnetic materials are used to supply the flux, the multiplication factor can be twenty or more permitting very strong magnetic structures to be constructed very inexpensively. When flux is routed at right angles to a working surface from a magnetic surface this 'flux concentration' technique can be referred to as a 'lateral magnet' technique.

Figure 1A:
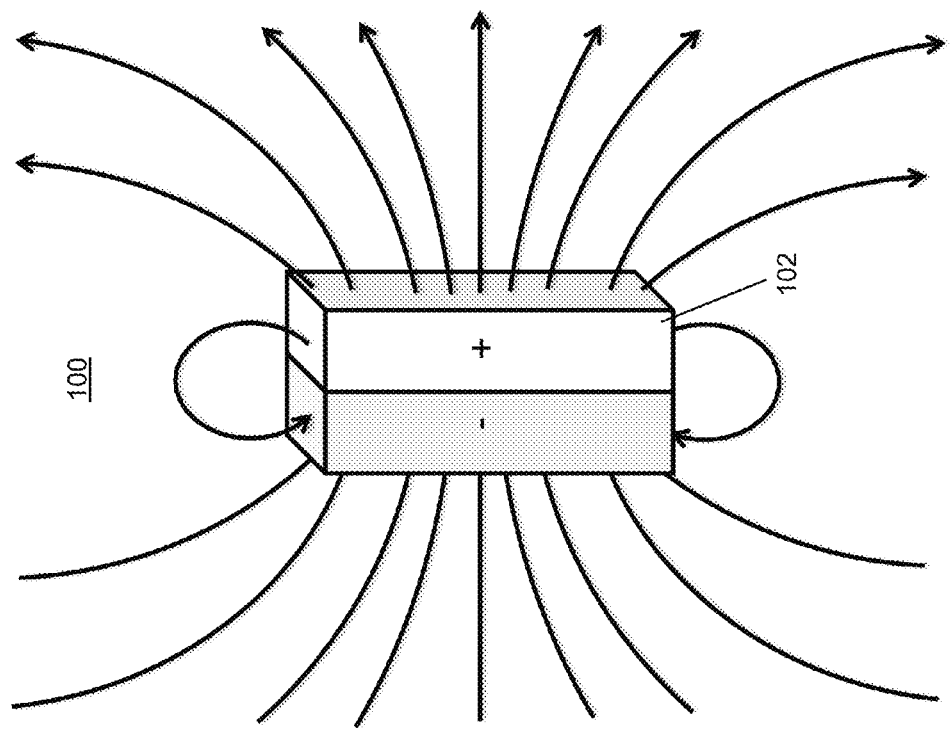
FIG. 1A depicts an exemplary magnetic field of a magnet.

FIG. 1A depicts an exemplary magnet field 100 of a magnet 102, where the magnetic flux lines pass from the South (−) pole to the North (+) pole and then wrap around the magnet to the South pole in a symmetrical manner. When a rectangular pole piece 104 having sufficient ferromagnetic material to achieve saturation is placed onto one side of the magnet 102 as shown in FIG. 1B, the magnetic flux passing from the South pole to the North pole is redirected substantially perpendicular to the magnet 102 by the pole piece 104 such that it exits the top and bottom of the pole piece 104 and again wraps around to the South pole of the magnet 102. As shown the pole piece 104 contacts the magnet 102 using a magnet-to-pole piece interface 106 that is substantially larger than the area of the ends 108 of the pole piece 104 from which the magnetic flux is shown exiting the pole piece 104.

Figure 1C:
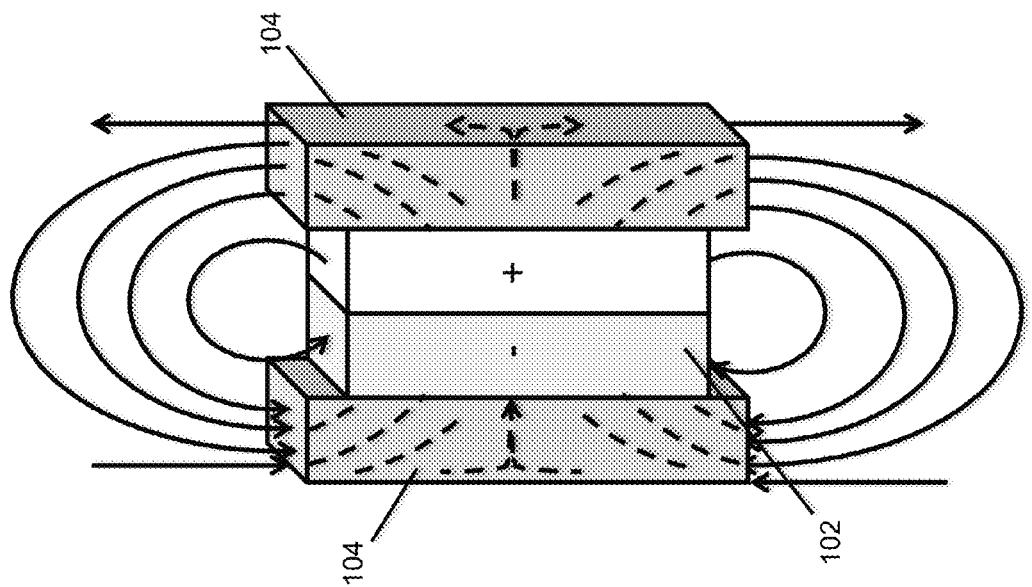
FIG. 1C depicts the magnet of FIG. 1A having pole pieces on opposite sides of the magnet.

FIG. 1C depicts a magnet 102 having two such rectangular pole pieces 104, where there is a pole piece 104 on each side of the magnet 102. As shown the flux is shown being primarily above and below the magnet 102 such that it's attachment interface has been fully rotated 90°.

FIGS. 2A and 2B depict portions of exemplary magnetic fields 100 between two adjacent magnets 102 having an opposite polarity relationship, where each magnet 102 has a pole piece 104 on one side.

FIGS. 3A and 3B depict portions of exemplary magnetic fields 100 between two adjacent magnets 102 having an opposite polarity relationship, where each magnet 102 has pole pieces 104 on both sides of the magnet 102. Exemplary magnetic fields between the bottom of the pole pieces 104 and the magnets 102, and between the bottoms of the pole pieces 104 are not shown in FIG. 3A.

FIG. 4A depicts an exemplary magnetic structure 400 comprising two spaced magnets 102 having an opposite (or alternating) polarity relationship attached by a shunt plate 402 and attached to a target 404 such as a piece of iron.

FIG. 4B depicts an exemplary magnetic flux circuit created by the shunt plate 402 and the target 404 as indicated by the dotted oval shape. Note that the spacing between magnets 102 can be air or it can be any form of non-magnetic material such as plastic, Aluminum, or the like.

FIG. 4C depicts an exemplary magnetic structure 406 comprising four magnets 102 having an alternating polarity relationship having a shunt plate 402 and attached to a target 404 such that three magnetic flux circuits are created.

FIG. 4D depicts an oblique projection of the magnetic structure 406 of FIG. 4C approaching the target 404, where the target interface area 408 of each magnet 102 has an area equal to the magnet's height (h) multiplied by the magnet's width ($d_1$).

FIG. 5A depicts an exemplary flux concentrator device 500 in accordance with one embodiment of the present invention, which corresponds to the magnetic structure and shunt plate of FIG. 4C with four rectangular pole pieces 104 that each have magnet-to-pole piece interface 502 that interface fully with the target interface surfaces 408 of each of the four magnets 102 of the magnetic structure. The pole pieces 104 are each shown to have a pole piece-to-target interface 504 having an area equal to each pole piece's width (d1) to the pole piece's thickness (d2), where each pole piece width may be equal to the width of the magnet 102 to which it is attached. As such, the flux that is directed to the target 404 is concentrated from a first surface area (d1×h) of the magnet-to-pole piece interface 502 to the second surface area (d1×d2), of the pole piece-to-target interface 504 where the amount of flux concentration corresponds to the ratio of the two areas. Generally, a flux concentrator device 500 may include a magnetic structure comprising a plurality of discrete magnets separated by spacings or may include a printed magnetic structure with maxel stripes separated by spacings (i.e., non-magnetized regions or stripes) and pole pieces 104 that interface with the discrete magnets 102 or the maxel stripes. Maxel stripes are depicted in FIGS. 15A-15D. The pole pieces may extend at least the height of the magnet structure (or beyond) with the purpose of directing flux 90 degrees thereby achieving a greater (pounds force per square inch) psi at the top and/or bottom of the pole pieces 104 than can be achieved at the sides of the magnets 102 to which they are interfacing. Optional shunt plates 402 are shown on the sides of the magnets 102 opposite the pole pieces 104.

FIG. 5B depicts an exemplary magnetic flux circuit 506, where on one side of the magnets 102 the circuit is made using a shunt plate 402 and on the other side of the magnets 102 the circuit is made using two pole pieces 104 attached to a target 404 that spans the two pole pieces 102.

FIG. 5C depicts the exemplary flux concentrator device 500 of FIG. 5A that has been attached to a target 404 that spans the four pole pieces 104 of the device 500. As such, FIG. 5C depicts the three magnetic flux circuits resulting from the use of the shunt plate 402, the pole pieces 104, and the target 404 with the magnets 102.

Figure 6B:
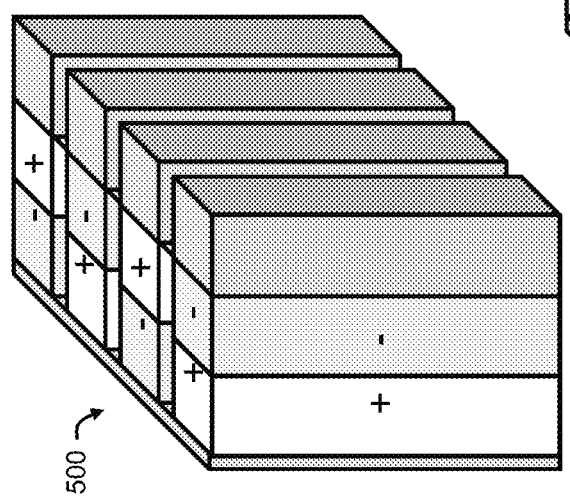
FIG. 6B shows an exemplary flux concentrator device similar to the device of FIG. 5A except the pole pieces are the full length of the magnets making of the magnetic structure and do not extend above or below the magnetic structure.
Figure 6A:
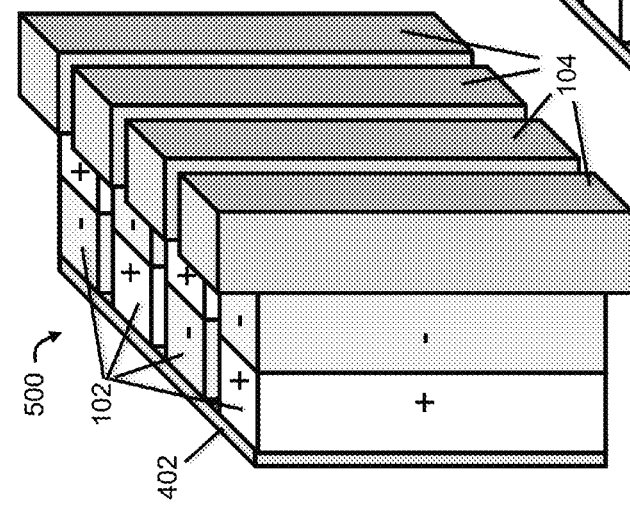
FIG. 6A shows an exemplary flux concentrator device similar to the device of FIG. 5A except the pole pieces extend both above and below the magnetic structure.
Figure 6D:
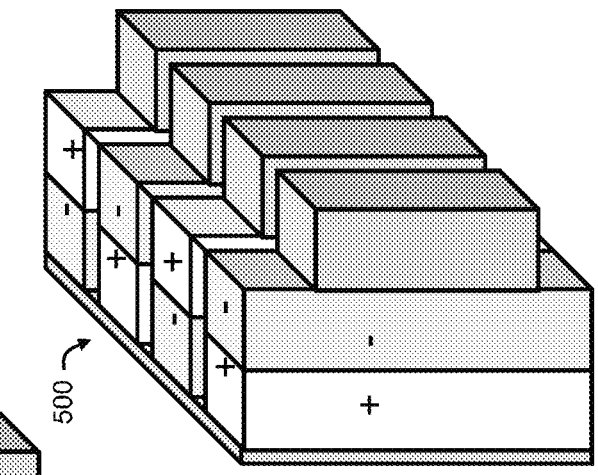
FIG. 6D shows an exemplary flux concentrator device similar to the device of FIG. 5A except the pole pieces are shorter than the magnets of the magnetic structure where the pole pieces are configured to accept targets at the top and bottom of the device.
Figure 6C:
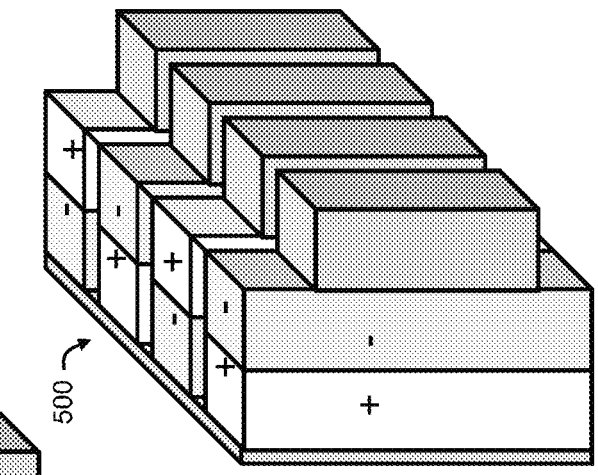
FIG. 6C shows an exemplary flux concentrator device similar to the device of FIG. 5A except the pole pieces are shorter than the magnets of the magnetic structure where the pole pieces are configured to accept targets at the top of the device.

FIG. 6A shows an exemplary flux concentrator device 500 similar to the device 500 of FIG. 5A except the pole pieces 104 extend both above and below the magnetic structure made up of magnets 102. In FIG. 6B, the pole pieces 104 are the full length of the magnets 102 making up the magnetic structure but do not otherwise extend above or below the magnetic structure. In FIG. 6C, the pole pieces 104 are shorter than the magnets 102 of the magnetic structure where it is intended that the target 404 (not shown) interface with both the magnets 102 and the pole pieces 104. Similarly, in FIG. 6D, the pole pieces 104 are configured to accept targets 404 bottom that interface with the magnets 102 and the pole pieces 104 at the top of the device pole pieces 104.

FIG. 6E depicts additional pole pieces 602 having been added to the upper portions of the magnets 102 in the device 500 of FIG. 6C in order to provide protection to the surfaces of the magnets 102.

FIGS. 7A-7E depict various exemplary flux concentrator devices 700 having pole pieces on both sides of the magnetic structures. FIG. 7A depicts a magnetic structure comprising four alternating polarity magnets 102, which could be four alternating polarity maxel stripes (i.e., a printed magnetic structure), sandwiched between pole pieces 104 that extend from the bottom of the magnets 102 and then slightly above the magnets 102. FIG. 7B depicts pole pieces 104 that extend both above and below the magnets 102. FIG. 7C depicts pole pieces 104 that are the same height and are attached flush with the magnets 102. FIG. 7D depict pole pieces 104 that are shorter than the magnets 102 for receiving a target 404 (not shown) having a corresponding shape (e.g., an elongated C or U shape) or two bar shaped targets 404. FIG. 7E depicts pole pieces 104 configured for receiving two targets 404 having a corresponding shape or four bar shaped targets 404.

FIG. 8A depicts an exemplary flux concentrating device 800 comprising three magnetic structures like those of FIG. 7A except the magnets 102 in the middle structure are each rotated 180° compared to the magnets 102 in the two outer most structures. Because the eight pole pieces 104 in the inside of the device 800 are receiving twice the flux as the eight pole pieces 104 on the outside of the device 800, those pole pieces on the outside are reduced by half such that their PSI is substantially the same as those inside the device 800. FIG. 8B depicts an exemplary flux concentrating device 800 like that of FIG. 8A except the pole pieces 104 in the inside of the device are configured to accept targets 404 (not shown) that recess into the device 800. Such recessing into the device 800 provides a male-female type connection that can provide mechanical strength in addition to magnetic forces.

The concept of male-female type interfaces is further depicted in FIGS. 9A-9G where various shapes are shown, where one skilled in the art will recognize that all sorts of interfaces are possible other than flat interfaces between pole pieces 104 of flux concentrator devices 500/700/800 and targets 404, which may be pole pieces 104 of another flux concentrator device 500/700/800.

FIG. 10A depicts an exemplary flux concentrator device 1000 like that shown previously in FIG. 5A, where the magnetic structure comprises four spaced magnets 102 (or maxel stripes) having a polarity pattern in accordance with a Barker 4 code. FIG. 10B depicts another exemplary flux concentrator device 1000 like that of FIG. 10A, where the magnets 102 of the magnetic structure have a polarity pattern that is complementary to the magnets 102 of the magnetic structure of FIG. 10A. As such, either of the flux concentrator devices 800 of FIGS. 10A and 10B can be turned upside down where the pole pieces 104 of one of the flux concentrator devices 800 is attached to the pole pieces 104 of the other flux concentrator device 800 in accordance with the Barker 4 correlation function.

FIGS. 11A and 11B depict complementary Barker-4 coded flux concentrator devices 1100 that like those of FIGS. 10A and 10B that can be turned upside down and aligned with the other device 1100 so as to produce a peak attractive force. It should be noted that if either structure is placed on top of a duplicate of itself that a peak repel force can be produced, which is effectively inverting the correlation function of the Barker 4 code.

FIG. 12 depicts four Barker-4 coded flux concentrator devices 1000 oriented in an array where they are spaced apart that produce a Barker-4 by Barker-4 coded composite flux concentrator device 1200.

Figures 13A, 13B:
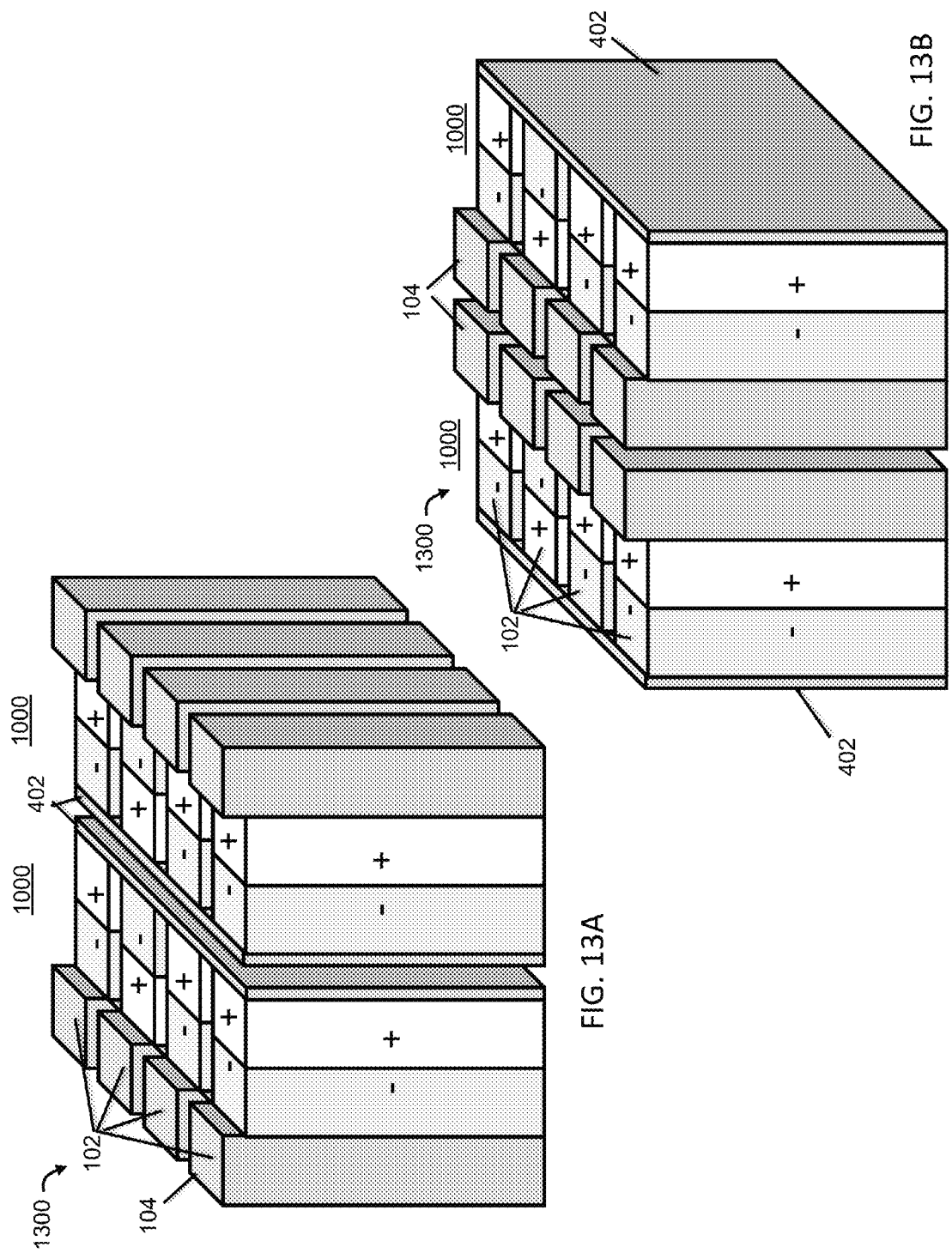
FIGS. 13A and 13B depict two variations of self-complementary Barker4-2 coded flux concentrator devices.

FIGS. 13A and 13B depict two variations of self-complementary Barker4-2 coded flux concentrator devices 1300, where each device can be placed on top of a duplicate device 1300 and aligned to produce a peak attract force and where the devices will align in the direction perpendicular to the code because each Barker-4 code element is represented by a '+−' or '−+' symbol implemented perpendicular to the code.

Figure 14:
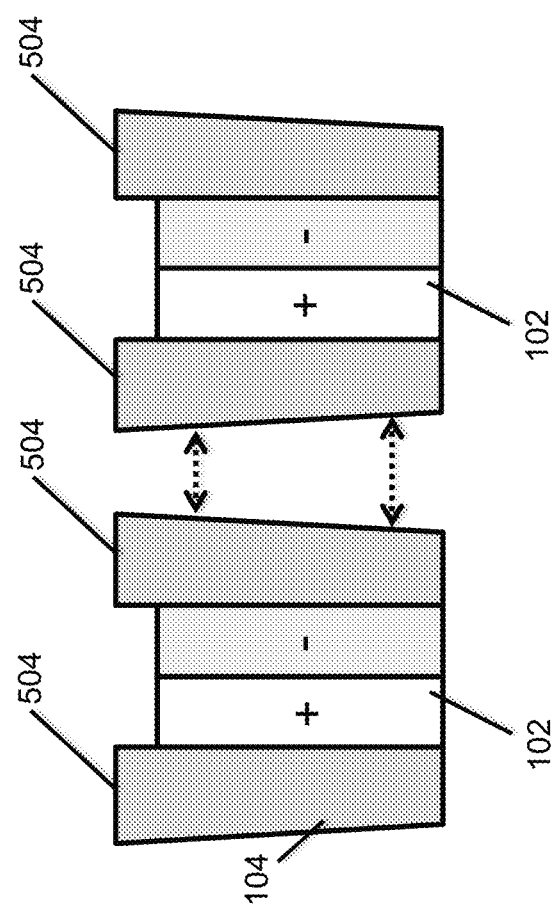
FIG. 14 depicts exemplary tapered pole pieces.

FIG. 14 depicts exemplary tapered pole pieces 104. In FIG. 14 the pole pieces 104 are tapered such that they are thinner at the bottom of the magnets 102 and grow thicker and thicker towards the pole piece-to-target interface 504. By tapering the pole pieces 104, there can be less flux leakage between adjacent pole pieces 104.

Figure 15B:
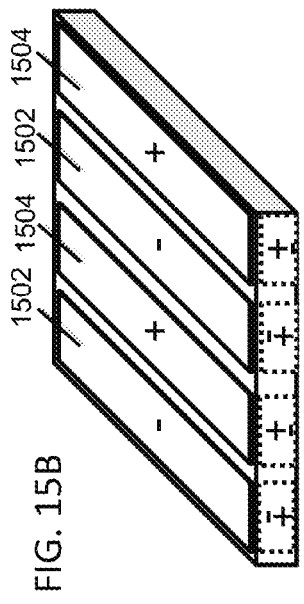
FIGS. 15A and 15B depict an exemplary printed magnetic structure that comprises alternating polarity spaced maxel stripes.
Figure 15A:
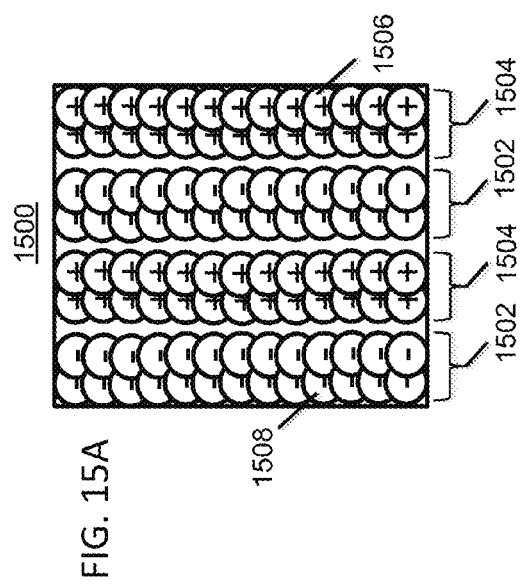
Figure 15D:
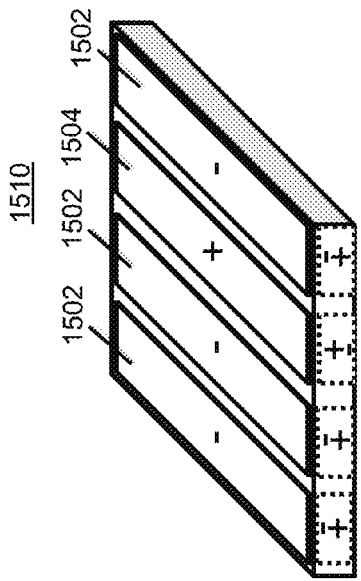
FIGS. 15C and 15D depict an exemplary printed magnetic structure that comprises spaced Barker-4 coded maxel stripes.
Figure 15C:
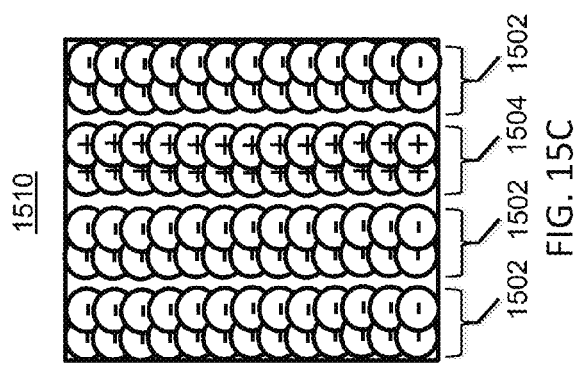

FIGS. 15A and 15B depict and exemplary printed magnetic structure 1500 that comprises alternating polarity spaced maxel stripes 1502 1504, where each of the overlapping circles represents a printed positive polarity maxel 1506 or negative polarity maxel 1508. FIGS. 15C and 15D depicts an exemplary printed magnetic structure 1510 comprising spaced maxel stripes 1502 1504 having a polarity pattern in accordance with a Barker 4 pattern.

In accordance with another embodiment of the invention, a magnetic structure is movable relative to one or more pole pieces enabling force at a pole piece-to-target interface to be turned on, turned off, or controlled between some minimum and maximum value. One skilled in the art will recognize that the magnetic structure may be tilted relative to pole pieces or may be moved such that the pole pieces span between opposite polarity magnets (or stripes) so as to substantially prevent the magnetic flux from being provided to the pole piece-to-target interface. Systems and methods for moving pole pieces relative to a magnetic structure are described in patent filings previously referenced.

Figure 16A:
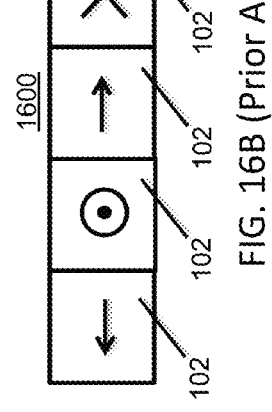
FIG. 16A depicts an oblique view of an exemplary prior art Halbach array.
Figure 16B:
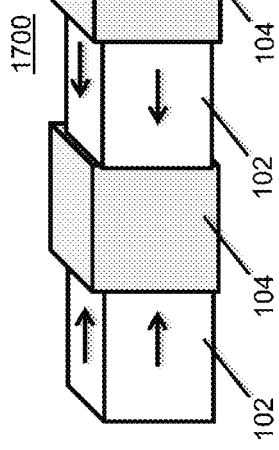
FIG. 16B depicts a top down view of the same exemplary Halbach array of FIG. 16A.

FIG. 16A depicts an oblique view of an exemplary prior art Halbach array 1600 constructed of five discreet magnets 102 having magnetization directions in accordance with the directions of the arrows, where X represents the back end (or tail) of an arrow and the circle with a dot in the middle represents the front end (or tip) of an arrow. Such an array causes the magnetic flux to be concentrated beneath the structure as shown. FIG. 16B depicts a top down view of the same exemplary Halbach array 1600 of FIG. 16A.

Figure 17A:
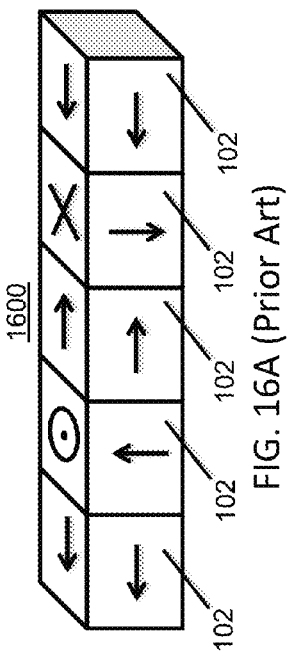
FIGS. 17A and 17B depict side and oblique views of an exemplary hybrid magnet-pole piece structure in accordance with one aspect of the invention.
Figure 17B:
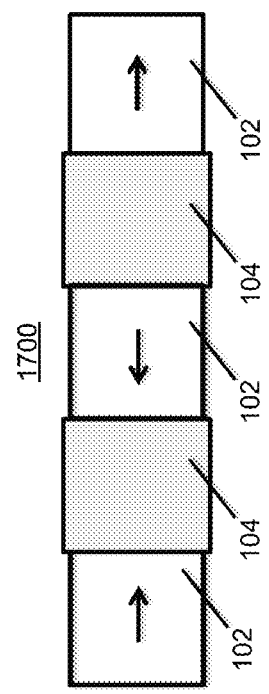
Figure 17C:
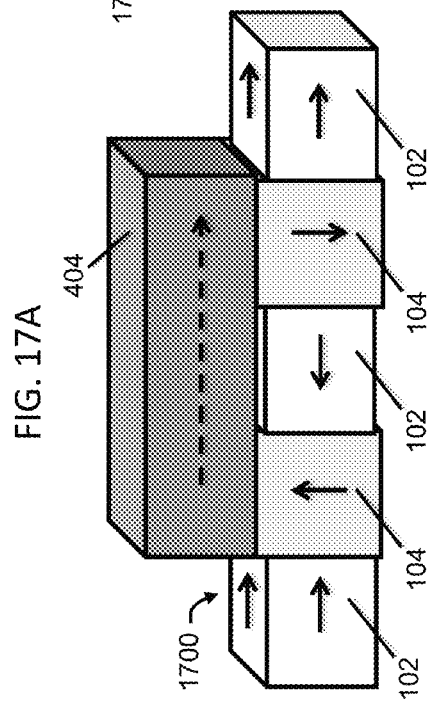
FIG. 17C depicts a target on top of the exemplary hybrid magnet-pole piece structure of FIGS. 17A and 17B where flux lines are shown moving in a clockwise direction.
Figure 17D:
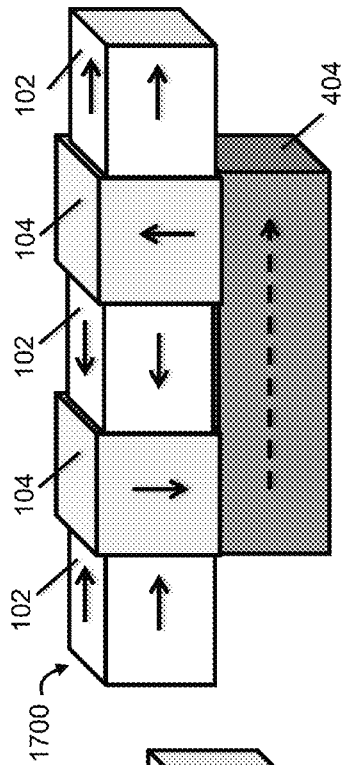
FIG. 17D depicts a target on bottom of the exemplary hybrid magnet-pole piece structure of FIGS. 17A and 17B where flux lines are shown moving in a counter-clockwise direction.
Figure 17E:
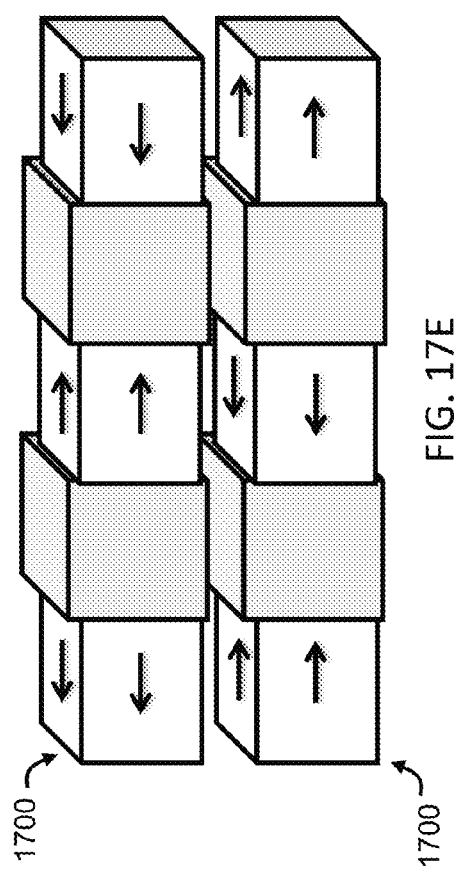
FIG. 17E depicts separated complementary three magnet-two pole piece arrays.
Figure 17F:
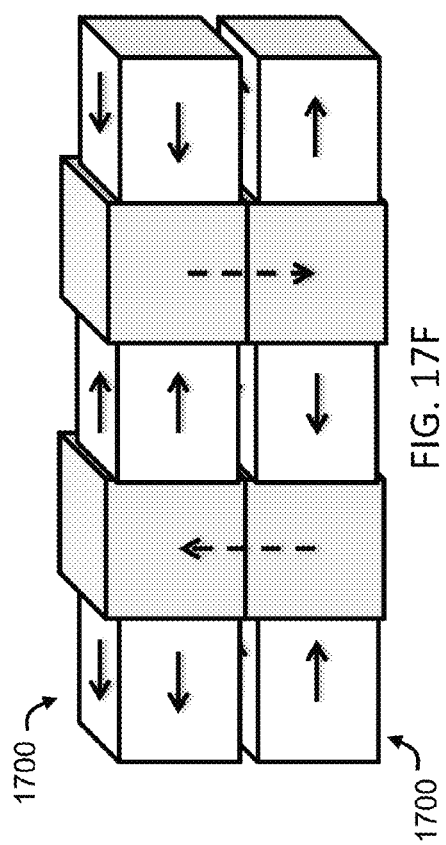
FIG. 17F depicts the complementary arrays of FIG. 17E in contact.

FIGS. 17A and 17B depict side and oblique views of an exemplary hybrid magnet-pole piece structure 1700 in accordance with one aspect of the invention. The hybrid magnet-pole piece structure 1700 comprises three magnets 102 sandwiching two pole pieces 104, where the magnets 104 have a polarity arrangement like those of the first, third, and fifth magnets of the Halbach array 1600 of FIGS. 16A and 16B. The magnetic behavior however, is substantially different. With the Halbach array of magnets 102, the field is always concentrated on one side of the magnetic structure 1600. With the hybrid magnet-pole piece structure (or hybrid structure) 1700, when a target material 404 such as a ferromagnetic material is not present to complete a circuit between the two pole pieces 104, the opposite polarity fields emitted by the pole pieces are emitted on all sides of the poles substantially equally. But, when a target material 404 is placed on any of the four sides of the hybrid structure, a magnetic circuit is closed, where the direction of the fields through the pole pieces depends on which side the target 404 is placed. For example, in FIG. 17C the flux lines are shown moving in a clockwise direction, whereas in FIG. 17D the flux lines are shown moving in a clockwise direction, where the flux through the magnet 102 and target 404 is the same in both instances but the flux direction through the poles 104 is reversed. Similarly, the targets could be placed on the front or back of the hybrid structure 1700 and the flux lines going through the pole pieces 104 would rotate plus or minus ninety degrees.

Figure 17H:
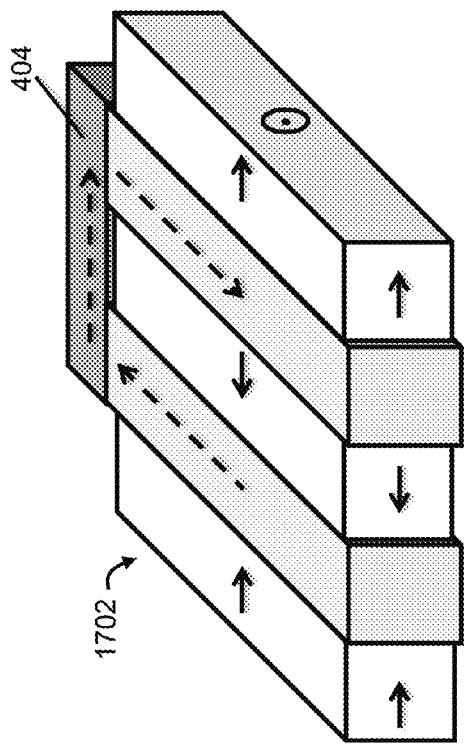
FIG. 17H depicts the exemplary lateral magnet hybrid structure of FIG. 17G with a target attached on a first side such that flux lines move in a clockwise manner.
Figure 17G:
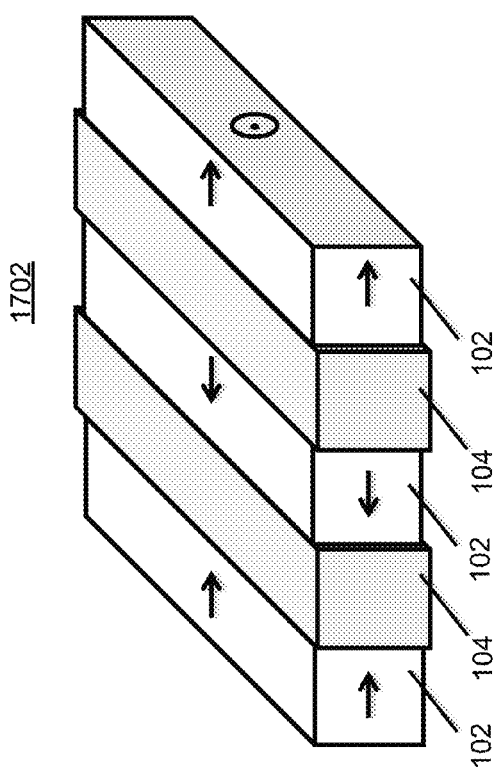
FIG. 17G depicts an exemplary lateral magnet hybrid structure.
Figure 17I:
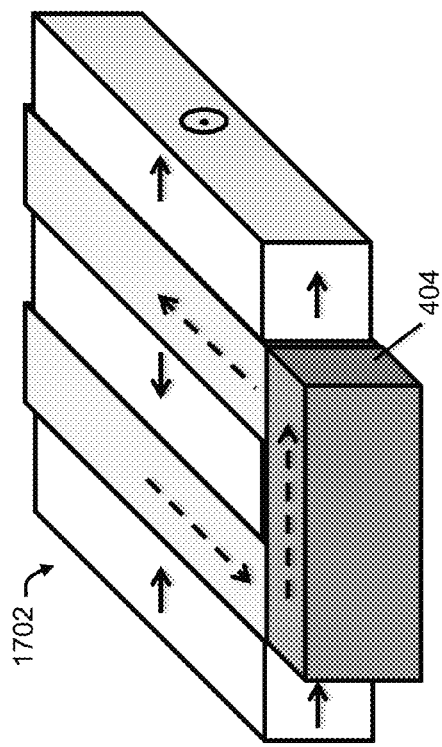
FIG. 17I depicts the exemplary lateral magnet hybrid structure of FIG. 17G with a target attached on a second side such that flux lines move in a counter-clockwise manner.
Figures 17J, 17K:
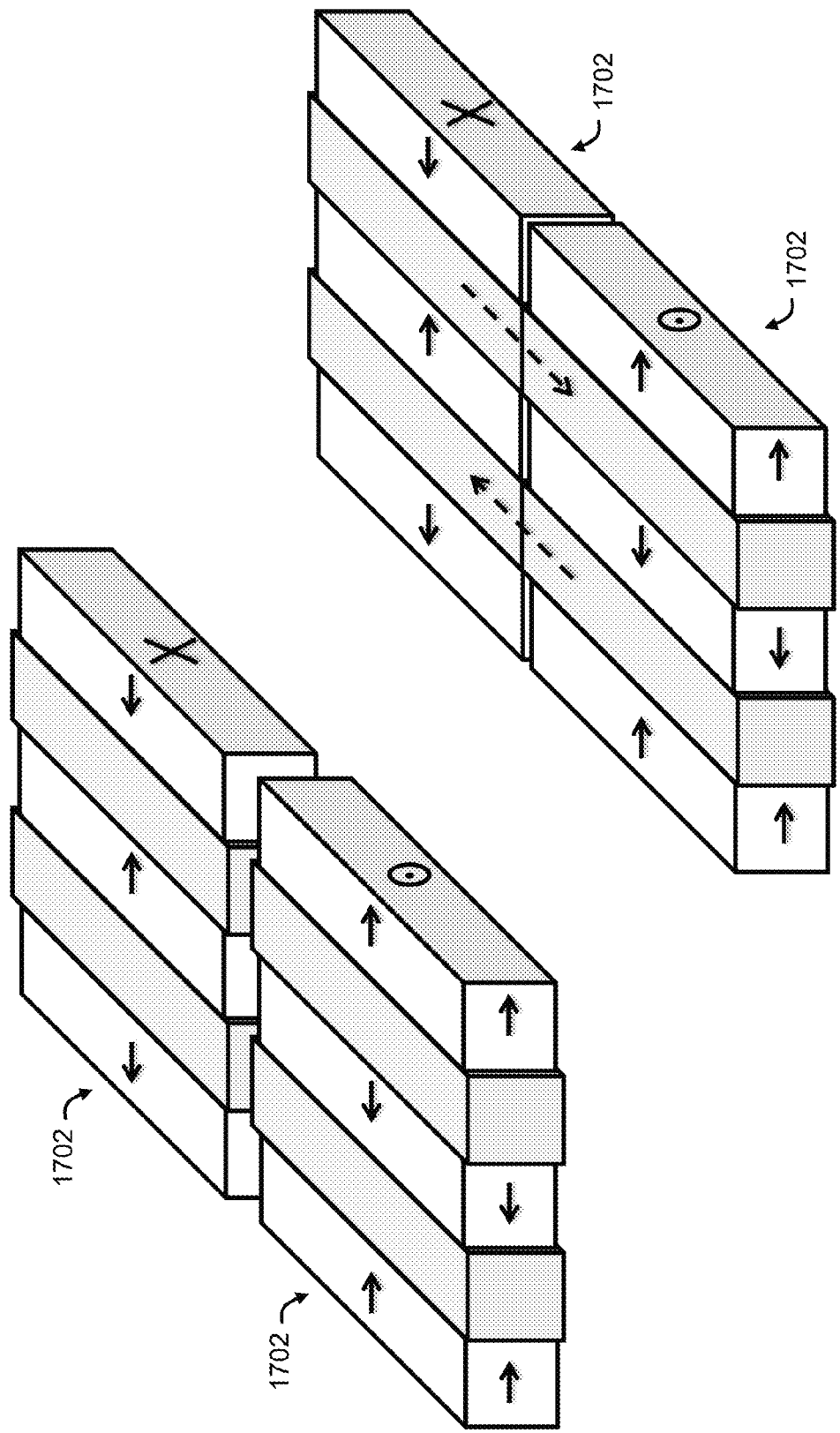
FIG. 17J depicts separated complementary lateral magnet hybrid structures like depicted in FIG. 17G.
FIG. 17K depicts complementary lateral magnet hybrid structures like depicted in FIG. 17G in contact.

Similarly, as shown in FIGS. 17J and 17K, two complementary hybrid structures 1700 can be near each other but separated and they will not substantially react magnetically until the pole pieces 104 of the hybrid structures 1700 are substantially close or they come in contact at which time a circuit is completed between them and the flux is concentrated at the ends of the contacting pole pieces 104.

FIG. 17G depicts a lateral magnet hybrid structure 1702 where without a target 404 the fields emitted at the ends of the poles pieces 104 are substantially the same and are not concentrated. Like with the hybrid structure 1700 shown in FIGS. 17A-17D, the flux direction through the pole pieces 104 depends on which ends of the pole pieces 104 that the target 404 is placed. In FIG. 17H, the flux is shown moving in a clockwise manner but in FIG. 17I, the flux is shown moving in a counter-clockwise direction.

Similarly, as shown in FIGS. 17J and 17K, two complementary lateral magnet hybrid structures 1702 can be near each other but separated and they will not substantially react magnetically until the pole pieces 104 of the hybrid structures 1702 are substantially close or they come in contact at which time a circuit is completed between them and the flux is concentrated at the ends of the contacting pole pieces 104.

FIGS. 18A and 18B depict a prior art magnet structure 1800 where the magnets in the four corners are magnetized vertically and the side magnets between the corner magnets are magnetized horizontally. The side magnets are oriented such that flux moves towards the corner magnets where the flux is moving downwards and away from the corner magnets where the flux is moving upwards. The resulting effect is that flux is always concentrated beneath the structure.

Figure 19M:
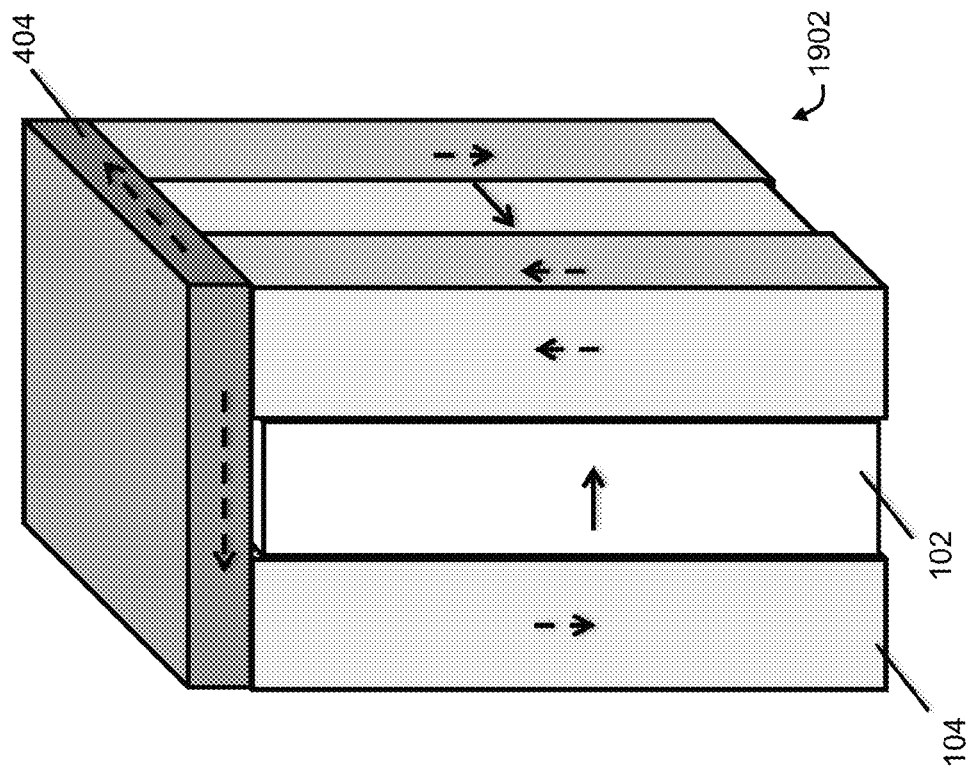
FIGS. 19L and 19M depict lateral magnet hybrid structures that are similar to the hybrid structures of FIGS. 19C and 19D except with elongated magnets and pole pieces.
Figure 19L:
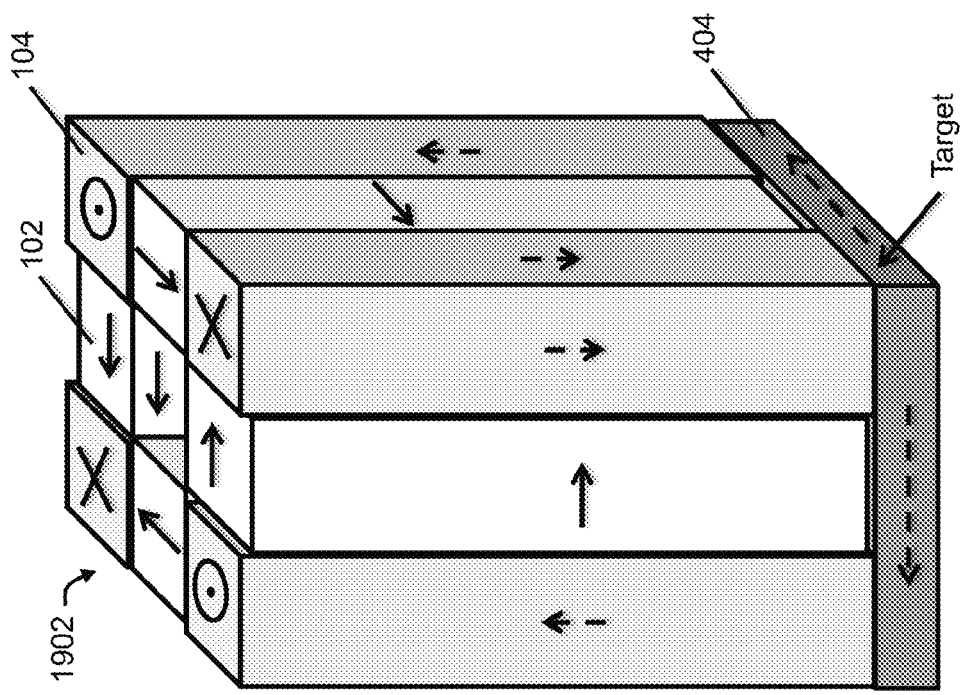

FIGS. 19A and 19B depict a four magnet-four pole piece hybrid structure 1900 similar to the magnetic structures 1800 of FIGS. 18A and 18B where the corner magnets 102 are replaced with pole pieces 104. In a manner similar to the hybrid structures 1700 of FIGS. 17A and 17B, when a target material 404 such as a ferromagnetic material is not present to complete a circuit between any two pole pieces 104 of adjacent corners, the pole pieces 104 of the hybrid structure 1900 of FIGS. 19A and 19B will emit opposite polarity fields on all sides of the poles substantially equally. However, when a target 404 is placed on top of the hybrid structure 1900, magnetic circuits are produced between poles 104 of adjacent corners where the direction of the flux passing through the poles 104 depends on where the target 404 is placed. As shown, the flux changes direction through the pole pieces 104 when the target 404 is moved from the top of the hybrid structure 1900, as depicted in FIG. 19A, to the bottom of the hybrid structure 1900, as depicted in FIG. 19B.

FIGS. 19C and 19D depict lateral magnet hybrid structures 1902 that are similar to the hybrid structures 1900 of FIGS. 19A and 19B.

FIG. 19E depicts a twelve magnet-four pole piece hybrid structure 1904 that corresponds to a two-dimensional version of the hybrid structure 1700 of FIGS. 17A-17F.

FIG. 19F depicts a twelve lateral magnet-four pole piece hybrid structure 1906 that corresponds to a two-dimensional version of the lateral magnet hybrid structure 1702 of FIGS. 17G-17K.

FIG. 19G depicts use of beveled magnets 102 in a hybrid structure 1908 similar to the hybrid structure 1904 of FIG. 19E.

FIG. 19H depicts use of different sized magnets 102 in one dimension versus another dimension in a hybrid structure 1910 similar to the hybrid structures 1904 1908 of FIGS. 19E and 19G.

FIGS. 19I-19K depict movement of the rows of magnets versus the pole pieces 104 and vertical magnets 102 so as to control the flux that is available at the ends of the pole pieces 104.

Figure 20:
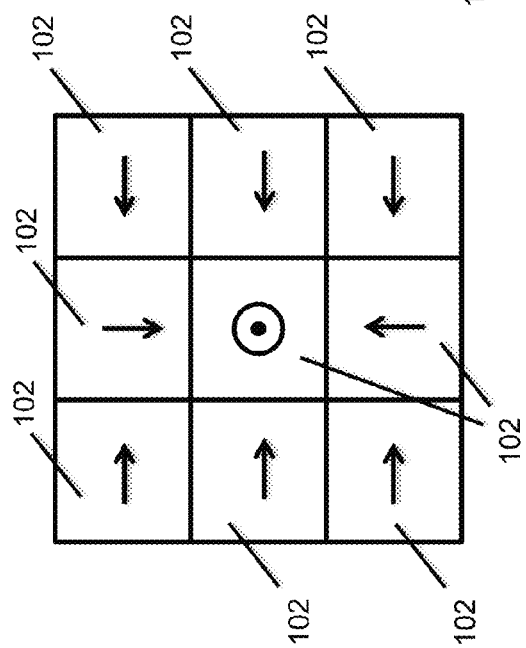
FIG. 20 depicts a prior art magnetic structure that directs flux to the top of the structure.

FIG. 20 depicts a prior art magnetic structure that directs flux to the top of the structure.

Figure 21A:
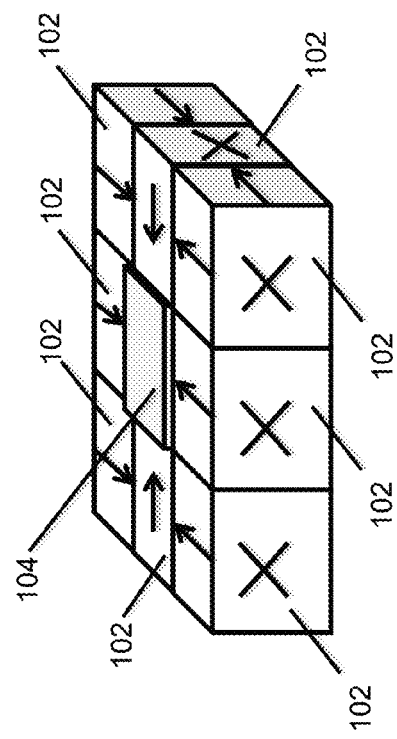
FIGS. 21A and 21B depict a hybrid structure and a lateral magnet hybrid structure each having a pole piece surrounded by eight magnets in the same magnet pattern as the magnetic structure of FIG. 20.
Figure 21B:
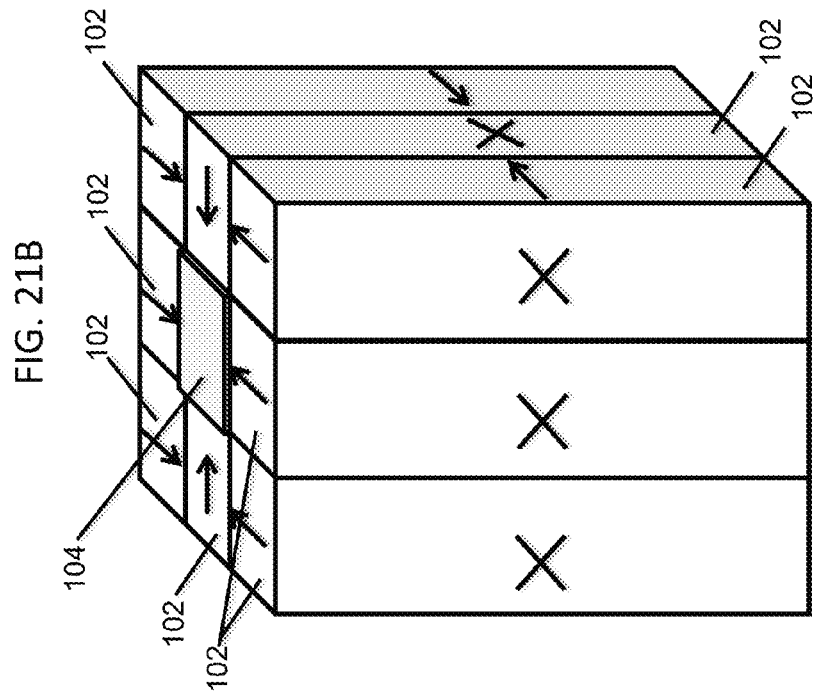

FIGS. 21A and 21B depict a hybrid structure and a lateral magnet hybrid structure each having a pole piece surrounded by eight magnets in the same magnet pattern as the magnetic structure of FIG. 20, where the direction of the flux through the pole piece will depend on which end a target is placed.

Figure 22B:
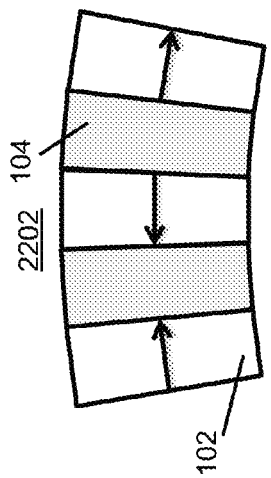
FIG. 22B provides an enlarged segment of the rotor of FIG. 22A.
Figure 22C:
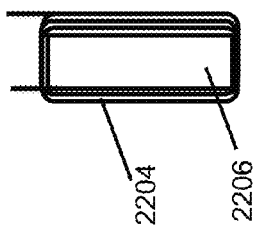
FIGS. 22C and 22D depict exemplary stator coils.
Figure 22D:
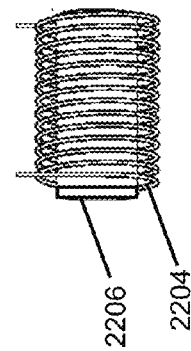
Figure 22A:
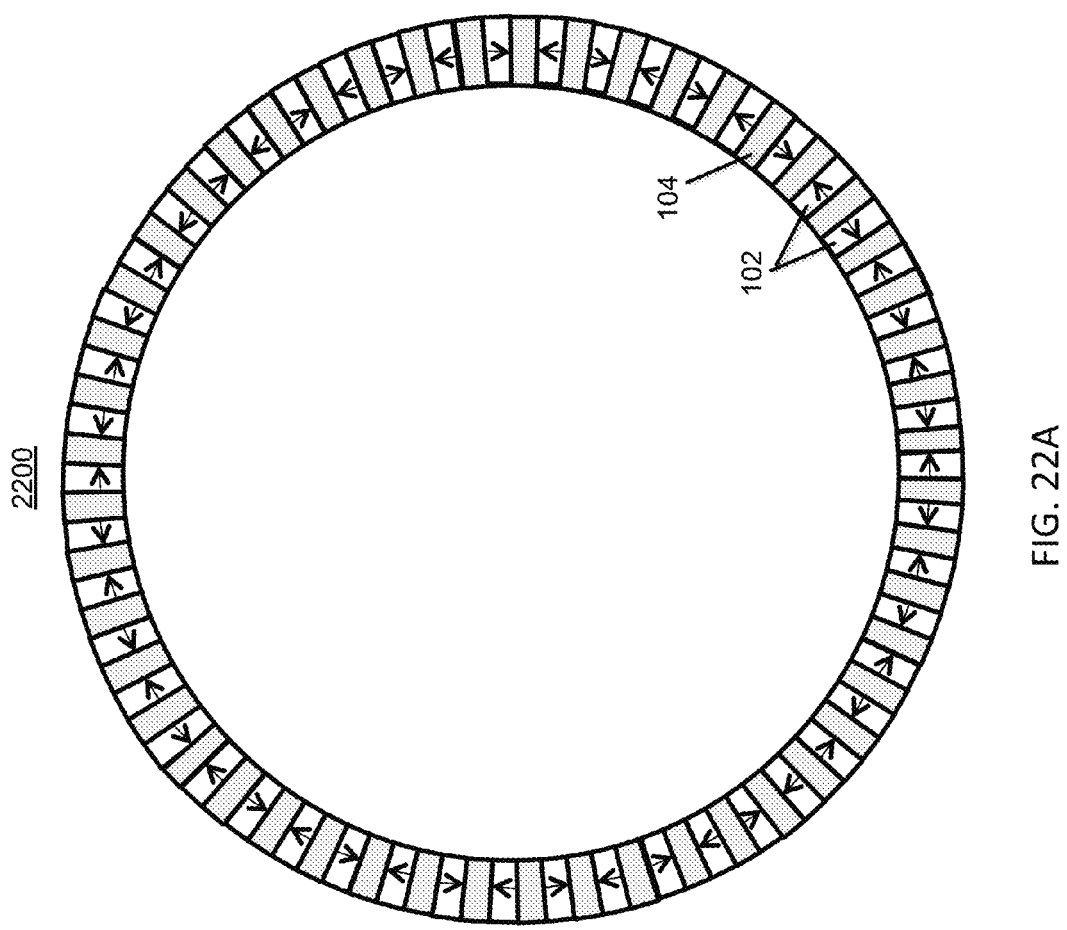
FIG. 22A depicts an exemplary hybrid rotor in accordance with the invention.

FIG. 22A depicts an exemplary hybrid rotor 2200 in accordance with the invention where lateral magnets 102 on either side of pole pieces 104 alternate such that their magnetization is as depicted with the arrows shown. FIG. 22B provides an enlarged segment 2202 of the rotor 2200. Stator coils 2204 having cores 2206 such as depicted in FIGS. 22C and 22D would be placed on a corresponding stator (not shown), where there could be a one-to-one relationship between the number of stator coils 2204 and pole pieces 104 on a rotor 2200 or there could be less stator coils 2204 by some desired ratio of stator coils 2204 to pole pieces 104. The pole pieces 104 and the cores 2206 of each stator coil 2204 are configured such that flux from the pole piece 104 can traverse a small gap between a given pole piece 104 and a given core 2206 of a given stator coil 2204. One skilled in the art will recognize that this arrangement corresponds to a pole piece 104 to stator coil 2204 interface that can be used to enable motors, generators, actuators, and the like based on the use of lateral magnet arrangements.

Figure 22E:
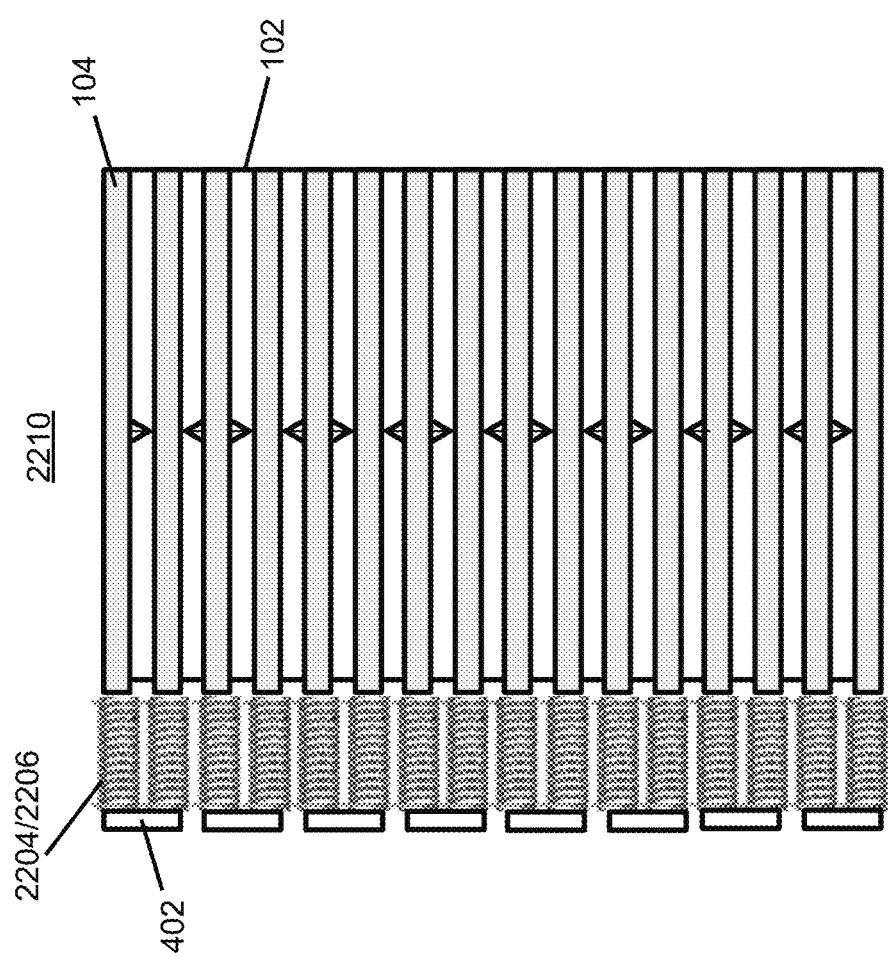
FIG. 22E depicts a first exemplary hybrid rotor and stator coil arrangement.

FIG. 22E depicts an exemplary hybrid rotor and stator coil arrangement 2210 where the cores 2206 of paired stator coils 2204 have shunts plates 402 that join the cores 2206.

Figure 22F:
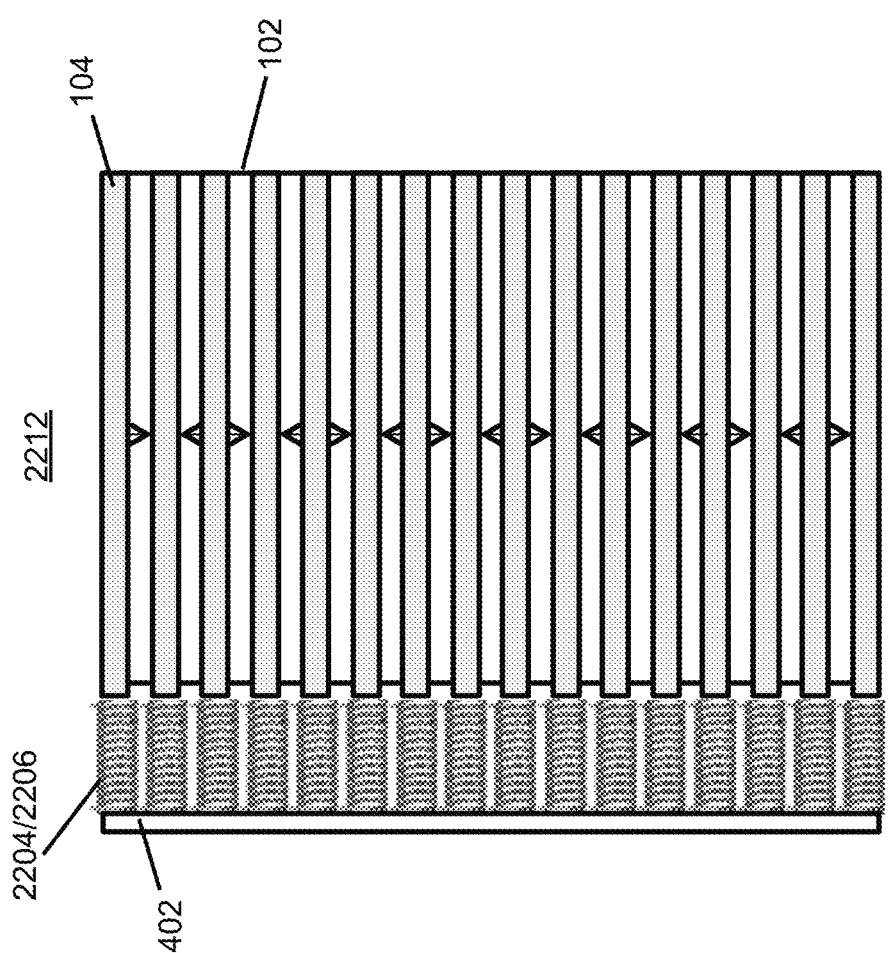
FIG. 22F depicts a second exemplary hybrid rotor and stator coil arrangement

FIG. 22F depicts an exemplary hybrid rotor and stator coil arrangement 2212 where the cores 2206 of paired stator coils 2204 are all joined by a single shunt plate 402.

Figure 22G:
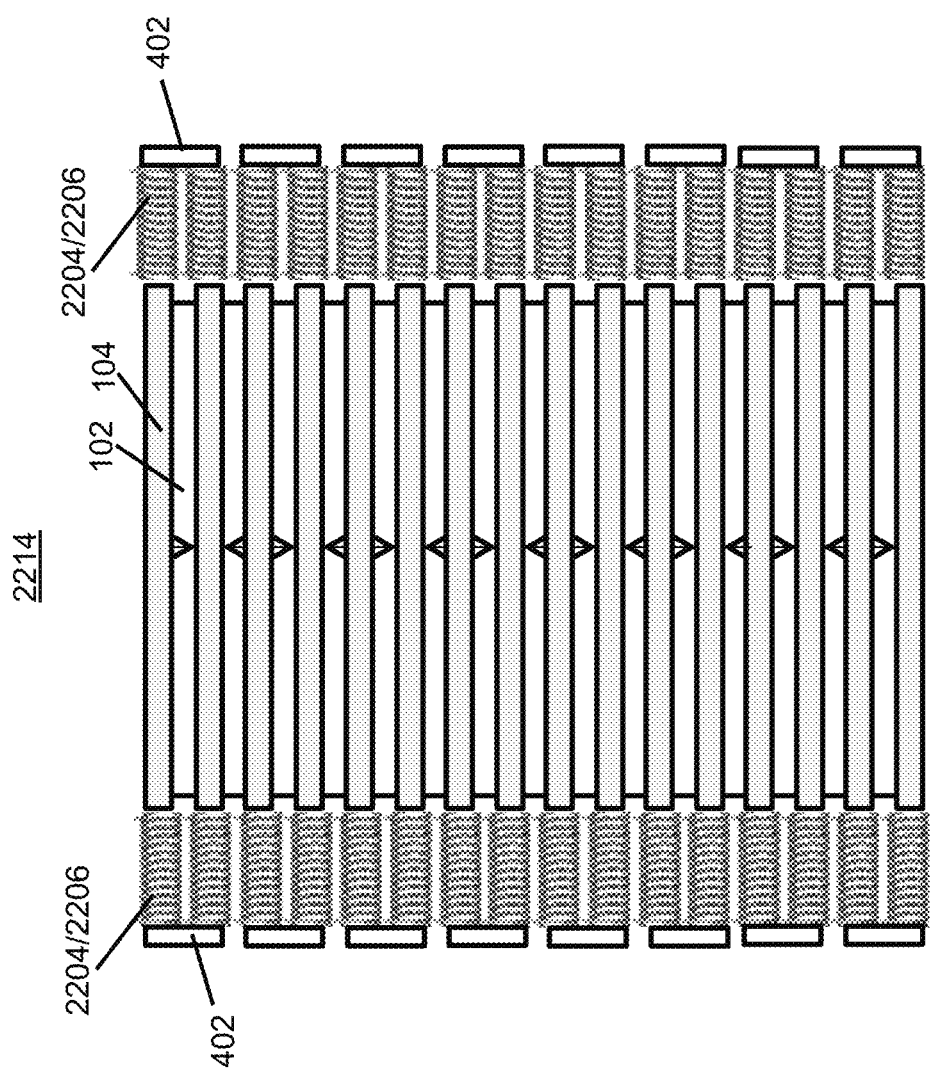
FIG. 22G depicts a third exemplary hybrid rotor and stator coil arrangement.

FIG. 22G depicts an exemplary hybrid rotor and stator coil arrangement 2214 where two stator coils 2204 are used with one rotor where the cores 2206 of the paired stator coils 2204 have shunts plates 402 that join the cores 2206. One skilled in the art will understand that when flux from the lateral magnets 102 is being routed to both ends of the pole pieces 104, the material making up the pole pieces 104 can be made thinner.

FIG. 22H depicts an exemplary hybrid rotor and stator coil arrangement 2216 where two stator coils 2204 are used with one rotor 2200 where the cores 2206 of the paired stator coils 2204 are all joined by a single shunt plate 402.

FIG. 22I depicts an exemplary saddle core type stator-rotor interface 2220 where core material 2206 wraps around from one side of the pole piece 104 to the other side providing a complete circuit. A coil 2204 can be placed around the core material 2206 anywhere along the core material 2206 to include the entire core material 2206. This saddle core arrangement is similar to that described in U.S. Non-provisional patent application Ser. No. 13/236,413, filed Sep. 19, 2011, titled "An Electromagnetic Structure Having A Core Element That Extends Magnetic Coupling Around Opposing Surfaces Of A Circular Magnetic Structure", which is incorporated by reference herein.

FIG. 22J depicts an exemplary hybrid rotor and stator coil arrangement 2222 involving two rotors 2200 that are either side of a stator coil array where the opposing pole pieces of the two rotors have opposite polarities.

FIG. 23A depicts an exemplary metal separator lateral magnet hybrid structure 2300 comprising long pole pieces 104 sandwiched between magnets 102 having magnetizations as shown in FIG. 23B. A target 404 placed on top can be used to separate metal from material striking it. Under one arrangement the pole pieces 104 and the target would be shaped to provide a rounded upper surface.

Cyclic lateral magnet assemblies can be arranged to correspond to cyclic codes. FIGS. 24A and 24B depict assemblies 2400 having magnetic structures made up of magnets 102 and pole pieces 104 arranged in accordance with complementary cyclic Barker 4 codes, where the magnets 102 and pole pieces 104 are separated by non-magnetic spacers 2402. As shown in FIG. 24C, the two complementary cyclic lateral magnet assemblies 2400 can be brought together such that their magnetic structures correlate. Either assembly 2400 can then be turned to de-correlate the magnetic structures. A sleeve 2404 is shown that can be used to constrain the relative movement of the two assemblies 2400 relative to each other to rotational movement while allowing the two assemblies 2400 to be brought together or pulled apart.

Figure 25A:
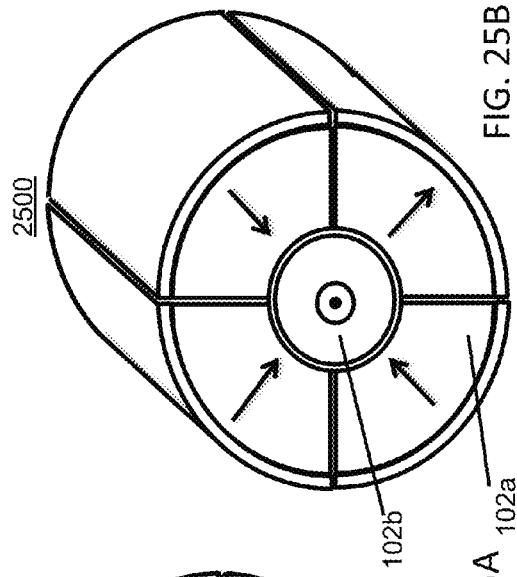
FIGS. 25A and 25B depict cyclic lateral magnet assemblies similar to those of FIGS. 24A-24C except lateral magnets are combined with conventional magnets.
Figure 25B:
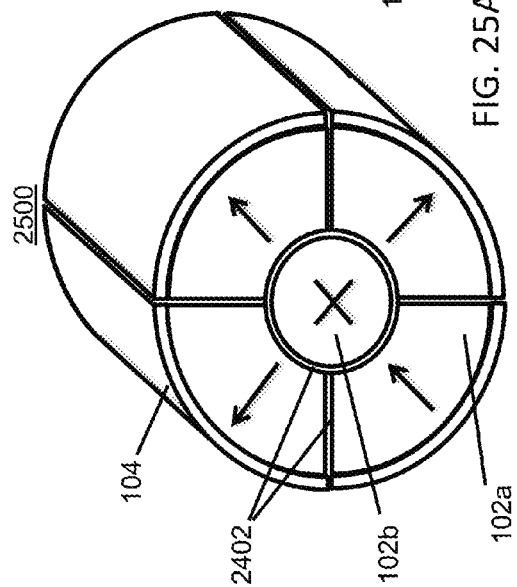

FIGS. 25A and 25B depict cyclic lateral magnet assemblies 2500 similar to those of FIGS. 24A-24C except lateral magnets around the perimeter 102a/104 are combined with conventional magnets 102b in the center. As such, when the complementary lateral magnet assemblies 2500 begin to approach each other, the opposite polarity magnets 102b in the center of the assemblies 2500, which will have a farther reach than the lateral magnets 102a/104, begin to attract each other so to bring the two assemblies 2500 together and, once together, either lateral magnet assembly 2500 can be rotated relative to the other to achieve a correlated peak attract force position. One skilled in the art will recognize that for the cyclic Barker 4 code also requires physical constraint of the two assemblies 2500 so that they can only rotate relative to each other such that the two ends of the assemblies 2500 are always fully facing each other. Various types of mechanisms can be employed such as an outer cylinder or sleeve 2404 that would provide for a male-female connector type attachment.

Figure 26A:
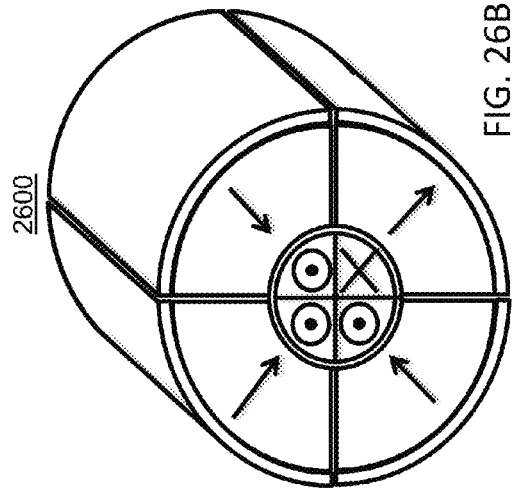
FIGS. 26A and 26B depict exemplary cyclic lateral magnet assemblies similar to those of FIGS. 25A and 25B where the individual conventional magnets are each replaced with four conventional magnets having polarities in accordance with a cyclic Barker 4 code.
Figure 26B:
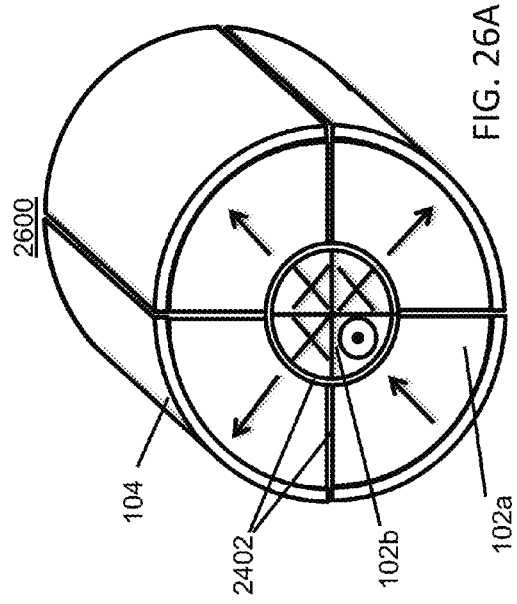

FIGS. 26A and 26B depict exemplary cyclic lateral magnet assemblies 2600 similar to those of FIGS. 25A and 25B where the individual conventional magnets 102b are each replaced with four conventional magnets 102b having polarities in accordance with a cyclic Barker 4 code. Whereas the conventional magnets 102b of FIGS. 25A and 25B would provide an attract force regardless of rotational alignment, the conventional magnets 102b of FIGS. 26A and 26B have a correlation function where there is a peak attract force and substantially zero off peak forces.

FIGS. 27A and 27B depict an exemplary lateral magnet wheel assembly 2700 comprising a ring magnet 102 and a ring-shaped pole piece 104. An axle 2702 can be placed inside the holes 2704 of the lateral magnet wheel assembly 2700 such that the axle 2702 is fixed relative to the lateral magnet wheel assembly 2700 or the assembly 2700 is free to turn relative to the axle 2702. As such, when a fixed axle configuration is used, a motor or other mechanism used to rotate the axle 2702 thereby causes the wheel assembly 2700 to rotate. As depicted in FIG. 27B, flux from the magnet 102 is directed through the pole piece 104 to the target 404.

FIG. 28A depicts an exemplary lateral magnet wheel assembly 2800 comprising a ring magnet 102 and two pole pieces 104, where there is a pole piece 104 on each side of the magnet 102. As depicted in FIG. 28A, flux from the magnet 102 is directed through the two pole pieces 104 to the target 404. Moreover, given pole pieces 104 are on both sides of the magnet 102, a magnetic circuit is created from one pole piece 104 to the target 404 to the other pole piece 104 and through one pole piece 104 through the magnet 102 to the other pole piece 104.

FIG. 28B depicts an exemplary lateral magnet wheel assembly 2802 comprising three ring magnets 102 interleaved between four pole pieces 104, where the ring magnets 102 are in an alternating polarity arrangement. As such, when the wheel assembly 2802 is placed in contact with a target 404 a plurality of magnetic circuits are created with the target 404.

FIG. 28C depicts use of friction surfaces 2804 as part of a lateral magnet wheel assembly 2806 to provide a griping force between the wheel assembly 2806 and a target 404.

FIGS. 29A-29D depict use of a guide ring 2902 and a slot 2904 within a target 404 and optional friction surfaces 2804, where the guide ring 2902 and slot 2904 can enable applications such as toy race cars and tracks as well as enable tracked robotic wheels and the like.

FIGS. 30A and 30B depict combinations of lateral magnetic wheel assemblies 3000a 3000b and round targets 404 having different diameters that function as gears. In FIG. 30A, the lateral magnet wheel assembly 3000a having the smallest diameter is free to rotate relative to a free axle 3002 whereby the rotational force of the fixed axle 3004 driving the lateral magnet wheel assembly 3000b having the largest diameter is converted to turn the smaller wheel assembly 3002a. Alternatively, as depicted in FIG. 30B, both lateral wheel assemblies 3000a 3000b could have fixed axles 3004 such that the various diameters of the wheels determine the ratio of turning rates between the axles 3004 fixed to the two lateral magnetic wheel assemblies 3000a 3000b.

FIGS. 31A-31C depict top, side, and oblique projection views of an exemplary lateral magnet connector assembly 3100 comprising magnets 102 and pole pieces 104 and a connection region 3102 within which some form of connection such as an electrical connection, hydraulics connection, optical connection, or some other form of connection can be made when a lateral magnet connector assembly 3100 is attached to a target 404 or to another lateral magnet connector assembly 3100. As shown in FIGS. 31A and 31B, a plurality of magnets 102 having opposite polarity magnetization are interleaved between pole pieces 104 to form a connector assembly 3100 having a connection region 3102. The connection region 3102 is shown being in a central portion of the assembly 3100 and is shown passing the full height of the assembly 3100. But, the connection region 3102 can have any depth desired and can be located at any desired location other than a central location.

FIGS. 31D-31F show top, side, and oblique projection views of the lateral magnet connector assembly 3100 of FIGS. 31A-31C attached to a target 404 also having a connection region 3102. As such, when the lateral magnet connector assembly 3100 is attached to the target 404 their respective connection regions 3102 become aligned whereby connectors in such connection regions 3102 can be configured to connect.

FIG. 31G depicts the lateral magnetic connector assembly 3100 of FIGS. 31A-31C in an attached state with a complementary lateral magnetic connector assembly 3100', which corresponds to a duplicate of assembly 3100 that has been rotated 180°.

FIGS. 32A and 32B depict top views of two exemplary lateral magnetic connector assemblies 3200a 3200b having non-magnetic spacers 2402 where the magnets 102 are oriented in accordance with a Barker 4 code. One skilled in the art of coding will recognize that the complementary Barker 4 patterns are implemented with lateral magnet subassemblies 3202 3204 comprising magnets 102 having complementary orientations, whereby complementary lateral magnet subassemblies 3202 3204 are the 'symbols' used to implement the complementary Barker 4 codes. One skilled in the art of correlated magnetics coding will understand that one dimensional codes such as Barker codes can also be implemented in a cyclic manner. For example, the magnets 102b in the centers of the lateral magnet assemblies 2500 of FIGS. 25A and 25B could be removed providing for connection regions 3102 in which connectors could be used whereby there is one rotational alignment that would achieve attachment and a desired connection.

FIGS. 33A-33C depict three basic approaches for providing connectors 3302 that connect across a connection boundary 3304 when the two connection regions 3102 of a lateral magnetic connector assembly 3100 and a target 404 (or another lateral magnetic connector assembly 3100) are aligned and magnetically attached. Basically, connectors 3302 can be configured in a male/female type connection configuration such as shown in FIGS. 33A and 33C or in a flush type connection such as shown in FIG. 33B.

FIGS. 34A and 34B depict exemplary electrical contacts 3402, 3404 that can be used in an electrical connector. In FIG. 34A, electrical contacts 3402 such as used in the Apple® Magsafe® power cord are depicted. In FIG. 34B, a male/female type pin connector 3404 is depicted. Generally, all sorts of electrical, fluid, optical, or other types of connectors can be used with the invention.

FIG. 35A depicts a top view of another exemplary lateral magnet connector assembly 3500 comprising four striped magnets 3502, four dipole magnets 102, and ten pole pieces 104 for providing magnetic attachment about a connection region 3102, where the magnetization of the striped magnets 3502 and dipole magnets 102 is indicated by arrows.

FIG. 35B depicts an exemplary striped magnet 3502 where a left portion has a first polarity '−' and a right portion has a second polarity '+' opposite the first polarity, where there is a transition region 3504 where the two polarities transition. Generally, one skilled in the art will recognized that many different transition profiles are possible including polarity transition regions where there is zero field portion that is a line instead of a point.

FIG. 35C depicts an oblique view of the exemplary lateral magnet connector assembly 3500 of FIG. 35A and a corresponding target 404.

In accordance with another aspect of the present invention, the flux concentrating systems and methods described in U.S. non-provisional patent application Ser. No. 14/472,945, can be combined with the flux controlling systems and methods described in U.S. non-provisional application Ser. No. 14/072,664. These two patent applications have been previously incorporated herein by reference in their entirety.

FIG. 36A depicts an alternative view of the exemplary flux concentrator device 500 and target of FIG. 5A. FIG. 36A depicts the exemplary flux concentrator device 500 of FIG. 5A that has been attached to a target 404 that spans the four pole pieces 104 of the device 500, where a shunt plate 402 is also attached to the pole pieces 104.

FIG. 36B depicts an exemplary movable magnetic circuit 3602 that can be placed between the exemplary flux concentrator device 500 and target 404 shown in FIG. 36A. The movable magnetic circuit 3602 comprises a piece of non-magnetically active material, for example, a clear polycarbonate material having four pole pieces 104'. One skilled in the art will understand that all sorts of non-magnetically active materials such as aluminum, stainless steel, wood, plastic, or the like could be used. Such materials could be polished, lubricated, or mechanically configured to enable easy movement, which might be constrained in some manner, for example, the movable magnetic circuit could be constrained such that only sideways movement is allowed. Moreover, one skilled in the art will recognize that the thickness of the pole pieces 104' (and other dimensions) can be selected to meet magnetic circuit requirements.

FIG. 36C depicts the exemplary movable magnetic circuit 3602 in a first location relative to the exemplary flux concentrator device 500 and target 404 of FIG. 36A. As shown in FIG. 36C, the pole pieces 104' of the movable magnetic circuit 3602 substantially align with the pole pieces 104 of the flux concentrator device 500, whereby a substantial amount of the flux concentrated at the pole piece-to-target interfaces of the pole pieces 104 of the flux concentrator device 500 is directed through the corresponding pole pieces 104' of the movable magnetic circuit into the target 404.

FIG. 36D depicts the exemplary movable magnetic circuit 3602 in a second location relative to the exemplary flux concentrator device 500 and target 404 of FIG. 36A. As shown in FIG. 36D, the movable magnetic circuit 3602 is located relative the exemplary flux concentrator device 500 such that the three right-most pole pieces 104' of the moveable magnetic circuit 3602 interface with portions of adjacent pole pieces 104 of the exemplary flux concentrator device 500. As such, the movable magnetic circuit 3602 provides direct magnetic circuits between its pole pieces 104' and the pole pieces 104 of the flux concentrator device 500 such that much of the flux that would otherwise be directed into the target if the flux concentrator 500 were directly in contact with the target 404 is not directed and instead is contained within the flux concentrator 500 and movable magnetic circuit 3602. One skilled in that will understand that the relative location of the movable magnetic circuit 3602 relative to the flux concentrator 500 determines the amount of flux directed into the target 404, where the amount of flux can be varied from some maximum amount to some minimum amount. It should be noted that the arrows shown in FIGS. 36C and 36D are intended to denote that the movement of the movable magnetic circuit 3602 is constrained to sideways movement only.

FIG. 36E depicts an alternative view of the exemplary flux concentrator device 500, exemplary movable magnetic circuit 3602, and target 404 of FIG. 36A, where the arrows are intended to indicate that the movement of the movable magnetic circuit 3602 is constrained to sideways and backward and forward movements.

FIG. 36F depicts an exemplary movable magnetic circuit in a third location relative to the exemplary flux concentrator device and target of FIG. 36A. As shown, the movable magnetic circuit has been moved backward and sideways such that the amount of flux directed into the target 404 is less than when the movable magnetic circuit is in the location shown in FIG. 36E where the corresponding pole pieces 104 104' align. Generally, one skilled in the art will understand that the pole pieces 104' of the movable magnetic circuit can be located relative to the pole pieces of the flux concentrator device 104 such that direct magnetic circuits between pole pieces 104 are produced or not produced. Moreover, the minimum cross-sectional areas of each of the pole pieces 104' of the movable magnetic circuit 3602 determine the amount of flux directed into the target 404, whereby as a given minimum cross-sectional area is restricted, the corresponding magnetic circuit provided to the target 404 is also restricted due to the pole piece 104' of the movable magnetic circuit 3602 becoming saturated.

Figures 37A, 37B:
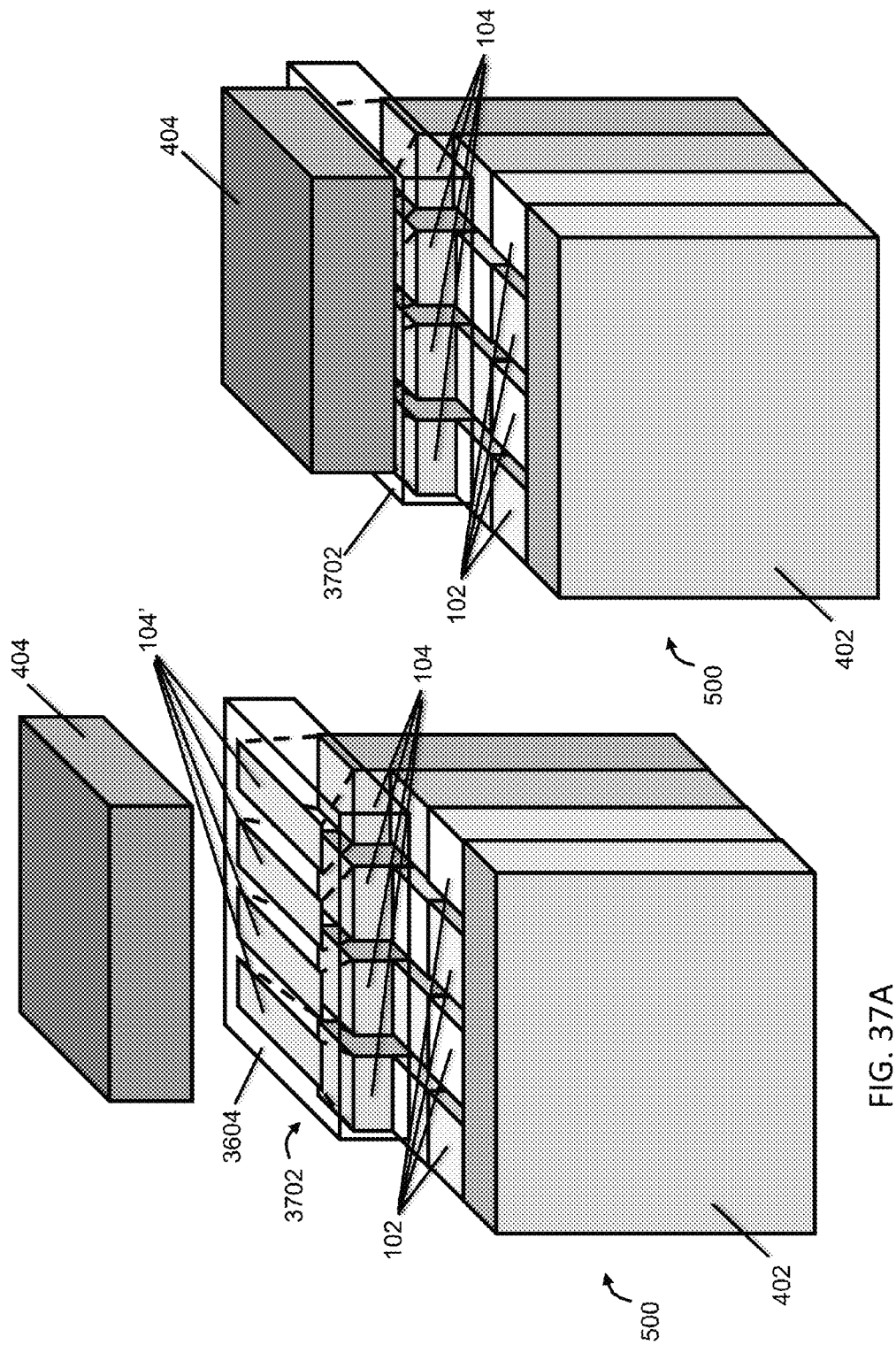
FIG. 37A depicts an alternative exemplary magnetic circuit that can be placed between the exemplary flux concentrator device and target of FIG. 36A.
FIG. 37B depicts the exemplary magnetic circuit in a first location between the exemplary flux concentrator device and target of FIG. 37A.

FIG. 37A depicts an exemplary magnetic circuit 3702 that can be placed between the exemplary flux concentrator device 500 and target 400 of FIG. 36A. As shown in FIG. 37A, each pole piece 104' of the magnetic circuit 3702 has a first interface at the bottom of each pole piece 104' that is intended to be substantially the same as the pole piece-to-target interface of each pole piece 104 of the flux concentrator device 500, and each pole piece 104' of the magnetic circuit 3702 has a second interface at the top of each pole piece 104' having a rectangular shape. As such, the pole pieces 104' of the magnetic circuit 3702 serve to change the 'footprint' available for a target 404, where the target 404 of FIG. 37A has a substantially square bottom surface and the target of FIG. 36A has a substantially rectangular bottom surface.

FIG. 37B depicts the exemplary magnetic circuit in a first location between the exemplary flux concentrator device and target of FIG. 37A. One skilled in the art will understand that magnetic circuit 3702 may be movable or may be configured to remain in a fixed location relative to the flux concentrator device, where the interfacing to the respective pole pieces 104 104' determines the flux directed to the target 404.

In accordance with another aspect of the invention, the target 404 of FIGS. 36A-36E and FIGS. 37A and 37B could instead be another flux concentrator device.

Lateral magnet assemblies as described herein can be used for attachment of any two objects such as electronics devices to walls or vehicle dashes. In particular, anywhere that there is room for a magnet to recess into an object the present invention enables a small external attachment point to be provided. One such application could involve a screw-like lateral magnet device that would screw into a sheet rock wall and provide a very strong attachment point for metal or for a complementary lateral magnet device associated with another object (e.g., a picture frame).

Lateral magnet assemblies can generally be used to provide strong magnetic attachment to a ferromagnetic material and can be used for such applications as lifting metal, metal separators, metal chucks, and the like. One skilled in the art will understand that mechanical advantage can be used to detach a lateral magnet from a ferromagnetic material. The use of mechanical advantage is described in U.S. patent application Ser. No. 13/779,611, filed Feb. 27, 2013, and titled "System for detaching a magnetic structure from a ferromagnetic material", which is incorporated by reference herein in its entirety.

Moreover, a coded magnetic structure comprising conventional magnets or which is a piece of magnet material having had maxels printed onto it can also interact with lateral magnet structures to include complementary coded magnetic and lateral magnet structures.

In accordance with another aspect of the invention, a flux gap concentrator device is used to produce a high flux density in a gap between two or more pole pieces. A flux gap concentrator device may comprise two magnets, first and second pole pieces each having a first interface surface having a first area and a second interface surface having a second area less than the first area where flux is funneled from the first interface surface to the smaller second interface surface while the primary direction of the flux being funneled does not change, and a third pole piece that is used to route flux from the back of one magnet to the back of the other magnet so as to substantially complete a magnetic circuit. The first and second pole pieces are configured so that their first interface surfaces interface with the front side of respective magnets and their second interface surfaces interface with each other but instead of being in contact they are separated by a gap, which results in a high density flux being produced in the gap between the first and second pole pieces. As with the flux concentrator devices described previously, a flux gap concentrator device concentrates and controls the routing of flux from a source to a destination (e.g., a target) based on the ratios of interface surface areas, the saturation flux densities of magnet material versus pole piece material, and the configuration of the pole pieces relative to the magnets (or magnetic sources), where in accordance with this aspect of the invention, the destination is a gap between pole pieces instead of a surface of a target ferromagnetic material. Various applications can benefit from a high flux density magnetic field in a gap. Examples include, microwave components, magnetrons, motors, generators, actuators, and various Yttrium iron garnet (YIG) applications.

FIG. 38A depicts a side view of an exemplary flux gap concentrator device 3800 configured to produce a high flux density magnetic field in a gap between two pole pieces. Referring to FIG. 38A, a flux gap concentrator device 3800 comprises a first magnet 102a, a second magnet 102b, a first pole piece 3802a, a second pole piece 3802b, and a third pole piece 3804. The first and second pole pieces 3802a and 3802b are each shaped somewhat like a funnel such that they each have a first interface surface that interfaces with a front side of one of the two magnets 102a and 102b, where the two magnets 102a and 102b and the first and second pole pieces 3802a and 3802b are configured such that the second interface surfaces of the first and second pole pieces 3802a and 3802b face each other but are separated by a gap. The third pole piece 3804, has a C-shape that interfaces with the back sides of the two magnets 102a and 102b and provides a flux path there between. As such, the flux gap concentrator device 3800 corresponds to a dipole flux circuit, where a high flux density magnetic field is produced in the gap 3806 between the first and second pole pieces 3802a and 3802b.

FIG. 38B depicts a front view of an exemplary pole piece 3802 such as is used in the flux gap concentrator device 3800 depicted in FIG. 38A. Referring to FIG. 38B, the pole piece 3802 is shaped somewhat like a pyramid except it has a flat surface on top. As such, it has a first interface surface 3808 that has much larger area than a second interface surface 3810. As depicted, the first interface surface 3808 corresponds to the back of the pole piece 3802 that as pole piece 3802a shown in FIG. 38A interfaces with respective magnet 102a. The second interface surface 3810 of the pole piece 3802, which has a smaller rectangular area than the first interface surface 3808, is shown in FIG. 38A to interface with the second interface surface 3810 of the other pole piece 3802b shown in FIG. 38A, where there is gap 3806 between them. As such, given different saturation flux densities of the magnets 102a and 102b and the pole pieces 3802a and 3802b, the ratio of the two interface surfaces 3808 and 3810 of the pole pieces 3802a and 3802b can be used to concentrate the flux of the magnets 102a and 102b.

FIG. 38C depicts a side view of another exemplary flux gap concentrator device 3812 configured to produce a high flux density magnetic field in a gap between two pole pieces. Referring to FIG. 38C, the flux gap concentrator device 3812 is very similar to that of FIG. 38A except a frame-shaped pole piece 3814 is configured such that it provides two flux paths between the back sides of the two magnets 102a and 102b.

FIG. 38D depicts a side view of an exemplary flux gap concentrator device 3816 configured to produce a high flux density in a gap between four pole pieces. Referring to FIG. 38D, the flux gap concentrator device 3816 comprises a four magnets 102a-102d, four pole pieces 3802a-3802d and a fifth pole piece 3814. The first four pole pieces 3802a-3802d are each shaped somewhat like a funnel such that they each have a first interface surface that interfaces with a front side of one of the four magnets 102a-102d, where the four magnets 102a-102d and the first four pole pieces 3802a-3802d are configured such that the second interface surfaces of the first four pole pieces 3802a-3802d face each other but are separated by a gap 3806. The fifth pole piece 3814 has a shape similar to a frame such that it interfaces with the back sides of the four magnets and provides flux paths there between. As such, the flux gap concentrator device 3816 corresponds to a quadrupole flux circuit, where a high flux density magnetic field is produced in the gap 3806 between the first four pole pieces 3802a-3802d.

One skilled in the art will understand based on the teachings relating to FIGS. 38A-38D that all sorts of flux gap concentrator device configurations are possible relating to different dipole magnetic circuits, quadrupole magnetic circuits, sextupole magnetic circuits, octupole magnetic circuits, and so on, to include circuits where pole pieces substantially surround a gap from all sides of the gap, which might, for example, resemble a sphere.

FIG. 39A depicts an exemplary flux gap de-concentrator device 3900 that is similar to the flux gap concentrator device of FIG. 38A except the pole pieces 3802a and 3802b are reversed such that a lower flux density is achieved in a gap 3806 between two magnets than would otherwise be achieved without the pole pieces. As such, by reversing the pole pieces depicted in FIG. 38A, the pole pieces as configured in FIG. 39 de-concentrate flux instead of concentrate flux, where the ratio of the saturation flux densities and the ratio of the two surfaces of the pole pieces determines the amount of flux de-concentration that occurs and thus the flux density in the gap 3806 between the pole pieces 3802a and 3802b, where the gap 3806 of FIG. 39A has a greater volume than the gap 3806 of FIG. 38A.

FIG. 39B depicts another exemplary flux de-concentrator device 3902 that is similar to the flux concentrator device 500 of FIG. 5B except the pole pieces 3902a and 3902b are shaped like a funnel as opposed to the rectangular cube shaped pole pieces 104a and 104b of FIG. 5B. Additionally, the pole pieces 3902a and 3902b do not route flux 90° to the target 404 as do the pole pieces 104a and 140b of FIG. 5B.

FIG. 39C depicts yet another exemplary flux de-concentrator device 3904 that is similar to the flux concentrator device 500 of FIG. 5B except the pole pieces 104a and 104b are configured such that the pole-piece to magnet interfaces have smaller surface areas than the surface areas of the pole-piece to target interfaces.

Based on the teachings relating to FIGS. 39A-39C, one skilled in the art will recognize that the various flux concentration devices taught herein can be modified into flux de-concentration devices by making the area of first interface (e.g., pole-piece to magnet interface) surface smaller than the area of the second interface (e.g., pole-piece to target interface) surface. Additionally, the shapes of pole pieces can be selected to route flux at any angle or angles relative to a surface of a magnet, where a given pole piece may be configured to change the direction that flux is being routed multiple times.

FIG. 40 depicts an exemplary flux concentrator device 4000 based on a Halbach magnet array. Referring to FIG. 40, the flux concentrator device 4000 includes five magnets 102a-102e having polarity orientation corresponding to a Halbach magnet array, two pole pieces 3802a and 3802b having funnel shapes that concentrate flux received from the pole pieces 102b and 102d to the surface of a target 404, where the pole pieces 102b and 102d have polarity directions normal to the surface of the target 404.

FIG. 41A depicts another exemplary flux gap concentrator device 4100 based on a Halbach magnet array comprising two flux concentrator devices 4000 like that of FIG. 40 except they are configured such that the ends of the pole pieces having the smallest surface areas face each other to produce high flux density magnetic fields in two gaps 3806a and 3806b.

FIG. 41B depicts an exemplary flux gap concentrator device 4102 that is similar to the flux concentrator device 4000 of FIG. 40 except the funnel shaped pole pieces 3802a and 3802b have been replaced with elbow shaped pole pieces 4102a and 4102b that have first interface surfaces having an area that interfaces with the two magnets 102b and 102d having polarity orientation normal to the surface of the magnet array and that have second interface surfaces that face each other across a gap 3806, where the second interface surfaces have an area less than the surface are of the first interface surfaces.

FIG. 42A depicts an exemplary coil subassembly 4200 having a coil of wire 4202 coiled around a core 4204 of ferromagnetic material (e.g., iron core).

FIG. 42B depicts an exemplary rotor assembly 4206 comprising twelve coil subassemblies 4200a-4200i configured in a circular arrangement within a non-magnetic material 4208 such as plastic or aluminum that has a hole 4210 at its center allowing it to rotate on a shaft (not shown) that would reside inside the hole. Referring to FIG. 42B, the twelve coil subassemblies 4200a-4200l of the stator assembly 4206 are wired in three phases, where coils 4200a, 4200b, 4200h, and 4200g make up the first phase, coils 4200e, 4200f, 4200k, and 4200l make up the second phase, and coils 4200c, 4200d, 4200i, and 4200j make up the third phase. Inputs wires for the three phases are labels I1, I2, and I3 and output wires for the three phases are labeled O1, O2, and O3, where the input and output wires come from and return to the hole 4210 at the center of the rotor assembly 4206.

FIG. 42C depicts an exemplary flux gap concentrator device 4212 comprising two magnets 102a and 102b, two pole pieces 4102a and 4102b having an elbow shape, and a shunt plate 402. Between the two pole pieces 4102a and 4102b is a gap 3806. As such, as a rotor assembly 4206 rotates the twelve coil subassemblies 4200a-4200i pass through the gap 3806, where as many as twelve flux gap concentrator devices 4212 that straddle the stator around its perimeter can be used as part of a three phase generator or motor.

Based on the teachings herein, one skilled in the art will recognize that the invention enables an engineer to concentrate, de-concentrate, and control magnetic flux so as to tailor the force density (PSI) at a surface of a target or to tailor the flux density of the magnetic field in a gap between pole pieces given an amount of flux conducted from surfaces of magnets, where there is a flux concentration and corresponding increase in flux density that can be achieved based on the saturation flux densities of the magnet material and the pole piece material. In particular, a maximum amount of flux concentration occurs when the ratio of the saturation flux densities of the materials substantially equals the ratio of area of the magnet-to-pole piece interface of a pole piece to the area of the pole-piece-to-target interface of the pole piece, which could be called the peak concentration ratio. However, for certain applications, it may be desirable that the pole-piece-to-target interface be under saturated, where the ratio of the area of the magnet-to-pole piece interface of a pole piece to the area of the pole-piece-to-target interface of the pole piece is selected to be less than the peak concentration ratio such that a flux density less than the saturation flux density of the pole piece material is achieved. For example, it may be desirable to achieve 90% or 75% or 50% of the flux concentration potential and therefore produce a flux density that is 90% or 75% or 50% of the saturation flux density of the pole piece material, where the ratio of the surface areas selected is 90% or 75% or 50% of the peak concentration ratio. Generally, one skilled in the art will recognize that it is a design choice as to how much flux concentration by the pole piece is desirable or possible when determining the ratio of the surface areas of the pole piece, where pole piece and or magnet geometry or availability limitations or other such factors may be involved in the design choice.

As previously described, the saturation flux density of the pole piece material can be achieved at the pole-piece-to-target interface of the pole piece if the ratio of the surface area of the magnet-to-pole-piece to the surface area of the pole-piece-to-target interface is substantially equal to the peak flux concentration ratio, which corresponds to the concentration potential of the pole piece material relative to the magnetizable material that provides the magnetic flux. One skilled the art will understand that if a cross-sectional area of a pole piece other than the cross-sectional area of the pole-piece-to-target interface is less than the required area that provides the peak flux concentration ratio than over saturation of the material can occur and the amount of flux concentration at the pole-piece-to-target interface can be less than the concentration potential.

Overall, the greatest amount of flux concentration that can be achieved can be no greater than the peak concentration ratio (e.g., 4×). Thus, if the peak concentration ratio were equal to N and the area of the pole-piece-to-target interface is less than 1/N times the area of the magnet-to-pole piece interface (or the peak concentration area) than the pole piece would be oversaturated, where should a target be a ferromagnetic material, the PSI at the surface of the target can be no higher than the PSI that would have been achieved had the cross-sectional area of the pole-piece-to-target interface of the pole piece been equal to the peak concentration area. However, the size of the pole-piece-to-target interface is also a design choice where it may be desirable that it be an area less than the peak concentration area even if no additional flux concentration can be achieved.

Sample design scenario: It is desirable to achieve substantially the flux concentration potential within an available 0.125 square inch surface area on a target corresponding to a ¼"×½" region on the side of a computing device using a low carbon steel pole piece material having a saturation flux density of 2.4 Tesla (or 24,000 Gauss) to concentrate the flux of a ferrite magnet material having a saturation flux density, $B_S$, of 0.5 Tesla (or 5000 Gauss).

The peak flux concentration ratio is calculated as follows:

Peak flux concentration ratio=$B_{S\,pole\,piece}/B_{S\,magnet}$=24000 G/5000 G=4.8

Assuming a remanence flux density, $B_R$, of the magnet material of 3500 G, a peak concentrated flux density corresponding to the peak flux concentration ratio can be calculated as follows:

Peak concentrated flux density=$B_{R\,magnet} \times B_{S\,pole\,piece}/B_{S\,magnet}$=3500 G×4.8=16,800 Gauss Given an available target surface area of 0.125 square inches, an area of the pole-piece-to-target interface can be selected to also be equal to 0.125 square inches such that the pole-piece-to-target interface can be aligned with the target surface area. Then, the area of the magnet-to-pole-piece interface that would produce the Peak Flux concentration ratio can be calculated as follows:

Magnet-to-pole-piece interface area=Pole-piece-to-target interface area×4.8=0.125 square inches×4.8=0.6 square inches.

The size of the ferrite magnet can then be selected to have a surface for providing flux having an area of 0.6 square inches that can be aligned with the magnet-to-pole-piece interface, where the magnet can be selected to be as thin as possible while continuing to have a 3500 Gauss $B_R$.

A typical pull force calculator, which is available at www.rare-earth-magnets.com that calculates a pull force between a magnet and a mild steel plate, was used to calculate the pull force of the ferrite magnet defined in this example scenario. As such, the ferrite magnet was assumed to be a block ferrite magnet having a length of 1.0", a width of 0.6" and a thickness of 0.125", where the surface area is 0.6 square inches. Given a $B_R$ of 3500 G, the calculator predicted a pull force of 0.53 pounds, which corresponds to a PSI of 0.53/0.6 or 0.88. However, given a smaller block of the same ferrite material having a 0.125 square inch surface area, which is the area available at the surface of the target, the pull force calculator predicts a pull force of 0.11 pounds, or a PSI of 0.11/0.125 or 0.88.

The use of the low carbon steel pole piece having a pole-piece-to-target interface area of 0.125 square inches and a magnet-to-pole-piece interface area of 0.6 square inches should concentrate the flux due to the Peak flux concentration ratio of 4.8 of the two materials matching the ratio of the two surface areas of the pole piece. The total force produced by the magnet, or 0.53 pounds does not change, but the same force is now produced at a smaller surface area of 0.125 square inches. As such, the PSI increased from 0.53/0.6 to 0.53/0.125 or by factor of 4.8, which corresponds to the 4.8 peak flux concentration ratio.

As described above, a given pole piece may have a first interface surface and second interface surface where the ratio of their two surface areas can be established to achieve a desired amount of flux concentration and a corresponding desired PSI. However, based on the teachings herein one skilled in the art will recognized that there could instead be two or more second interface surfaces provided by a pole piece, where the ratio of the total combined surface areas of the second interface surfaces to the area of first interface determines the concentration of flux and thus the PSI delivered at two or more areas on a target to which the two or more second interface surfaces are in contact. Under such an arrangement, the surface areas of the two or more second interface surfaces may be the same or can be different, in which case the amounts of flux concentration and corresponding PSI achieved at the two or more second interface surfaces can be different.

While particular embodiments of the invention have been described, it will be understood, however, that the invention is not limited thereto, since modifications may be made by those skilled in the art, particularly in light of the foregoing teachings.

The invention claimed is:

1. A magnet assembly, comprising:
   a multi-pole magnetic structure comprising one or more pieces of a magnetizable material having a plurality of polarity regions for providing a magnetic flux, said magnetizable material having a first saturation flux density, said plurality of polarity regions being magnetized in a plurality of directions; and
   a plurality of pole pieces of a ferromagnetic material for integrating said magnetic flux across said plurality of polarity regions, said ferromagnetic material having a second saturation flux density, each pole piece of said plurality of pole pieces having a magnet-to-pole piece interface with a corresponding polarity region and a pole piece-to-target interface with a target, said magnet-to-pole piece interface having a first area, said pole piece-to-target interface having a second area, said magnetic flux being routed into said pole piece via said magnet-to-pole interface and out of said pole piece via said pole piece-to-target interface, said routing of said magnetic flux through said pole piece resulting in an amount of concentration of said magnetic flux at said pole piece-to-target interface corresponding to a first ratio of the first area divided by the second area, said amount of concentration of said magnetic flux being limited by a second ratio of the second saturation flux density divided by the first saturation flux density, wherein said pole-piece-to-target interface of said pole piece achieves said second saturation flux density when said first ratio equals said second ratio, and wherein said first ratio is at least fifty percent of said second ratio.

2. The magnet assembly of claim 1, wherein said target is a ferromagnetic material.

3. The magnet assembly of claim 1, wherein said target is a gap between two or more pole-piece-to-target interfaces of said plurality of pole pieces.

4. The magnet assembly of claim 1, wherein at least one of the one or more pieces of a magnetizable material is thinner than each of said plurality of pole pieces.

5. The magnetic assembly of claim 1, wherein said first ratio is at least seventy five percent of said second ratio.

6. The magnetic assembly of claim 1, wherein said first ratio is at least ninety percent of said second ratio.

7. The magnet assembly of claim 1, further comprising:
   a magnetic circuit between said lateral magnetic assembly and said target for controlling the magnetic flux directed to said target, said magnetic circuit comprising:
   a second plurality of pole pieces of a second ferromagnetic material, said second ferromagnetic material having a third saturation flux density; and
   a magnetically inactive material for constraining said second plurality of pole pieces.

8. The magnetic assembly of claim 7, wherein said magnetically inactive material comprises one of polycarbonate, aluminum, plastic, wood, or stainless steel.

9. The magnetic assembly of claim 7, further comprising:
   a mechanism configured to move at least one of said magnetic assembly or said magnetic circuit to a plurality of alignment positions such that for each alignment position of said plurality of alignment positions at least two pole pieces of said first plurality of pole pieces are in contact with two or more pole pieces of said second plurality of pole pieces, a first alignment position of said plurality of alignment positions resulting in a first amount of flux being directed to said one of said target, a second alignment position of said plurality of alignment positions resulting in a second amount of flux being directed to said one of said target, said second amount of flux being less than said first amount of flux.

10. The magnetic assembly of claim 1, wherein said polarity regions are separate magnets.

11. The magnetic assembly of claim 1, wherein said polarity regions have a substantially uniformly alternating polarity pattern.

12. The magnetic assembly of claim 1, wherein said polarity regions have a polarity pattern in accordance with a code having a code length greater than 2.

13. The magnetic assembly of claim 1, wherein said polarity regions are printed magnetic regions on a single piece of magnetizable material.

14. The magnetic assembly of claim 1, further comprising:
a shunt plate for producing a magnetic flux circuit between at least two polarity regions of said plurality of polarity regions.

15. The magnetic assembly of claim 1, wherein each of said plurality of polarity regions has one of a first magnetization direction or a second magnetization direction that is opposite to said first magnetization direction.

16. The magnetic assembly of claim 1, wherein each of said plurality of polarity regions has one of a first magnetization direction, a second magnetization direction that is opposite to said first magnetization direction, a third magnetization direction that is perpendicular to said first magnetization direction, or a fourth magnetization direction that is opposite to said third magnetization direction.

17. The magnet assembly of claim 1, wherein said target is a complementary magnet assembly.

18. The magnetic assembly of claim 1, further comprising:
said complementary magnet assembly, said complementary magnet assembly comprising:
a second multi-pole magnetic structure comprising one or more pieces of a second magnetizable material having a second plurality of polarity regions for providing a second magnetic flux, said second magnetizable material having a third saturation flux density, said second plurality of polarity regions being magnetized in said plurality of magnetization directions; and
a second plurality of pole pieces of a fourth ferromagnetic material for integrating said magnetic flux across said second plurality of polarity regions and directing said magnetic flux to said magnet assembly, said fourth ferromagnetic material having a fourth saturation flux density.

19. The magnetic assembly of claim 18, wherein said third saturation flux density is substantially the same as said first saturation flux density.

20. The magnetic assembly of claim 18, wherein said fourth saturation flux density is substantially the same as said second saturation flux density.

* * * * *